US011250118B2

(12) United States Patent
Ledwith et al.

(10) Patent No.: US 11,250,118 B2
(45) Date of Patent: Feb. 15, 2022

(54) REMOTE INTERACTION WITH A DEVICE USING SECURE RANGE DETECTION

(71) Applicant: Apple Inc., Cupertino, CA (US)

(72) Inventors: Alexander R. Ledwith, Santa Cruz, CA (US); Wade Benson, San Jose, CA (US); Marc J. Krochmal, Santa Clara, CA (US); John J. Iarocci, Los Gatos, CA (US); Jerrold V. Hauck, Windermere, FL (US); Michael Brouwer, Los Gatos, CA (US); Mitchell D. Adler, Los Gatos, CA (US); Yannick L. Sierra, San Francisco, CA (US); Libor Sykora, Prague (CZ); Jiri Margaritov, Prague (CZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/388,831

(22) Filed: Apr. 18, 2019

(65) Prior Publication Data

US 2019/0318074 A1   Oct. 17, 2019

Related U.S. Application Data

(63) Continuation-in-part of application No. 15/996,413, filed on Jun. 1, 2018, which is a continuation-in-part of application No. 15/497,203, filed on Apr. 26, 2017.

(Continued)

(51) Int. Cl.
*G06F 21/34* (2013.01)
*G06F 1/16* (2006.01)
*H04W 12/63* (2021.01)

(52) U.S. Cl.
CPC .............. *G06F 21/34* (2013.01); *G06F 1/163* (2013.01); *H04W 12/63* (2021.01)

(58) Field of Classification Search
CPC ..... G06F 21/34–35; G06F 1/163; H04W 12/63
See application file for complete search history.

(56) References Cited

U.S. PATENT DOCUMENTS 6,539,479 B1   3/2003   Wu
6,981,144 B2   12/2005   Bauman
(Continued)

FOREIGN PATENT DOCUMENTS

CN   102184352   9/2011
CN   103378876   10/2013
(Continued)

OTHER PUBLICATIONS

Australian Examination Report from Australian Patent Application No. 2017286140, dated Nov. 26, 2019, 4 pages.
(Continued)

*Primary Examiner* — Matthew T Henning
(74) *Attorney, Agent, or Firm* — Morgan, Lewis & Bockius LLP

(57) ABSTRACT

In some embodiments, a first device performs ranging operations to allow a user to perform one or more operations on the first device without providing device-access credentials. For example, when a second device is within a first distance of the first device, the first device determines that the second device is associated with a first user account that is authorized to perform operations on the first device. In response to the determination, the first device enables at least one substitute interaction (e.g., a password-less UI interaction) to allow the operations to be performed on the first device to be accessed without receiving access credentials through a user interface. In response to detecting an occurrence of the substitute interaction, the operation is authorized on the first device.

19 Claims, 28 Drawing Sheets

Related U.S. Application Data

(60) Provisional application No. 62/349,029, filed on Jun. 12, 2016, provisional application No. 62/514,897, filed on Jun. 4, 2017.

(56) References Cited

U.S. PATENT DOCUMENTS

| | | | |
|---|---|---|---|
| 7,515,048 | B1 | 4/2009 | Bhattiprolu |
| 9,001,905 | B2 | 4/2015 | Hamalainen |
| 9,294,922 | B2 | 3/2016 | Garcia |
| 9,565,187 | B2 | 2/2017 | Daley |
| 9,684,394 | B2* | 6/2017 | Foss ................. G06F 3/0338 |
| 9,747,433 | B2 | 8/2017 | Patel |
| 10,097,353 | B1 | 10/2018 | Carlson |
| 10,296,754 | B2 | 5/2019 | Son |
| 10,701,067 | B1 | 6/2020 | Libo |
| 2003/0099362 | A1 | 5/2003 | Rollins |
| 2003/0220765 | A1 | 11/2003 | Overy et al. |
| 2004/0203600 | A1 | 10/2004 | McCorkle |
| 2005/0041813 | A1 | 2/2005 | Forest |
| 2005/0164634 | A1 | 7/2005 | Tanaka |
| 2005/0251680 | A1 | 11/2005 | Brown |
| 2006/0288209 | A1 | 12/2006 | Vogler |
| 2007/0248232 | A1 | 10/2007 | Driscoll |
| 2007/0287386 | A1 | 12/2007 | Agrawal |
| 2008/0201768 | A1* | 8/2008 | Koo ................... G06F 21/34 726/6 |
| 2009/0288079 | A1* | 11/2009 | Zuber ................ G06F 21/51 717/176 |
| 2009/0325573 | A1 | 12/2009 | Meyer |
| 2011/0093846 | A1 | 4/2011 | Moinzadeh |
| 2011/0215921 | A1 | 9/2011 | Ayed et al. |
| 2011/0265045 | A1 | 10/2011 | Hsieh |
| 2011/0314539 | A1* | 12/2011 | Horton ............... H04L 9/3234 726/20 |
| 2012/0240191 | A1 | 9/2012 | Husney |
| 2012/0266221 | A1 | 10/2012 | Castelluccia et al. |
| 2013/0088192 | A1 | 4/2013 | Eaton |
| 2013/0335193 | A1 | 12/2013 | Hanson |
| 2013/0344812 | A1 | 12/2013 | Dees |
| 2014/0155031 | A1 | 6/2014 | Lee et al. |
| 2014/0199967 | A1 | 7/2014 | Varoglu |
| 2014/0208112 | A1 | 7/2014 | McDonald et al. |
| 2014/0282877 | A1 | 9/2014 | Mahaffey et al. |
| 2014/0298324 | A1* | 10/2014 | Voronkov ........... G06F 21/629 717/178 |
| 2014/0298432 | A1* | 10/2014 | Brown ............... H04L 63/0853 726/6 |
| 2014/0310515 | A1 | 10/2014 | Kim et al. |
| 2014/0364085 | A1 | 12/2014 | Garcia |
| 2014/0364153 | A1 | 12/2014 | Ren |
| 2014/0373100 | A1 | 12/2014 | Poiesz |
| 2014/0376721 | A1 | 12/2014 | Perez et al. |
| 2015/0117340 | A1 | 4/2015 | Kawakami |
| 2015/0147065 | A1 | 5/2015 | Civelli |
| 2015/0169335 | A1 | 6/2015 | Oh |
| 2015/0186636 | A1* | 7/2015 | Tharappel ........... H04L 9/3231 726/8 |
| 2015/0261947 | A1 | 9/2015 | Motoe |
| 2015/0266451 | A1 | 9/2015 | Oohara |
| 2015/0296074 | A1 | 10/2015 | Shah et al. |
| 2015/0382195 | A1 | 12/2015 | Grim |
| 2016/0058133 | A1 | 3/2016 | Fournier |
| 2016/0065374 | A1 | 3/2016 | Sauerwald |
| 2016/0080154 | A1 | 3/2016 | Lee et al. |
| 2016/0104006 | A1 | 4/2016 | Son |
| 2016/0119789 | A1 | 4/2016 | Hu et al. |
| 2016/0154952 | A1 | 6/2016 | Venkatraman |
| 2016/0164852 | A1 | 6/2016 | McCoy |
| 2016/0277925 | A1 | 9/2016 | Bengtsson |
| 2016/0294817 | A1 | 10/2016 | Tan |
| 2017/0010771 | A1 | 1/2017 | Bernstein |
| 2017/0142578 | A1 | 5/2017 | Puri |
| 2017/0164190 | A1 | 6/2017 | Weksler |
| 2017/0270528 | A1 | 9/2017 | Prakash |
| 2017/0339151 | A1* | 11/2017 | Van Os ............... H04W 12/06 |
| 2017/0357523 | A1 | 12/2017 | Benson et al. |
| 2017/0357788 | A1 | 12/2017 | Ledvina et al. |
| 2017/0359169 | A1 | 12/2017 | Benson et al. |
| 2018/0276367 | A1 | 9/2018 | Benson |
| 2019/0312967 | A1 | 10/2019 | Sheng |
| 2020/0151304 | A1* | 5/2020 | Trueba ................ G06F 8/65 |

FOREIGN PATENT DOCUMENTS

| | | |
|---|---|---|
| CN | 103442120 | 12/2013 |
| CN | 103841198 | 6/2014 |
| CN | 105245542 | 1/2016 |
| FR | 2882839 | 9/2006 |
| JP | 2005-117430 | 4/2005 |
| JP | 2007-019892 | 1/2007 |
| JP | 2009-065346 | 3/2009 |
| JP | 2009-533990 | 9/2009 |
| JP | 2014-123204 | 7/2014 |
| JP | 2016-054483 | 4/2016 |
| KR | 2010-0021531 | 2/2010 |
| KR | 2016-0057413 | 5/2016 |
| WO | WO 2017/218208 | 12/2017 |
| WO | WO 2019/067105 | 4/2019 |

OTHER PUBLICATIONS

Japanese Office Action from Japanese Patent Application No. 2018-562555, dated Jan. 6, 2020, 14 pages including English language translation.
Korean Office Action from Korean Patent Application No. 10-2018-7034644, dated Jan. 14, 2020, 10 pages including English language translation.
European Office Action dated Mar. 2, 2020, from European Patent Application No. 17731348.3, 6 pages.
European Office Action from European Patent Application No. 17731348.3, dated Sep. 12, 2019, 7 pages.
International Search Report and Written Opinion of International Patent Application from PCT/US2017/035601, dated Oct. 18, 2017, 20 pages.
Written Opinion of the International Preliminary Examining Authority from PCT/US2017/035601, dated May 8, 2018, 8 pages.
SRP Documentation, retrieved from http://srp.stanford.edu/doc.html#standards, visited Apr. 3, 2018, 3 pages.
Wu, "The Secure Remote Password Protocol," retrieved from http://srp.stanford.edu/ndss.html, 1998, 24 pages.
Invitation to Pay Additional Fees from PCT/US2020/028549, dated Jul. 10, 2020, 13 pages.
International Search Report and Written Opinion from PCT/US2020/028549, dated Aug. 31, 2020, 18 pages.
Chinese Office Action from Chinese Patent Application No. 201780033185.8, dated Oct. 27, 2020, 26 pages including English language translation.
Japanese Office Action from Japanese Patent Application No. 2018-562555, dated Sep. 25, 2020, 5 pages including English language translation.
Notice of Acceptance from Australian Patent Application No. 2017286140, dated Oct. 12, 2020, 3 pages.
Korean Office Action from Korean Patent Application No. 2018-7034644, dated Nov. 26, 2020, 9 pages including English language translation.
Chinese Office Action from Chinese Patent Application No. 201780033185.8, dated Jun. 3, 2021, 17 pages including English language translation.
Japanese Notice of Allowance from Japanese Patent Application No. 2018-562555, dated May 31, 2021, 5 pages including English language translation.
Korean Notice of Allowance from 10-2018-7034644, dated May 31, 2021, 5 pages including English language translation.
European Office Action from European Patent Application No. 17731348.3, dated Jul. 2, 2021, 5 pages.
Australian Examination Report from Australian Patent Application No. 2021200451, dated Sep. 28, 2021, 3 pages.

(56) References Cited

OTHER PUBLICATIONS

Chinese Office Action from Chinese Patent Application No. 201780033185.8, dated Oct. 25, 2021, 19 pages including English language translation.

* cited by examiner

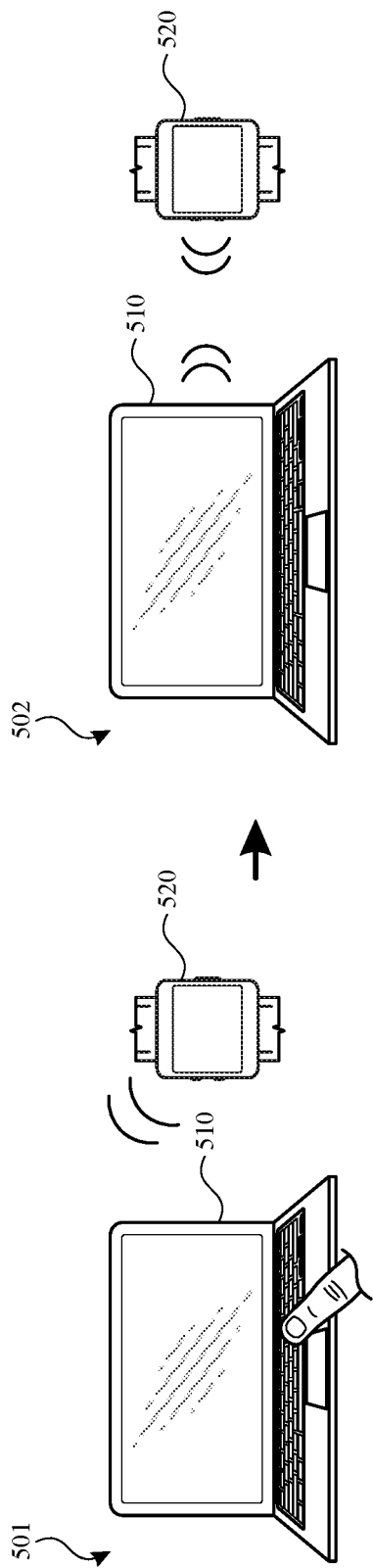
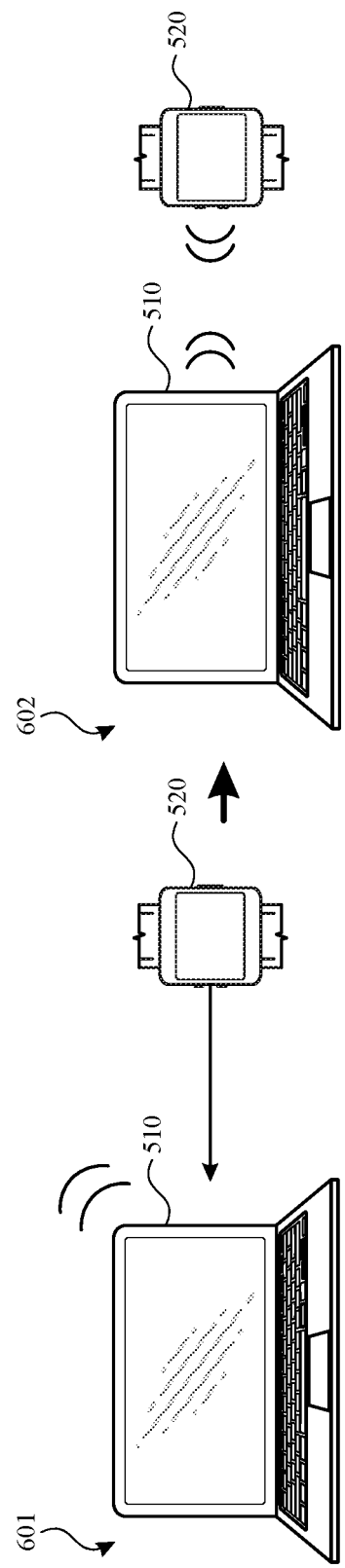
FIG. 5
FIG. 6

REMOTE INTERACTION WITH A DEVICE USING SECURE RANGE DETECTION

CROSS-REFERENCE TO RELATED APPLICATIONS

The present application is a continuation-in-part of U.S. patent application Ser. No. 15/996,413, filed Jun. 1, 2018, which claims the benefit of U.S. Provisional Patent Application No. 62/514,897, filed Jun. 4, 2017, and which is a continuation-in-part of U.S. patent application Ser. No. 15/497,203, filed Apr. 26, 2017, which claims the benefit of U.S. Provisional Patent Application No. 62/349,029, filed Jun. 6, 2017, all of which are hereby incorporated by reference in their entireties for all purposes.

TECHNICAL FIELD

The present description relates generally to modifying a security state of a device, including modifying a security state of a device with secured range detection.

BACKGROUND

In order to provide a balance of security and convenience, a trusted device (e.g., key fobs, mobile devices, wearable devices, etc.) may be used to unlock (or otherwise modify a security state) a target device. For example, a locked target device may automatically unlock in the presence of a trusted device, or may otherwise accept commands from the trusted device (e.g., via user input) to unlock the target device, allowing a user to avoid having to manually interact with the target device to unlock it.

Many such devices communicate with each other through various wireless protocols (e.g., Bluetooth, Wi-Fi, etc.) to verify the proximity of the target device before unlocking it. However, especially in the case of wireless protocols, the communications between the devices are susceptible to attackers who can capture the transmitted data and use it to spoof the proximity of a trusted device without having to break an encryption scheme that is commonly used for such communications.

For example, some devices or protocols use a received signal strength indicator (RSSI) to determine the proximity of a trusted device. A higher RSSI generally indicates that the trusted device is nearer to a particular location. However, an attacker can capture the transmission of the trusted device and amplify the signal to make it appear as though the devices are nearer to each other than they actually are, allowing the attacker to unlock the target device. It is desirable to provide more secure methods for detecting the range of a trusted device before allowing the trusted device to unlock a target device.

BRIEF DESCRIPTION OF THE DRAWINGS

The novel features of the subject technology are set forth in the appended claims. However, for purposes of explanation, several embodiments of the subject technology are set forth in the following figures.

FIG. 5 illustrates an example of a target device that establishes a connection with a trusted device.

FIG. 6 illustrates an example of a trusted device that establishes a connection with a target device.

DETAILED DESCRIPTION

Figure 1:
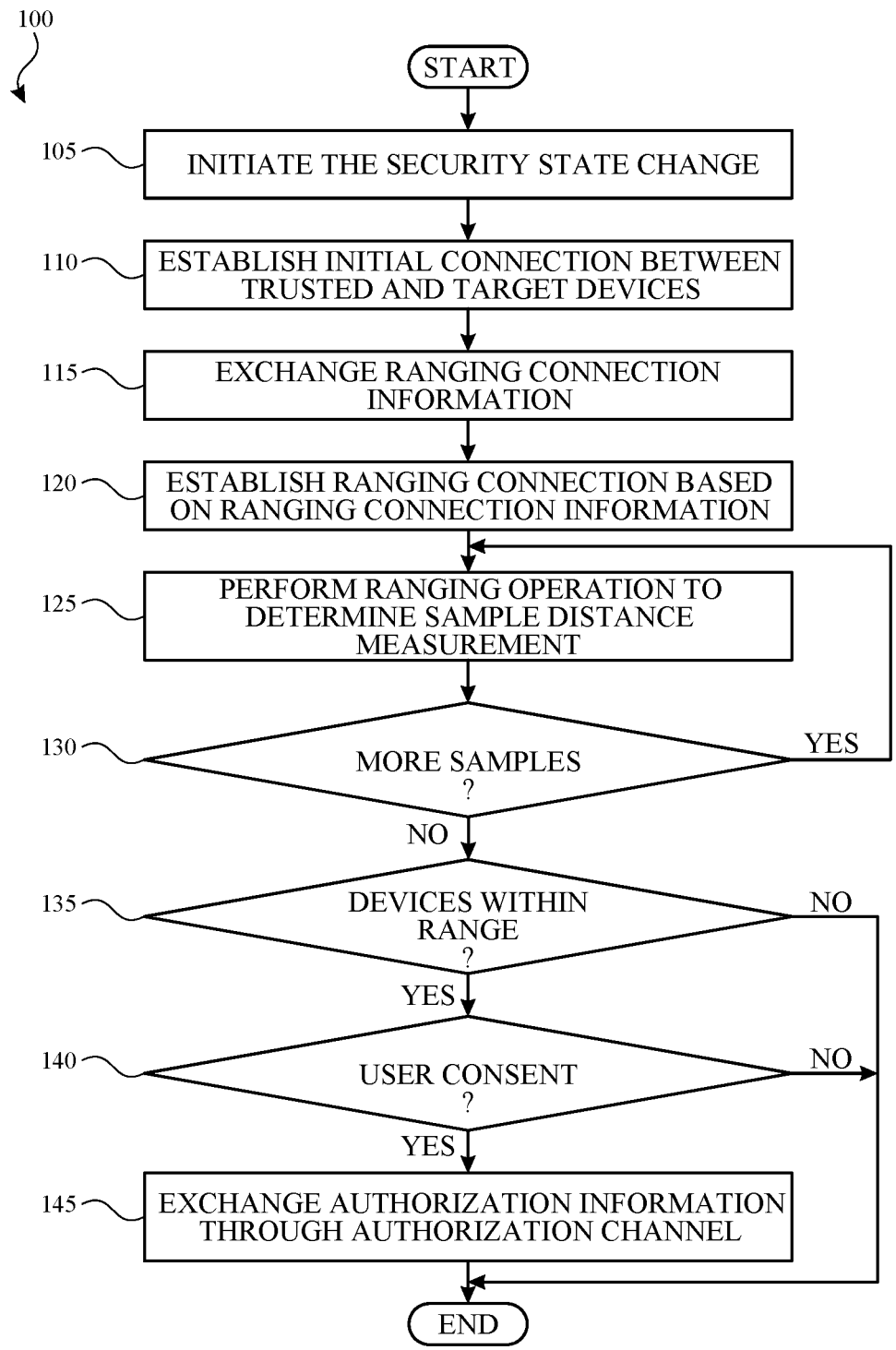
FIG. 1 conceptually illustrates a process for a trusted device to use secure ranging to modify a security state of a target device.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Some embodiments of the subject technology provide a method for using a trusted device to modify a security state at a target device (e.g., unlocking the device). The target device is the device to be unlocked, while the trusted device is a device that has been authorized to modify the security state of the target device.

The target and trusted devices (e.g., laptop computers, mobile phones, tablets, etc.) of some embodiments perform several ranging operations to compute sample distance measurements between the trusted and target devices. Once the sample distance measurements have been captured, the trusted device determines whether the sample distance measurements meet a particular set of criteria (e.g., whether the devices are within a threshold distance), and, when the calculated composite distance measurement meets the set of criteria, exchanges a security token (or other authorization information) with the target device to modify the security state (e.g., unlock, authorize payment data, etc.) at the target device. In some embodiments, modifying the security state includes authorizing a set of restricted operations or providing a higher level of security access at the target device.

In some embodiments, the trusted device is established as a trusted device through an authorization (or pairing) process with the target device. The authorization process allows a user to grant the trusted device permission to unlock (or otherwise modify the security state of) the target device. The trusted device of some embodiments receives a security token or other shared secret during the authorization process that can be used in future sessions to modify the security state of the target device.

Once the target device trusts the trusted device, the trusted device can be used to modify the security state of the target device. In some embodiments, the process for modifying the security state can be initiated by either the target device or the trusted device. The device that initiates the process (either the trusted or target device) is referred to as the initiating device, while the other device is the non-initiating device. The process of some embodiments can be explicitly initiated by a user (e.g., through input at the initiating device) or through implicit actions of the user (e.g., when a user carries a non-initiating device within a particular range of a non-initiating device).

In some embodiments, the non-initiating device (i.e., the device that is waiting for another device to initiate the process) continuously (or periodically) announces its availability, making the non-initiating device discoverable by other devices. When the initiating device determines that the security state of the target device should be modified (e.g., upon receiving user input), the initiating device performs a scan to discover the non-initiating device.

In some embodiments, a non-initiating device does not continuously announce its availability, but rather a proxy device is used to announce the availability of the non-initiating device. The initiating device of such embodiments scans for and identifies the availability of the non-initiating device (through the announcements of the proxy device). The initiating device then sends a request to the proxy device. In some embodiments, the proxy device then sends another request to the non-initiating device to have it announce its own availability for a brief period of time. The initiating device then performs a scan to discover the non-initiating device.

Once the initiating device discovers the announced availability of the non-initiating device, the initiating device exchanges ranging connection information with the non-initiating device. In some embodiments, the ranging connection information (e.g., device identifiers, device state, bootstrap information, etc.) is for establishing a ranging connection between the devices. In some embodiments, the ranging connection information identifies a portion of a frequency spectrum that the devices can use for the ranging connection. The ranging connection of some embodiments is used for performing ranging operations to determine whether the devices are within a threshold distance of each other.

In some embodiments, part of the security protocol for determining whether to allow a trusted device to unlock a target device is based on the set of ranging operations (e.g., determining a distance, proximity, etc.). The method of some embodiments uses ranging (e.g., distance, proximity, etc.) information to determine whether the trusted and target devices are within a specified range of each other before allowing the trusted device to unlock the target device. In some embodiments, the trusted device is a trusted device because it shares a shared secret (e.g., through a pairing operation), with the target device.

The shared secret of some embodiments is used to secure the ranging operation. In some embodiments, the shared secret is a highly secured key that is used for highly sensitive data stored in segregated and secured areas (e.g., a Secure Enclave Processor (SEP)) of the devices. In some embodiments, the method does not use the shared secret directly, but rather derives a derived key from the shared secret that can be used for the ranging operation.

The method of some embodiments shares the shared secret between the devices by performing a secure secret sharing operation over an unsecured connection. For example, the method of some embodiments uses a Diffie-Hellman exchange to provide for secure and ephemeral shared secrets between the devices. The shared secret of some embodiments is used to generate (e.g., through derivation functions) other shared secrets without having to send any of the secret data between the devices.

In other embodiments, the various shared values (e.g., shared secret, derived key, messages, etc.) are shared between the devices through a cloud service. The cloud service of some embodiments is associated with a user account that is associated with various devices. The cloud service of some embodiments is then used to share the different shared values for the associated devices.

In some embodiments, in order to determine the distance between a trusted device and a target device, the trusted device of some embodiments exchanges messages (or nonces) with the locked target device, recording timestamps for when the messages are sent and received at each device. In some embodiments, the messages that are exchanged between the devices are derived from the derived key (or the shared secret) using different key derivation functions (KDFs) that are used to generate new values. The KDFs of some embodiments are one-way functions that cannot be used to reveal the original value (i.e., the shared secret), which allow each device to independently generate the same messages without having to have previously sent the messages between the devices. In some embodiments, the messages are embedded into calibration signals that are sent through the air at a particular band of the frequency spectrum.

The devices then exchange the recorded timestamps for the messages. In some embodiments, the timestamps that are exchanged between the devices are encrypted using the derived key (derived from the shared secret), providing a high level of security for the timestamps without using the shared secret directly.

The devices of some embodiments then use the timestamps to calculate the distances between the devices, determining whether the devices are within a desired proximity of each other. For example, in some embodiments, the messages are sent through the air via radio waves which travel at the speed of light. The devices of some such embodiments calculate the distance between the two devices based on how long it takes for a message to travel between the devices (e.g., the time between the sending and receiving of the message) and the speed of light.

In some embodiments, in addition to verifying that the timestamps indicate that the devices are within the desired proximity, the method also performs other verification operations to prevent an attacker from spoofing the location of one or both devices. For example, in some embodiments, the method enforces a constraint on the time between the receipt of a first message at the target device and the sending of a second message from the target device. The constraint ensures that the time between the receipt of the first message and the sending of the second message is too short to allow an attacker to use replay attacks that take advantage of clock drift to make the devices appear to be closer together than they really are.

In some embodiments, the ranging operation is performed to gather several samples of the ranging data, allowing for a more precise and secure determination of the proximity of the devices. In some such embodiments, multiple distance measurement samples are statistically analyzed to generate a composite distance measurement, which is then compared to the threshold distance. Alternatively, or conjunctively, the devices analyze the distance measurement samples to calculate a confidence level that the device is within a threshold distance. When the confidence level exceeds a threshold value, the devices are deemed to be within an acceptable range.

When the method determines that the devices are within a desired proximity to each other (or that the ranging information cannot be verified), the method communicates (e.g., through a secured channel over an established connection) with the target device to unlock, or otherwise modify the security state of, the target device. In some embodiments, the method unlocks a target device by sending an unlock record (e.g., a secret or a key) that can be used to decrypt a master key at the target device. The unlock record of some embodiments is generated by the target device and sent to the trusted device during a process used for authorizing the trusted device to unlock the target device.

In some embodiments, the initial connection used for announcing and discovering the availability of a device, the ranging connection used for the ranging operations, and the connection used to communicate the unlock data are different and separate connections. For example, in some embodiments, the different connections use different protocols or different methods of communication. For example, in some embodiments, the data communicated across a particular connection is actually sent through a separate band of a frequency spectrum or network (e.g., the Internet).

In some embodiments, communications (e.g., requests, ranging information, etc.) are sent through secured channels over the different connections. The secured channels of some embodiments are encrypted using different cryptographic keys. Multiple different channels can each operate on different connections or may all operate on a single connection. Various references are made connections in this application, but it should be understood that communications over a connection may also be secured through a cryptographic channel.

The security of the subject technology of some embodiments requires that the messages are not predictable by an attacker trying to spoof the location of one or both of the devices. In some embodiments, the shared secret (and any values derived from the shared secret) are only used for a single ranging operation, so when the method of some embodiments determines that the devices are not within the desired proximity (or that the ranging information cannot be verified), the method discards the shared secret and any shared values (e.g., nonces, derived keys, etc.) and generates a new shared secret before beginning the process again.

In some embodiments, the method performs multiple stages of ranging operations. In addition to performing several ranging operations to generate an accurate distance measurement, the method of some embodiments performs a preliminary ranging operation using a first connection and performs the secure and precise ranging operation using a second connection. For example, in some embodiments the method is performed on a device with hardware that can communicate on multiple bands of a frequency spectrum. In some such embodiments, it is desirable to use a lower-frequency band (e.g., due to power requirements, etc.) for a ranging operation. However, the lower-frequency band may not be able to provide the necessary precision or security required to determine whether the trusted device is near the target device. The method of some such embodiments then performs a first ranging operation using the lower-frequency band, and when the method determines that the devices are within the proximity of the lower-frequency band, the method performs a second ranging operation using the high-frequency band to determine whether the devices are within the required range to unlock the target device. In some embodiments, the first ranging operation uses a different ranging operation from the second set of ranging operations.

In some embodiments, a first device performs ranging operations to allow a user to access (e.g., to login) the first device under one of several user accounts without providing one or more device-access credentials. In some embodiments, the device-access credentials are secret or semi-secret credentials such passwords, passcodes, biometric input, etc. In some embodiments, the first device can also be accessed without providing a username, while in other embodiments, the user has to provide some indication of the user account under which the user wants to access the device.

When a second device is within a first distance of the first device, a device-access accelerant module of the first device in some embodiments determines that the second device is associated with a first user account under which a user can access (e.g., can log into) the first device. In response to the determination, the accelerant module enables at least one substitute interaction (e.g., a password-less UI interaction) to allow the first device to be accessed without receiving one or more access credentials through a user interface.

The accelerant module then detects the occurrence of the enabled, substitute interaction. In response, the accelerant module directs an authentication module (e.g., a login module) of the first device to allow the first device to be accessed under the first account. In some embodiments, the accelerant module provides to the authentication module a substitute credential (e.g., a secret) in lieu of the first user account access credential(s) (e.g., the account password) in order to direct this module to allow the first device to be accessed under the first user account. In this manner, the first-device's accelerant module supports more seamless device-access interactions in lieu of user access-credential entry and thereby accelerates device access operations on the first device.

In some embodiments, the substitute interaction occurs while the first device is logged into under a second user account. For instance, in some embodiments, this interaction is the selection (e.g., cursor selection, tap selection, etc.) of the first user account in a menu that is presented while the first device is being accessed under the second user account. In some embodiments, the substitute interaction occurs while the first device displays a login display-screen presentation that shows multiple user accounts. In some of these embodiments, the substitute interaction is a selection (e.g., cursor selection, tap selection, etc.) of the first user account in the login display-screen presentation.

To identify the substitute credential for the user account, the access-accelerant module in some embodiments examines a data store (e.g., a lookup table) that identifies (1) other devices that are associated with the user accounts for accessing the first device, (2) substitute credentials associated with these other devices, and (3) in some cases, usernames associated with these other devices. Based on this examination, the accelerant module in these embodiments can identify a substitute credential for the first account's user-supplied access credential.

In other embodiments, the first device's communication layer not only identifies the nearby devices, but also identifies the account with which each identified device is associated (e.g., that the second device is associated with the first user account). In some of these other embodiments, the communication layer passes to the accelerant module an identifier for the first user account, or a value from which the accelerant module can identify the first-user account identifier. Based on this identifier, the accelerant module provides the authentication module the substitute credential for first user account and in some cases the username.

In some embodiments, the first-device's accelerant module not only can accelerate device access operations (by supporting more seamless device-access interactions in lieu of user access-credential entry), but also can accelerate other operations on the first device that require the submission of user credentials (e.g., passwords, passcodes, biometric input, usernames, etc.). In these embodiments, the accelerant module serves as an authorization-accelerant module. For instance, to change some settings (e.g., privacy settings, account settings, security settings, etc.) on a device, it is quite common to require a password, passcode or biometric input from a user. Similarly, it is quite common to require such input to install a program on a device or to purchase an item through the device.

Accordingly, to supplement existing credential inputting methodologies on a first device, the accelerant module in some embodiments enables simpler substitute interactions to change a setting, to install a program, and/or to purchase an item on the first device. The accelerant module of the first device enables these substitute interactions when a second associated device is nearby. For instance, some embodiments perform ranging operations on the first device to detect that the second device is within a particular distance of the first device, so that when the second device is within this distance, the accelerant module can enable the substitute interaction on the first device.

For some of these operations (e.g., changing a setting), the substitute interaction in some embodiments can be (1) the selection of a UI item to perform the operation (e.g., to unlock a change setting), or (2) the entry of a value. When this substitute interaction is performed, the accelerant module provides to an authorization module of the first module a substitute credential in lieu of the user-supplied credential so that the authorization module can authorize the operation for the module that has to perform the operation (e.g., for the module that has to change the setting on the device).

In other embodiments, the substitute interaction for some operations (e.g., changing device setting, installing a program or purchasing an item) entails sending a request to the second device to seek authorization for a requested operation, after a UI item is selected on the first device. The second device in some embodiments displays the authorization request with a notification that describes the request and provides controls for accepting or rejecting the request. When this request is accepted on the second device, the accelerant module provides to the authorization module a substitute credential in lieu of a user-supplied credential. In response, the authorization module authorizes the requested operation for the first-device module that has to perform the operation (e.g., for the module that has to change the setting on the device, install the program or purchase an item on the first device). The above-described interaction is used in some embodiments to send a request to change a setting, install a program or purchase an item from a computer (e.g., laptop or desktop) to a smartwatch that is associated with an administrative account on the computer.

In some embodiments, the accelerant module can enable substitute interactions on the first device even when the first device is currently being accessed under a user account that does not have privileges for the requested operation. For instance, while a second user account is logged into the first device, a user might try to change a setting, install a program or purchase an item on the first device, which cannot be done by providing the login credentials of the second user account. In these cases, the accelerant module of the first device in some embodiments can send a request to a second device to approve the desired operation (e.g., the change to the setting, the installation of the program, the purchase of the item, etc.) when the second device is within a particular distance of the first device and the second device is associated with the first user account.

In some embodiments, the accelerant module of the first device does not need to determine that the second device is within a particular range of the first device, before sending the second device a request to approve certain substitute interactions on the first device. This is because in these embodiments the first device sends such request whenever it detects that the second device is available for direct peer-to-peer connection with the first device through the short-range transceivers (e.g., Bluetooth transceivers, WiFi transceivers, etc.) of the first and second devices. A direct peer-to-peer connection between two devices is a peer-to-peer connection that does not have to go through any other intervening electronic device outside of the two devices. Accordingly, in these embodiments, the first device does not need to perform any ranging operations to determine that the second device is within certain proximity of the first device, before the first-device accelerant module can send an authorization request to the second device.

In some of the embodiments that perform ranging operations, the accelerant module of the first device can enable different sets of substitute interactions when the second device is within different ranges of distances from the first device. For instance, when the second device is within a first distance range of the first device, the accelerant module enables a first set of substitute interactions on the first device, in lieu of a second set of interactions on the first device, to perform a first set of operations on the first device. When the second device is within a closer, second distance range of the first device, the accelerant module enables a third set of substitute interactions on the first device, in lieu of a fourth set of interactions on the first device, to perform a second set of operations on the first computing device.

The second distance range is subsumed in the first distance range in some embodiments. As such, both sets of substitute interactions are enabled when the second device is within the second distance range in these embodiments. Also, the accelerant module disables these substitute interactions when the second device falls outside of first range. This module also disables the second set of substitute interactions when the second device falls outside of the second range.

When the second device is within the closer, second distance range, the substitute interactions in some embodiments are more seamless (e.g., are faster or require less input from a user) than when the device is within the farther, first distance range. For instance, when a watch is very close to a computer, a user in some embodiments can log into an account on the computer through a single stroke input on a peripheral component (e.g., cursor controller, keyboard, etc.) of the computer. When the watch is a little farther from the computer, one user on the computer requests an operation (e.g., the change to a setting, the installation of a program, the purchase of an item) and another user on the watch has to approve this request.

As part of some or all of the ranging operation, the accelerant module in some embodiments receives, from a network interface layer of the first device, a notification that the second device is within a first distance of the first device. This notification includes data regarding the operating mode of the second device. The accelerant module determines whether the operating mode meets a set of criteria for allowing the second device to enable a first substitute interaction on the first device in place of a second interaction that requires a user to provide one or more credentials. When the operating mode does not meet the set of criteria, the accelerant module directs the network interface layer to terminate a connection session or attempted connection session with the second device. When the operating mode meets the set of criteria, the accelerant module enables the first interaction in lieu of the second interaction for performing an operation on the first device. When the second device is a watch, the set of criteria associated with the operating mode of the watch in some embodiments include whether the watch is wrapped around the user's hand, and is currently unlocked.

Some embodiments allow a user to modify the security state of a target device (e.g., unlocking) based on a relationship (e.g., proximity, paired devices, etc.) with a trusted device. FIG. 1 conceptually illustrates a process for a trusted device to use secure ranging to modify a security state of a target device. The process 100 of some embodiments is performed by one of the target (e.g., the device whose security state is to be modified) and trusted (e.g., the device authorized to modify the security state) devices. In some embodiments, process 100 is initiated at a proxy device that assists the trusted and target devices to find each other. The initiating device (e.g., the target or trusted device) initiates the process 100 with a non-initiating device (e.g., the trusted or target device) to modify the security state of the target device.

In some embodiments, process 100 begins by initiating (at 105) the security state change for the target device. The initiation of the security state change of some embodiments is performed by the target device (i.e., the device that is to be unlocked), while in other embodiments, the state change is initiated by the trusted device. In some embodiments, the initiating device sends a request to the non-initiating device to initiate the security state change. In some embodiments, the security state change is initiated through explicit user interactions (e.g., keyboard input, voice commands, opening the lid of a laptop computer, etc.), while in other embodiments, the security state change is initiated through implicit interactions (e.g., moving within a discoverable range, changing the state at the initiating device from locked to unlocked, etc.) between the target and trusted devices. The explicit user interactions of some embodiments require a user to authenticate themselves with the device (e.g., via a password, biometric data (e.g., via a fingerprint sensor)). In some embodiments, the initiation of the security state change is initiated by other devices (e.g., location detection based on cameras and/or sensors), which communicate with the initiating device to begin the security state change.

After the process 100 initiates (at 105) the security state change, the process 100 establishes (at 110) an initial connection between the trusted and target devices. The initial connection of some embodiments uses a secure, standardized wireless protocol (e.g., Bluetooth) to discover the other device and establish the initial connection.

The process 100 of some embodiments uses the initial connection to exchange (at 115) ranging connection information (e.g., bootstrap information) used to set up a ranging connection (e.g., over WiFi) between the devices. At 120, the process 100 establishes a ranging connection between the trusted and target devices. In some embodiments, the ranging connection is a wireless channel that is used to exchange ranging information (e.g., through a series of ranging operations) in order to determine whether the target and trusted devices are within a particular range. The ranging connection of some embodiments is encrypted to protect the exchanged ranging information from potential attackers.

The process 100 performs (at 125) a ranging operation to capture a sample distance measurement between the trusted and target devices. In preferred embodiments, the process 100 uses several sample distance measurements to determine whether the devices are in range of each other, allowing for a more precise and secure determination of the proximity of the devices. At 130, the process 100 determines whether to capture more samples. When the process 100 determines (at 130) that more samples are needed, the process returns to step 110 to perform another ranging operation to capture another sample distance measurement.

In some embodiments, when the ranging operation is precise and secure enough, the process 100 only performs (at 125) a single ranging operation. For example, when the clocks of the trusted and target devices are synchronized, it may not be necessary to gather many samples. However, even in such cases, the capture of multiple samples may allow the devices to more precisely determine the distance between the devices. For example, in some embodiments, the use of multiple distance measurement samples can provide an accuracy of plus or minus a single meter.

When the process 100 determines (at 130) that no more samples are needed, the process 100 of some embodiments then performs a set of tests (e.g., as a part of a security protocol) to determine whether to authorize the change in security state of the target device. In some embodiments, the process 100 determines whether the devices are within range, whether one or both of the devices have received consent for the security state change, etc.

In this example, process 100 determines (at 135) whether the devices are within the desired range based on the captured sample distance measurements. In some embodiments, the multiple distance measurement samples are statistically analyzed to generate a composite distance measurement, which is then compared to the threshold distance. Alternatively, or conjunctively, the devices analyze the distance measurement samples to calculate a confidence level that the device is within a threshold distance. When the confidence level exceeds a threshold value, the devices are deemed to be within an acceptable range.

If a determination is made (at 135) that the devices are not within the desired range, the process ends. When the process 100 determines (at 135) that the devices are within the desired range, the process 100 determines (at 140) whether the user has indicated consent. For example, in some embodiments, process 100 provides a prompt for a user at one of the devices, requesting consent to modify the security state of the target device. User consent may be explicit (e.g., through direct user interaction) or implicit (e.g., trusted device is in an unlocked state). In some embodiments, the explicit consent requires simple approval (e.g., a response to a prompt), while in other embodiments the explicit consent requires authentication (e.g., passkey, biometric data (e.g., via a fingerprint sensor), etc.) of a user at a device.

In some preferred embodiments, such as when the initiation of the security state change is based on explicit input from the user (e.g., tapping at the target device), the initiation (at 105) of the security state change serves as consent for the initiating device. The process 100 then only determines (at 140) whether the user has indicated consent for the non-initiating device.

In some embodiments, process 100 determines (at 140) whether user consent is indicated for both the initiating device and the non-initiating device, after the ranging operations have completed. When explicit consent is required, determining consent after the ranging allows the security state change to seem more responsive as the ranging has already been completed before any user consent is requested.

However, when user consent is determined after the ranging operation and requires an explicit response from the user, it may be necessary to maintain a cached state for the ranging information (i.e., allowing the ranging decision to remain valid for a short window of time). In some embodiments, rather than checking for user consent after performing the ranging operations, process 100 checks for user consent before any of the ranging operations are performed. This allows the devices to avoid performing any unnecessary ranging operations.

Once the process 100 has determined (at 135 and 140) that the devices are within range and have obtained consent to exchange authorization information, the process 100 exchanges (at 145) the authorization information through a secured (e.g., encrypted) channel. The secured channel of some embodiments uses a highly-secured encryption key to encrypt communications in order to protect the authorization information. The authorization information (e.g., unlock information, security keys, payment data, etc.) is used to modify the security state at the target device. In some embodiments, the secured channel is established over the initial connection established at step 110. In other embodiments, the secured channel is established over a separate, different connection.

In some embodiments, the initial connection used for announcing and discovering the availability of a device, the ranging connection used for the ranging operations, and the connection used to communicate the authorization data are different and separate connections. For example, in some embodiments, the different connections use different protocols or different methods of communication (e.g., bands of a frequency spectrum, wireless protocols, etc.). For example, in some embodiments, the data communicated across a particular connection is actually sent through a separate band of a frequency spectrum or network (e.g., the Internet).

The different connections may provide different benefits. For example, in some embodiments, the initial connection uses a first wireless protocol to provide ease of discovery and reduced power requirements, while the ranging connection uses a second wireless protocol for the precision of the wireless frequency and security features.

Figure 2:
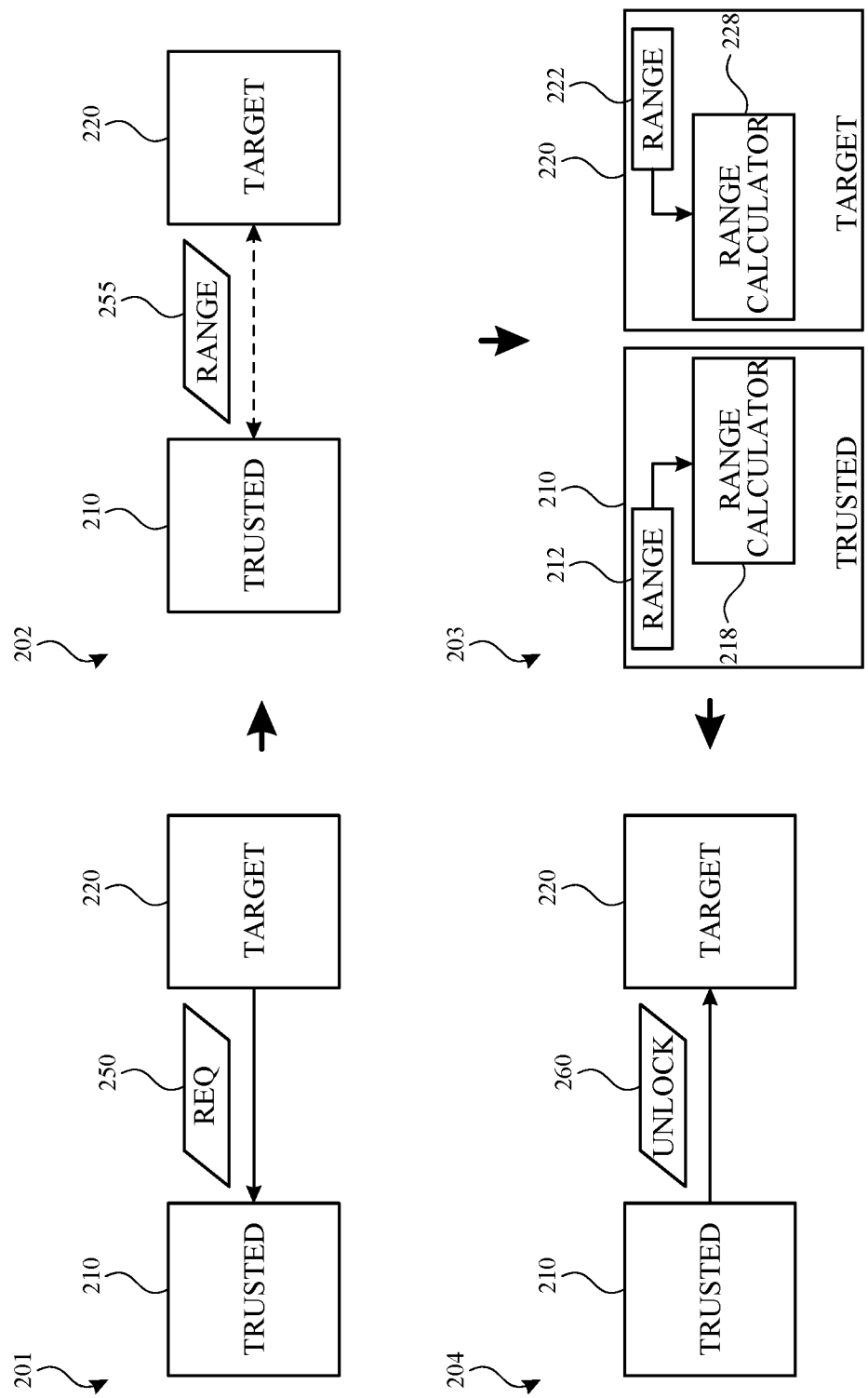
FIG. 2 illustrates an example of using secure ranging with a trusted device to modify the security state of a target device.

FIG. 2 illustrates an example of using secure ranging with a trusted device to modify the security state of a target device. The first stage 201 shows a trusted device 210 (e.g., a smart watch, wearable device (e.g., head-mounted, arm mounted, waist mounted, ear mounted, chest mounted, and the like), mobile phone, wireless headset, tablet, etc.) and a target device 220 (e.g., a laptop computer, mobile phone, tablet, etc.). The trusted device 210 of some embodiments is a device that is authorized to make changes in the security state of target device 220. In the first stage 201, target device 220 sends request 250 to the trusted device 210 over an initial connection (indicated with a solid line). The request 250 of some embodiments is sent when the user initiates the security process (either explicitly or implicitly) from the target device 220. In some embodiments, the request 250 includes bootstrap information to set up a ranging connection used for exchanging ranging information.

In the second stage 202, a ranging connection (depicted with a dashed line) has been set up between the trusted and target devices 210 and 220. The second stage 202 also shows that ranging information 255 is exchanged between the devices over the ranging connection. The ranging information 255 allows one or both of the devices 210 and 220 to compute the distance between the two devices. In some embodiments, the ranging information includes multiple sample distance measurements that are further analyzed to determine the distance between the two devices.

The third stage 203 shows that both the target device 220 and the trusted device 210 use range calculators 228 and 218 to analyze the exchanged ranging information 222 and 212. In some embodiments, the trusted and target devices determine whether to continue with the security state change operation based on the calculated ranges. The exchange of the ranging information 255 and the range calculations are described in further detail below.

The fourth stage 204 shows that the trusted device 210, after determining that the devices are within an acceptable range, sends unlock key 260. The unlock key 260 of some embodiments is used to unlock the target device 220. Various examples in this application are described with reference to an unlocking operation with an unlock key, but it should be understood by one skilled in the art that the novelty of the subject technology is not limited to such an unlocking operation. The unlocking operation may refer to any shift in security state at a target device, based on a relationship with a trusted device. In addition, although the authorization information is sometimes referred to as a key, the authorization information may include various different types of information. The authorization information of some embodiments is a key used to decrypt information (e.g., sensitive information, a master key, etc.) stored on the target device, while in other embodiments the authorization information is encrypted sensitive data (e.g., payment information, user data, etc.). This allows the sensitive information to only be stored on the trusted device and only provided to the target device when the trusted device is within range.

In some embodiments, rather than unlocking the device, the operation moves the target device from a high-level security state to a lower-level security state. In some cases, the target device remains locked during the shift, but the lower-level security state provides additional access to information on the target device. For example, in some embodiments, the target device provides minimal notifications on a lock screen (i.e., the displayed screen when the device is locked) in the higher-level security state, where any potentially sensitive information is hidden until the device is unlocked. By shifting to the lower-level security state (e.g., in the presence of a trusted device), the target device of some embodiments provides a user of the target device with access to more sensitive information for the notifications (e.g., text excerpts, senders, etc.).

In other embodiments, rather than providing additional information in a locked state, the different security states allow a trusted device to lower the security requirements for accessing the target device. For example, in some embodiments, a target device that normally requires an alphanumeric password can be configured to require a simpler pin code. In some embodiments, even when the target device is already unlocked, the trusted device and the security state shift are used to provide access to an application or to sensitive data within an application (e.g., browser histories, auto-fill data, credit card information, etc.) when the trusted device is within the particular range.

In some embodiments, the shift in security state can be initiated by either the target device or the trusted device. In order to perform ranging operations to authenticate the devices, the shift of some embodiments begins by using an initial connection to establish a ranging connection. The initial connection of some embodiments is a secure, standardized wireless connection method (e.g., Bluetooth pairing) that is ubiquitous and efficient. The established initial connection is then used to exchange ranging connection information, which is used to establish a ranging connection. In some embodiments, the ranging connection is used to exchange ranging information to determine whether the target and trusted devices are within a particular range.

Figure 3:
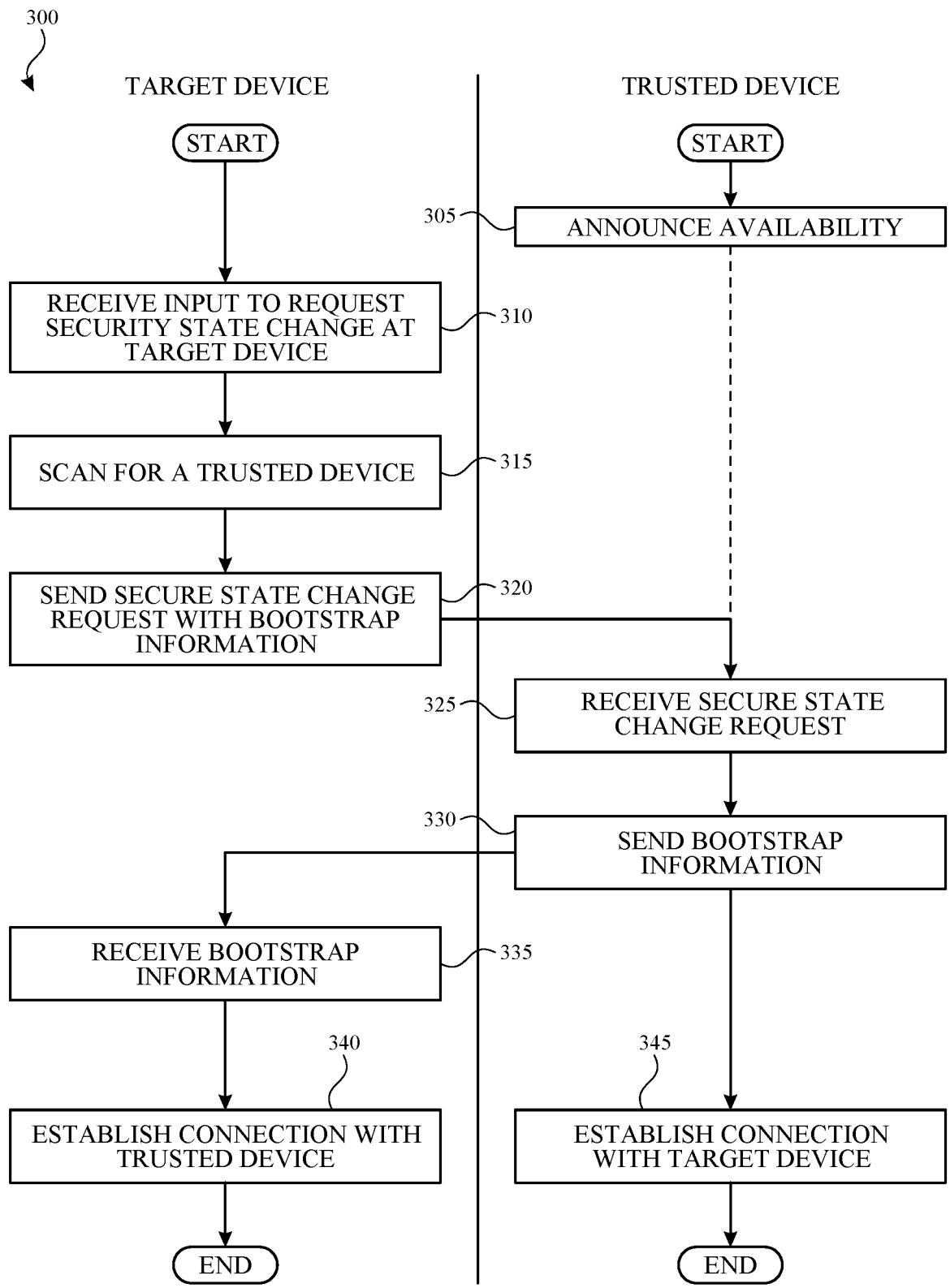
FIG. 3 conceptually illustrates a process for a target device that establishes a connection with a trusted device.

FIG. 3 conceptually illustrates a process for a target device that establishes a ranging connection with a trusted device. The process 300 begins with a trusted device that announces (at 305) its availability. The process 300 of some embodiments announce the availability of a device by broadcasting the trusted device's identifier, which allows the target device to determine whether it can modify the security state of the trusted device.

The target device then optionally receives (at 310) input (explicitly or implicitly) to request the security state change. As described above, in some embodiments, the request (or consent) for the security state change is not obtained until after the ranging connection is established and the ranging operation is completed.

The target device then scans (at 315) for the trusted device. Once the target device has identified the trusted device from the scan, it sends (at 320) a request for authorization information that allows the target device to modify its security state (e.g., unlock, change in security state, etc.). In some embodiments, the target device also sends (at 320) bootstrap information to set up the ranging connection for performing ranging operations between the target and trusted devices. The trusted device receives (at 325) the secure state change request along with the bootstrap information and sends (at 330) bootstrap information back to the target device. In some embodiments, the bootstrap information includes state information (e.g., available bands of a wireless frequency spectrum) for each device.

At 335, the target device receives the bootstrap information of the trusted device. The target and trusted devices then establish (at 340 and 345) the ranging connection between the devices. The ranging connection is then used for the ranging process, as described in further detail below.

Figure 4:
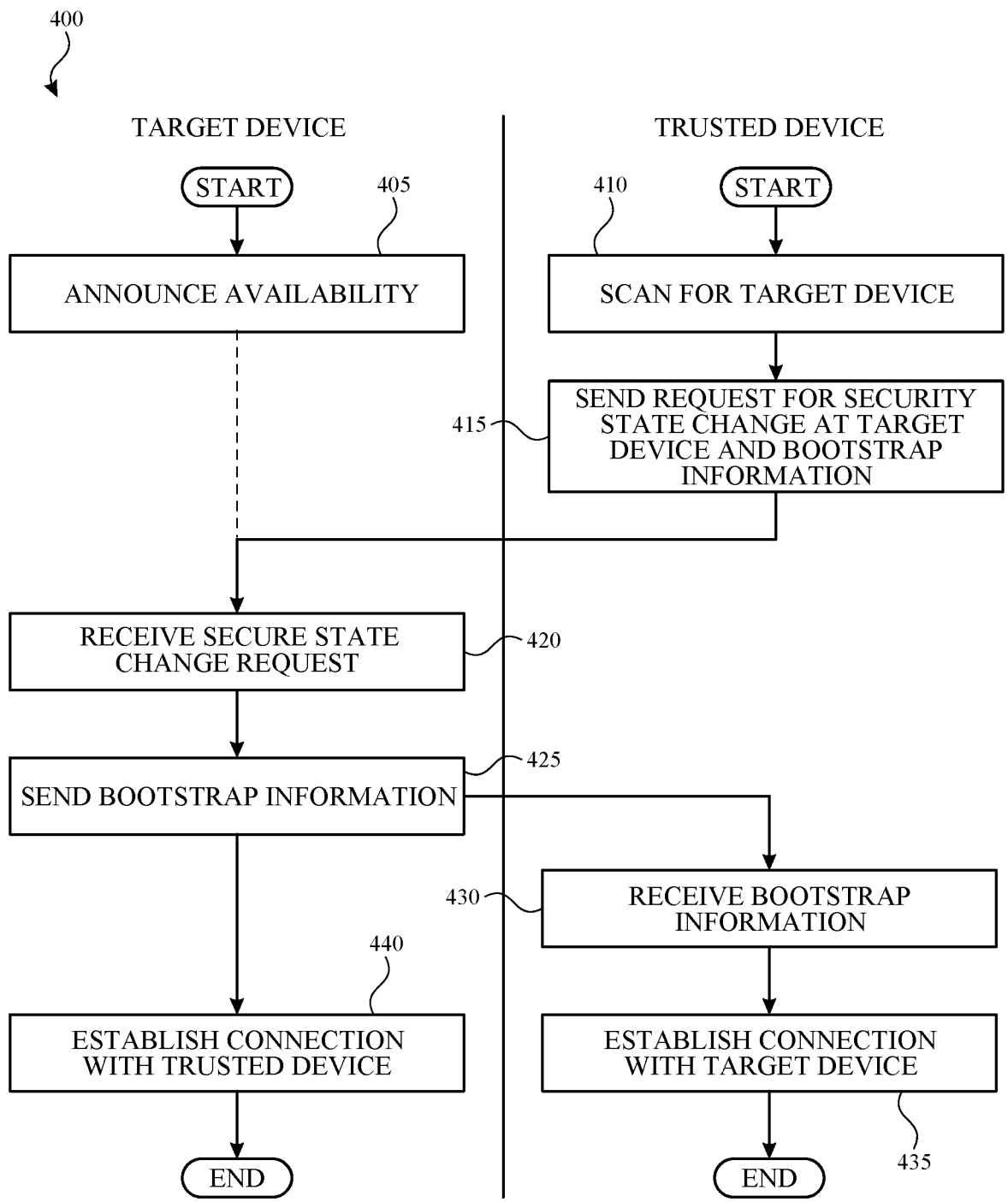
FIG. 4 conceptually illustrates a process for a trusted device that establishes a connection with a target device.

FIG. 4 conceptually illustrates a process for a trusted device that establishes a ranging connection with a target device. The process 400 begins with a target device that announces (at 405) its availability. The process 400 of some embodiments announce the availability of a device by broadcasting the target device's identifier, which allows the trusted device to determine whether it can modify the security state of the target device.

The trusted device then scans (at 410) for the target device. Once the trusted device has identified the target device from the scan, it sends (at 415) a request for a security state change (e.g., unlock, change in security levels, etc.) at the target device. In some embodiments, the trusted device also sends (at 415) bootstrap information to set up a ranging connection for performing ranging operations between the trusted and target devices. The target device receives (at 420) the secure state change request along with the bootstrap information and sends (at 425) bootstrap information back to the trusted device. In some embodiments, the bootstrap information includes state information (e.g., available bands of a wireless frequency spectrum) for each device.

At 430, the trusted device receives the bootstrap information of the target device. The trusted and target devices then establish (at 435 and 440) the ranging connection between the devices. The ranging connection is then used for the ranging process, as described in further detail below.

FIGS. 5 and 6 illustrate examples of initiating the ranging connection from the target and trusted devices respectively. FIG. 5 illustrates an example of a target device that establishes a connection with a trusted device in two stages 501 and 502. The first stage 501 shows a laptop computer 510 (i.e., target device) and a watch 520 (i.e., trusted device). In the first stage 501, the watch 520 is shown announcing its availability. The first stage 501 also shows that a user provides input (e.g., tapping a key, opening the lid of the laptop computer 510, etc.) to initiate a ranging process. The second stage 502 shows that the devices have established (through processes such as those described above with reference to FIGS. 3 and 4) a wireless ranging connection.

FIG. 6 illustrates an example of a trusted device that establishes a ranging connection with a target device in two stages 601 and 602. The example of this figure shows the laptop computer 510 (i.e., target device) and watch 520 (i.e., trusted device) of FIG. 5. In this example, rather than the watch 520, the laptop computer 510 announces its availability. Also, rather than receiving input from a user, the watch 520 does not receive any input, but rather moves closer to the laptop computer 510. The second stage 602 shows that the wireless ranging connection has been established (through processes such as those described above with reference to FIGS. 3 and 4).

In some embodiments, continuously announcing the availability of a trusted device requires significant power from the trusted device. In some embodiments, the initial connection (and the announcing of the availability of the trusted device) are assisted using a proxy device, which may be more suited for continuously announcing the availability of the trusted device.

Figure 7:
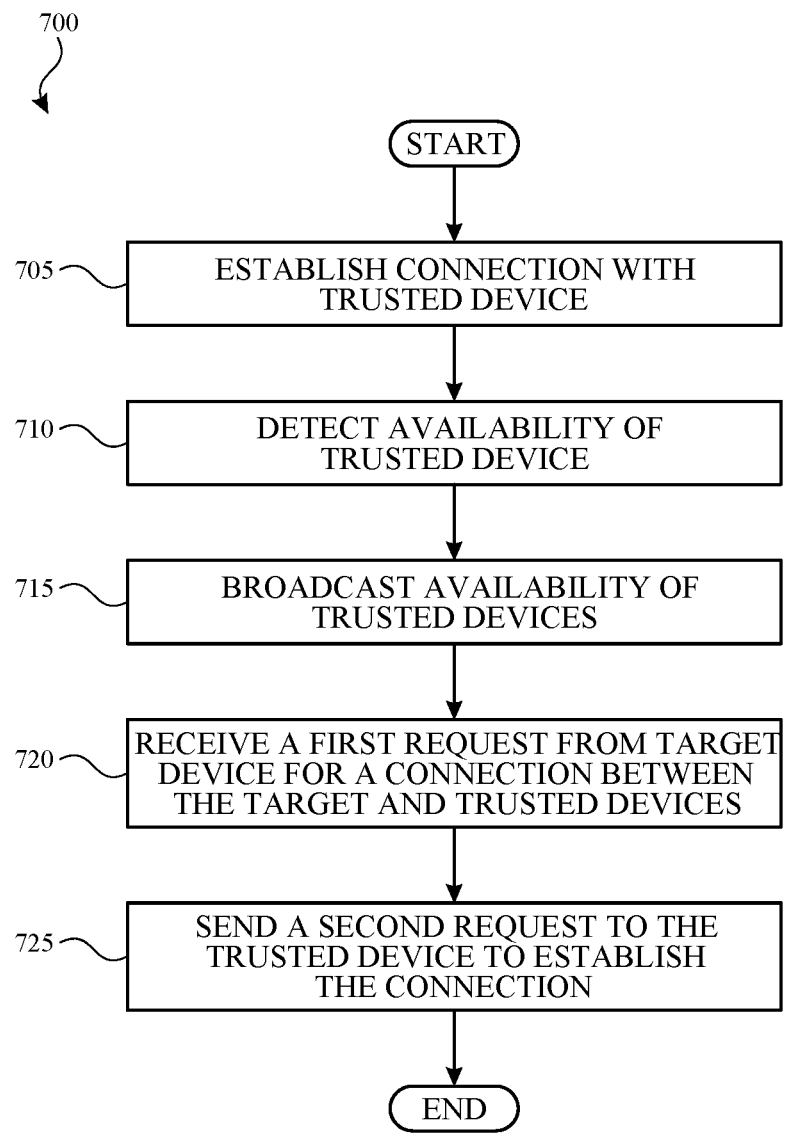
FIG. 7 conceptually illustrates a process for a proxy device that assists in establishing a connection between a target device and a trusted device.

FIG. 7 conceptually illustrates a process for a proxy device that assists in establishing the initial connection between a target device and a trusted device. The process 700 begins by establishing (at 705) a connection with the trusted device. This connection is different from the initial connection described in the examples above, as this connection is between the proxy device and the trusted device, while the initial connection is a connection between the trusted device and the target device. The process of this figure is used to prepare the target and trusted devices to set up the initial connection. The connection between the proxy device and the trusted device of some embodiments is a long-lived connection that is maintained for continuous communications between the devices. For example, in some embodiments, the connection is a Bluetooth connection (or channel) between a mobile phone and a watch, where the connection is maintained for communications between the devices for as long as the devices remain within range of each other.

The process 700 then detects (at 710) the availability of the trusted device. In some embodiments, the process 700 merely detects whether the connection with the device is still active, while in other embodiments, the process 700 detects additional information, such as a security state (e.g., locked, unlocked, authorized, etc.). Once the process 700 determines that the trusted device is available, the process 700 broadcasts (at 715) the availability of the trusted device so that a target device can identify the availability of the trusted device. The process 700 then receives (at 720) a first request from the target device for a connection between the target and trusted devices.

The process 700 then sends (at 725) a second request to the trusted device to establish the initial connection, as described above with reference to FIGS. 1 and 2. In some embodiments, second request is a request to have the trusted device begin broadcasting its own availability for a short period of time. In other embodiments, the proxy device forwards the first request (with or without any bootstrap information) to the trusted device. The trusted device of some such embodiments initiates the connection with the target device, either using the bootstrap information of the second request, or by broadcasting its own availability. Although this example describes the process for a proxy of a trusted device, it should be understood that a similar process would apply for a proxy of the target device.

Figure 8:
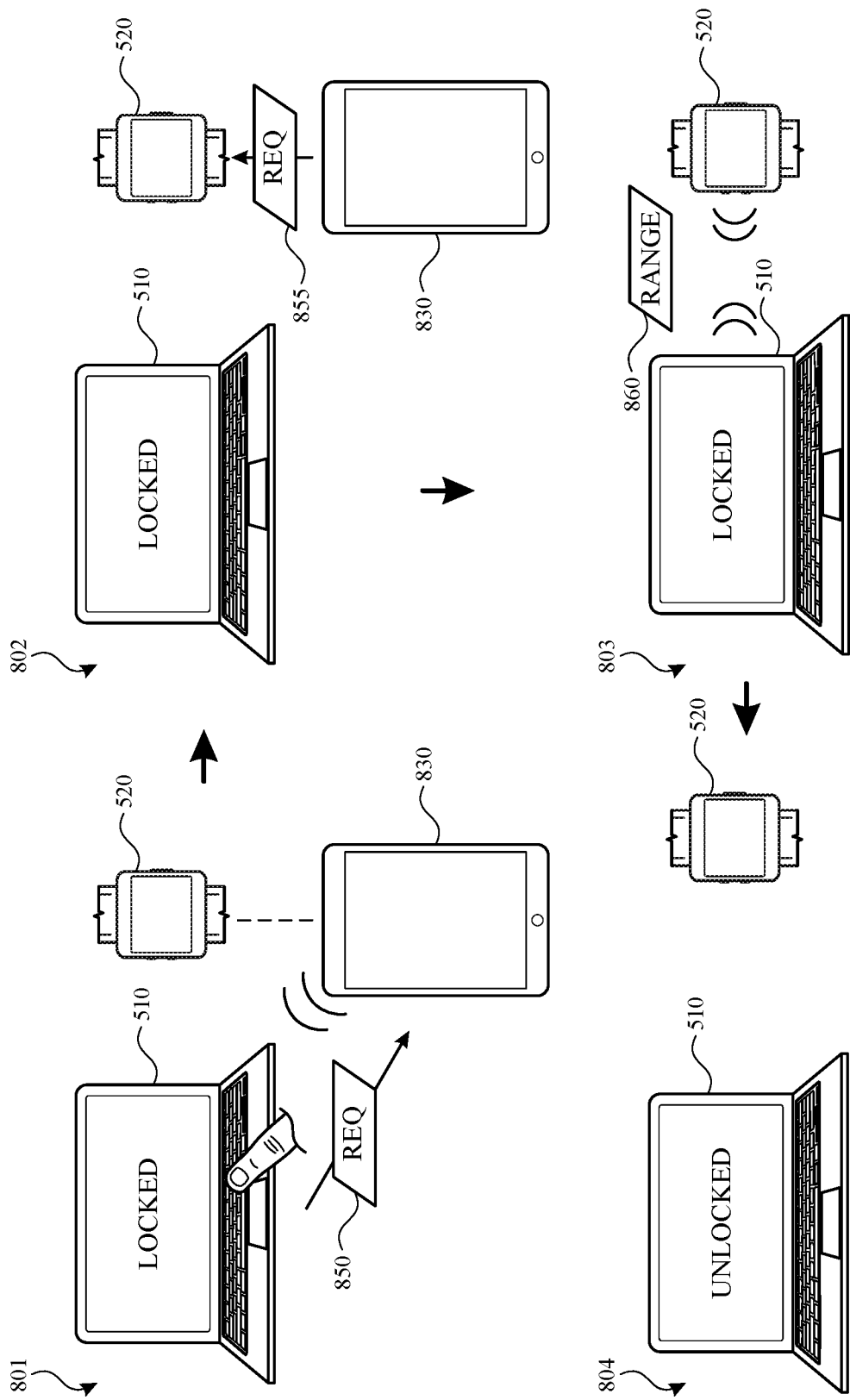
FIG. 8 illustrates an example of a proxy device that assists in establishing a connection between a target device and a trusted device.

FIG. 8 illustrates an example of a proxy device that assists in establishing a connection between a target device and a trusted device. The first stage 801 shows the target device 510 and trusted device 520 of FIG. 5. This example also shows a proxy device 830. In this example, the target device 510 is a laptop computer, the trusted device 520 is a watch, and the proxy device 830 is a mobile phone. The first stage 801 also shows that trusted device 520 and proxy device 830 maintain a connection (indicated by a dashed line). In this example, rather than the target or trusted devices announcing their availability, the proxy device 830 announces the availability of the trusted device 520.

The first stage 801 also shows that the user initiates the unlock operation, sending a request 850 to the proxy device 830. In the second stage 802, the proxy device 830 sends another request 855 to the device. In some embodiments, the request 855 is used to have the trusted device begin announcing its availability for a short period of time, while in other embodiments, the request 855 includes information that the trusted device needs to establish the ranging connection with the target device 510.

The third stage 803 shows that a ranging connection has been established between the target device 510 and the trusted device 520. The third stage 803 also shows that devices exchange range data 860 as part of a ranging process. The ranging process is described in further detail below with reference to FIGS. 9-12. Finally, in the fourth stage 804, the target device 510 determines that the trusted device 520 is within the acceptable range, and has been unlocked. A secure method for determining that the devices are with the acceptable range is described below.

In some embodiments, the target and trusted devices use a secure ranging operation to determine whether the devices are within a desired range. The ranging operation needs to be secured to prevent an attacker from spoofing the devices to make them appear closer than they really are. The security protocols of some embodiments use messages to provide secure ranging information between a trusted device and a target device, allowing the devices to determine whether they are within a specified range of each other before allowing the trusted device to unlock the target device.

Figure 9:
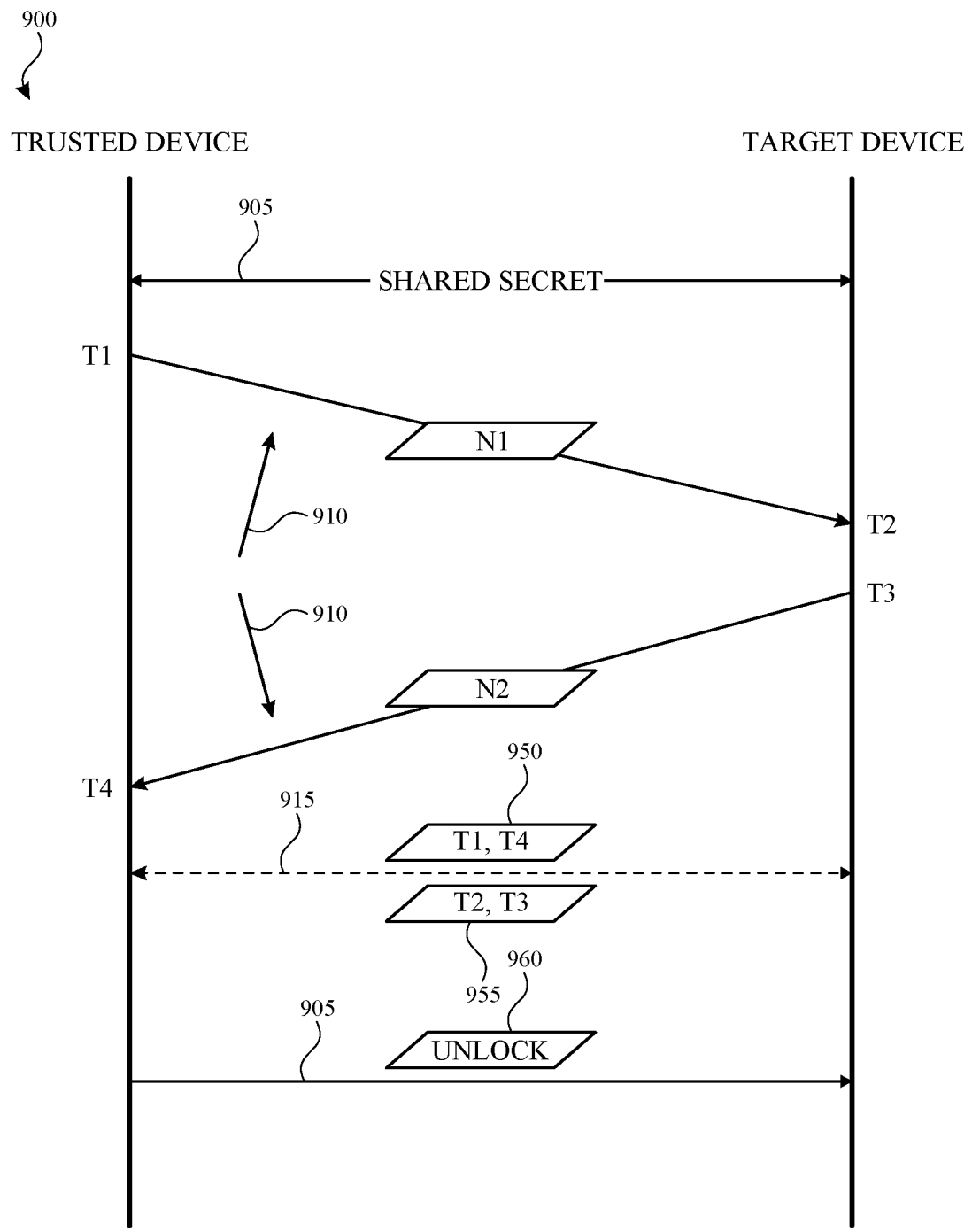
FIG. 9 illustrates a sequence diagram for providing secure ranging when unlocking a target device from a trusted device.

FIG. 9 illustrates a sequence diagram that describes an overview for providing secure ranging when unlocking a target device from a trusted device. A more in-depth description of the various elements and steps for providing secure ranging are described with reference to FIGS. 10-12. The sequence 900 of this figure illustrates a sequence of communications between a trusted device and a target device. The sequence 900 begins by establishing a shared secret channel 905 (e.g., encrypted using cryptographic keys) between the trusted device and the target device.

Once the shared secret channel 905 has been established, the sequence 900 shows that the trusted device sends a message (e.g., a nonce or other short-lived token) N1 to the target device. The target device processes N1, verifying that the value of N1 is the value that the target expected to receive from the trusted device. The target device may also decrypt the signal or perform other operations (e.g., Fourier transformations) on the received message. The target device then responds by sending a second different nonce, N2, back to the trusted device at time T3.

For the exchanges of the nonces, sequence 900 also shows the times at which the nonces N1 and N2 are sent and received. More specifically, nonce N1 is sent by the trusted device at time T1 and received by the target device at time T2. Nonce N2 is sent by the target device at time T3 and received by the trusted device at time T4. In some embodiments, the trusted and target devices record timestamps when the nonces N1 and N2 are sent and received by each device.

In some embodiments, a particular nonce is received at multiple times at the receiving device. This may occur when a wireless signal is reflected off of other surfaces or around obstructions. A signal may lose strength as it travels through an obstruction (e.g., a wall), while a reflected signal is largely unimpeded. In such a case, the strongest signal to a device is not necessarily the first signal that is received at the device. However, in order to get the most accurate determination of the proximity of a device, the receiving devices of some embodiments identify a timestamp for the first received signal, rather than the strongest signal.

The devices then exchange the timestamps recorded at each device in order to calculate the time of flight for the nonces N1 and N2 between the devices. The trusted device sends timestamps T1 and T4 to the target, while target sends timestamps T2 and T3 back to the trusted device. Although in this example the timestamps are exchanged in a single operation after the exchange of the nonces, some embodiments send the timestamps to the other device as soon as they are recorded. For example, in some embodiments, the target sends timestamp T2 back to the trusted device before sending nonce N2.

The trusted device and the target device then verify the exchanged timestamps to determine whether the devices are within a certain proximity of each other and whether the exchanged timestamps can be trusted. In some embodiments, only one of the devices performs the verification process. However, in preferred embodiments, both the trusted device and the target perform the verification process before allowing the target device to be unlocked.

Once the trusted device determines that the target device is within the required proximity, sequence 900 shows that trusted device sends an unlock message 960 to the target device over the shared secret channel 905. The unlock message 960 allows the target device to be unlocked.

In some embodiments, the unlock message 960 is a secret that is shared with the trusted device during a pairing operation or an authorization operation in which the trusted device is granted the authority to unlock the target device. In some such embodiments, the unlock message 960 of some embodiments is a key that was sent to the trusted device during the pairing operation by the target device. In some embodiments, the master key is derived by the target device from a passcode (or other authentication information) that is used to unlock the target device. The target device can build a token by encrypting the master key with the unlock message, so that when the trusted device returns the unlock message (after the secure ranging operation) to the target device, the target device can use the unlock message to decrypt the token to retrieve the master key and unlock the target device. Using a device to unlock another device is further described in U.S. patent application Ser. No. 14/810,395, entitled "Method of Using One Device to Unlock Another Device", filed on Jul. 27, 2015. U.S. patent application Ser. No. 14/810,395 is incorporated herein by reference.

In the sequence 900, various channels are shown (as bold, solid, and dashed lines) for transmitting the different types of ranging data (e.g., timestamps, nonces, unlock codes, etc.). In some embodiments, different channels may use a different cryptographic keys for encrypting communications on the channel, while some channels may use no key at all. In some embodiments, each of the channels operates over multiple different connections. In some embodiments, multiple different channels are used for the ranging process.

For example, the process of some embodiments uses the high-security shared secret channel 905 to communicate the unlock message 960, but uses a separate ranging channel 915 based on a key derived from the shared secret to communicate the timestamps for the different nonces. The ranging channel 915 of some embodiments is a secured channel established over the established ranging connections described above. In some embodiments, the unlock message 960 and the timestamps 950 and 955 are sent through the same channel.

The nonces in some embodiments are sent through the ranging channel 915 (i.e., encrypted with the derived key), while in other embodiments the nonces are sent unencrypted through the air through a particular connection 910 (e.g., a particular band of radio frequencies). In some embodiments, the particular connection 910 is a high-frequency connection that allows for a precise determination of the proximity of the devices.

Figure 10A:
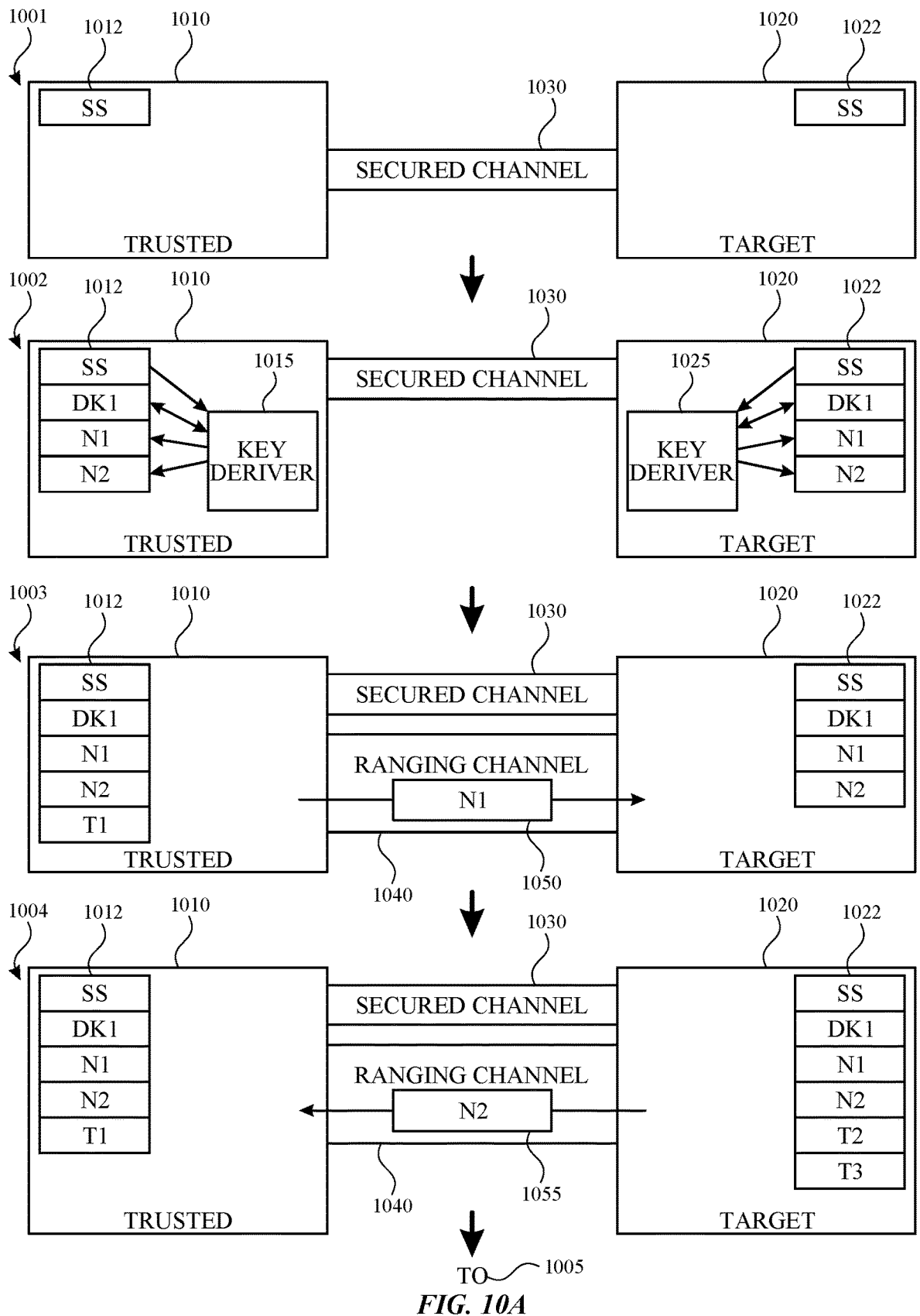
FIGS. 10A-B illustrates an example of providing secure ranging when unlocking a target device from a trusted device.
Figure 10B:
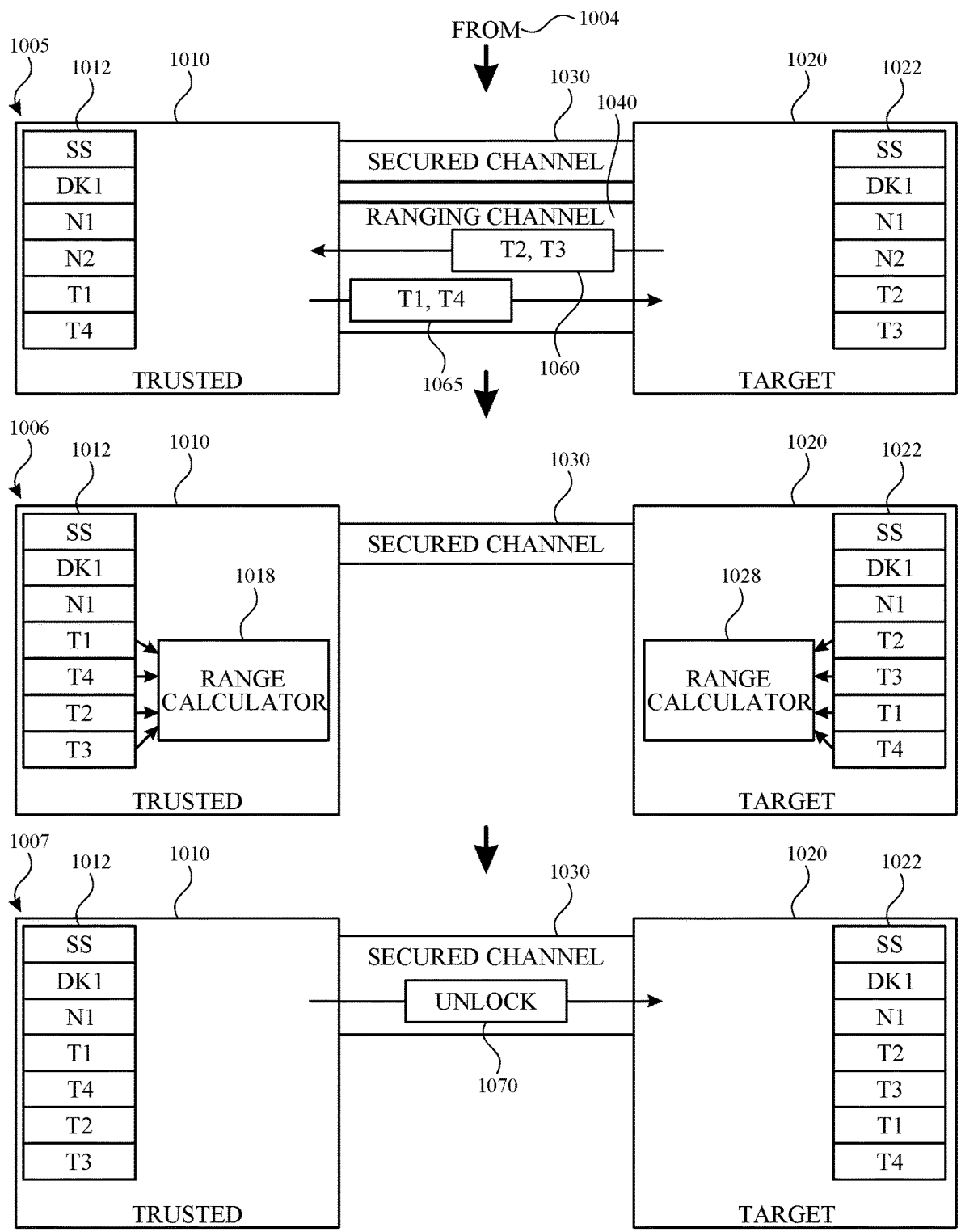

FIGS. 10A-B illustrates an example of providing secure ranging when unlocking (or otherwise modifying the security state of) a target device from a trusted device in seven stages 1001-1007. The first stage 1001 shows a trusted device 1010 and a target device 1020. The devices 1010 and 1020 are connected with a secured channel 1030. In this example, secured channel 1030 represents communications between the devices that are encrypted with a shared secret SS that is shared between the devices. Accordingly, the SS is stored in a memory 1012 of the trusted device 1010 and in a memory 1022 of the target device 1020.

In some embodiments, the shared secret is a highly secured system secret that is used to protect highly sensitive data that is communicated between the trusted devices 1010 and 1020. For example, some embodiments provide a secure enclave processor (SEP) within the processor architecture that provides heightened levels of security for the sensitive data in a segregated and secure area of the hardware and/or software of the devices. In order to maintain the security of the system secret, the ranging data used for the ranging operation of some embodiments does not use the shared secret directly (i.e., is not sent through secured channel 1030), but rather uses the shared secret to generate (e.g., through derivation functions) other shared values that is used for encrypting and verifying the sources of the ranging data.

In some embodiments, the shared secret for the secured channel 1030 is shared between the devices by performing a secure secret sharing operation over an unsecured channel. For example, the method of some embodiments uses a Diffie-Hellman exchange to provide for secure and ephemeral shared secrets between the devices. In other embodiments, the shared secret and/or the various shared values (e.g., shared secret, derived key, messages, etc.) are shared between the devices through a cloud service (e.g., iCloud). The cloud service of some embodiments is associated with a user account that is associated with various devices. The cloud service of some embodiments is then used to share the different shared values for the associated devices. The use of the cloud service to share secrets will be further described below.

The second stage 1002 shows devices 1010 and 1020 with key derivers 1015 and 1025 respectively. The key derivers of some embodiments represents a module that, given a common input, generates another pseudo-random key or value (e.g., using a key derivation function). In some embodiments, the key derivers apply a one-way function to the input, which cannot be undone to reveal the original input.

In the second stage 1002, key derivers 1015 and 1025 each take the shared secret as input and generate a derived key DK1. Because key derivers 1015 and 1025 use the same derivation function at both devices 1010 and 1020, the same derived key DK1 is stored at both devices. In this manner, shared values can be generated at each of the devices without having to send them between the devices.

In some embodiments, in addition to the derived key, the key derivers 1015 and 1025 are used to derive nonces N1 and N2. In some embodiments, the key deriver only uses the shared secret for deriving the derived key, and any other values (e.g., the nonces) are then derived from the derived key DK1. In some embodiments, however, the nonces are derived directly from the shared secret SS. In order to ensure that the packets are not captured and replayed, some embodiments use different derivation functions to generate the different nonces. In this way, the nonces cannot be predicted by an attacker, so the attacker cannot generate a false ranging signal.

Nonces N1 and N2 of some embodiments are sent on a signal that is transmitted between the devices. In some embodiments, nonces N1 and N2 are used by the receiving device to verify that the sender of the nonce is a trusted partner for the communication. An attacker would not be able to independently generate nonces N1 and N2 without access to the high security shared secret. Although this example shows that the key derivers 1015 and 1025 derive the derived key DK1 and nonces N1 and N2 in a single step, the key derivers of some embodiments generate the derived key and nonces as they are needed (e.g., for encrypting, sending, verifying, etc.).

The third stage 1003 shows that the derived key DK1 is used to set up a ranging channel 1040. The ranging channel of some embodiments is used to send various data (e.g., nonces, timestamps, etc.) used for the ranging operation between the devices. Trusted device 1010 sends a nonce N1 1050 to the target device 1020 through the ranging channel 1040. The trusted device 1010 also records a timestamp T1 at the time when the nonce N1 is sent.

In this example, the nonce is shown as being sent over the ranging channel (i.e., encrypted with the derived key DK1), however, in some embodiments the nonces are sent unencrypted through the air at a particular frequency that is set apart for communication between the devices. In some such embodiments, the signal is a calibration signal that is used to set up communication (direction, band, etc.) between the devices and the nonce (e.g., a 53-bit nonce) is encoded in a frequency shape that can be analyzed and decoded. The encoded signal represents an accumulation of sine waves which the receiver can analyze (e.g., using Fourier transforms) to retrieve the nonce as a binary output.

In the fourth stage 1004, target device 1020 has received and verified nonce N1 against the nonce N1 derived with key deriver 1025 and stored at memory 1022 of the target device 1020. In addition, target device 1020 records timestamps T2 and T3. Timestamp T2 marks the time when N1 is received at target device 1020, while timestamp T3 marks the time when N2 1055 is sent from the target device 1020 to the trusted device 1010. In this example, nonce N2 was derived with nonce N1 and the derived key DK1, but in some embodiments, the nonce N2 is not derived until the nonce N1 received from the trusted device 1010 is verified.

The fifth stage 1005 shows that the devices 1010 and 1020 exchange the timestamps T1-T4 through the ranging channel 1040. Trusted device 1010 sends timestamps T1 and T4 1065 (the times when N1 was sent and N2 was received) to the target device 1020. Target device 1020 sends timestamps T2 and T3 1060 (the times when nonce N1 was received and nonce N2 was sent) to the trusted device 1010.

The sixth stage 1006 shows that devices 1010 and 1020 use the timestamps T1-T4 to calculate the range or proximity of the devices to each other. The devices of some embodiments then use the timestamps to calculate the distances between the devices, determining whether the devices are within a desired proximity of each other. For example, in some embodiments, the messages are sent through the air via radio waves which travel at the speed of light. The devices of some such embodiments calculate the distance between the two devices based on how long it takes for a message to travel between the devices (e.g., the time between the sending and receiving of the message) and the speed of light. In some embodiments, one or more of the range calculators 1018, 1028 calculates the ranges for nonces N1 and N2 as:

$$\text{range}(N1)=(T2-T1)*c \text{ and}$$

$$\text{range}(N2)=(T4-T3)*c,$$

where c is the speed of light

In some embodiments, one or more of the range calculators 1018, 1028 calculates the range of both nonces N1 and N2 and determines whether the other device is in range based on the minimum range value. In other embodiments, one or more of the range calculators 1018, 1028 uses the maximum range value or an average range value when determining whether the devices are within a desired proximity. In some embodiments, one or more of the range calculators 1018, 1028 calculates the range based on the times measured at each device. For example, in some embodiments, one or more of the range calculators 1018, 1028 calculates the range between the devices as:

$$\text{range}=\tfrac{1}{2}((t4-t1)-(t3-t2))*c,$$

where c is the speed of light

By employing such a ranging technique, a common time base is not required because (t4−t1) and (t3−t2) can be measured independently at each device using its own local time base. That is, the two clocks need not be synchronized.

However, in some embodiments, the range calculation further calculates a ratio of Responder frequency to Initiator frequency (rRI) to get better precision for the range calculations by identifying an offset of the communicating frequency between the two devices. One or more of the range calculators 1018, 1028 of such embodiments calculates the time of flight between the devices as:

$$\text{Time of flight}=\tfrac{1}{2}((t4-t1)-(t3-t2))*rRI$$

The rRI is used because an offset may result from minor manufacturing variances (within manufacturing tolerances) in the devices and may cause the devices to miscalculate the actual distances between the devices. Some embodiments calculate the rRI by comparing a received signal with a local signal to identify any offset. However, when the rRI is used to calculate the range, an active relay-and-repeat man in the middle (MITM) attack can sample all protocol packets and ranging waveforms transmitted by one of the devices and repeat them at a slower frequency to the other authentic device. This introduces an artificial increase in the rRI, which can cause the devices to appear to be closer to each other than they actually are. Accordingly, in some embodiments, the range calculator ensures that rRI is within a particular range (e.g., within a reasonable tolerance range for manufacturing variances). In other embodiments, the range calculator limits the time (t3–t2) which limits the amount of TOF gain that an attacker can capture using such an attack.

In some implementations, a likelihood ratio (or, e.g., a log-likelihood ratio) test is employed. Such a test uses models for two possible cases of a distribution of ranges: one set of ranges that correspond to the device being unlocked, and one set of ranges that correspond to the device remaining locked. The likelihood ratio computes the ratio of the composite probabilities of being either inside or outside of a proximity based on an input set of ranges (e.g., the range measurements) and the modeled distributions. The ratio may then be compared to a threshold to determine the result of the unlock decision. In such implementations, the distance between the two devices may not be directly computed. As such, the threshold may not be presented in terms of a distance. Determining whether devices are within range based on wireless signals is further described in U.S. patent application Ser. No. 15/272,892, entitled "Unlocking a Device." U.S. patent application Ser. No. 15/272,892 is incorporated herein by reference.

In some embodiments, in addition to verifying that the timestamps indicate that the devices are within the desired proximity, the method also performs other verification operations to prevent an attacker from spoofing the location of one or both devices. For example, in some embodiments, the method enforces a constraint on the time between the receipt of a first message at the target device (T2) and the sending of a second message from the target device (T3). The constraint ensures that the time between the receipt of the first message and the sending of the second message is too short to allow an attacker to use replay attacks that take advantage of clock drift to make the devices appear to be closer together than they really are. In some embodiments, the constraint is a percentage of the required accuracy of the clock frequency for the communicated signals to be communicated between the devices.

Finally, the seventh stage 1007 shows that trusted device 1010 sends an unlock record 1070 through the secured channel 1030. The unlock record 1070 is a secret or a key that can be used to securely recover (e.g., decrypt) a master key at the target device. The master key of some embodiments is used by the target device 1020 to unlock other keys and secure data that can be used to unlock and provide access to the target device 1020. The unlock record 1070 of some embodiments is generated by the target device 1020 and sent to the trusted device 1010 during a pairing or authorization process used for authorizing the trusted device to unlock the target device.

As mentioned above, the shared secret and/or the various shared values in some embodiments are shared between the devices through a cloud service (e.g., iCloud). For example, in some embodiments, both the trusted device (e.g., the watch) and the target device (e.g., the computer) are associated with a cloud-based storage account (e.g., an iCloud account). Using two factor authorization (TFA), each of these devices places its public Auto Unlock Identity into a cloud-synchronized keychain. When the trusted device is provisioned (i.e., is enabled) for unlocking the target device, a secure link is established by using the Auto Unlock Identities. The target device creates a random one-time use unlock secret and transmits it to the trusted device over the link. The secret is stored on the trusted device and can only be accessed when the trusted device is unlocked. In some embodiments, the user's password is neither the master entropy nor the new secret.

During an unlock operation, the target device uses Bluetooth Low Energy to create a connection to the trusted device. A secure link is then established between the two devices using the shared keys used when the trusted device was first provisioned (i.e., enabled) for unlocking the target device. The two devices then use peer-to-peer Wi-Fi and a secure key derived from the secure link to determine the distance between the two devices. If the devices are within range, the secure link is then used to transfer the pre-shared secret to unlock the target device. After successful unlock, the target device replaces the current unlock secret with a new one-time use unlock secret and transmits the new unlock secret to the trusted device over the link.

Many of the examples described in this application make use of derived keys and nonces. Such derivations allow for a more secure and efficient process, but are not required for the subject technology. In some embodiments, the nonces are not derived from a key, but rather are shared by one of the devices with the other device. For example, in some embodiments, the nonces are shared through a cloud storage based on a common user account that is associated with both devices. In other embodiments, the nonces are shared between the devices over the secured channel, prior to the ranging operation. Similarly, the derived key for the ranging channel in the examples above does not have to be derived from the shared secret, but can be shared through other means (e.g., Diffie-Hellman) or may use no key at all.

Figure 11:
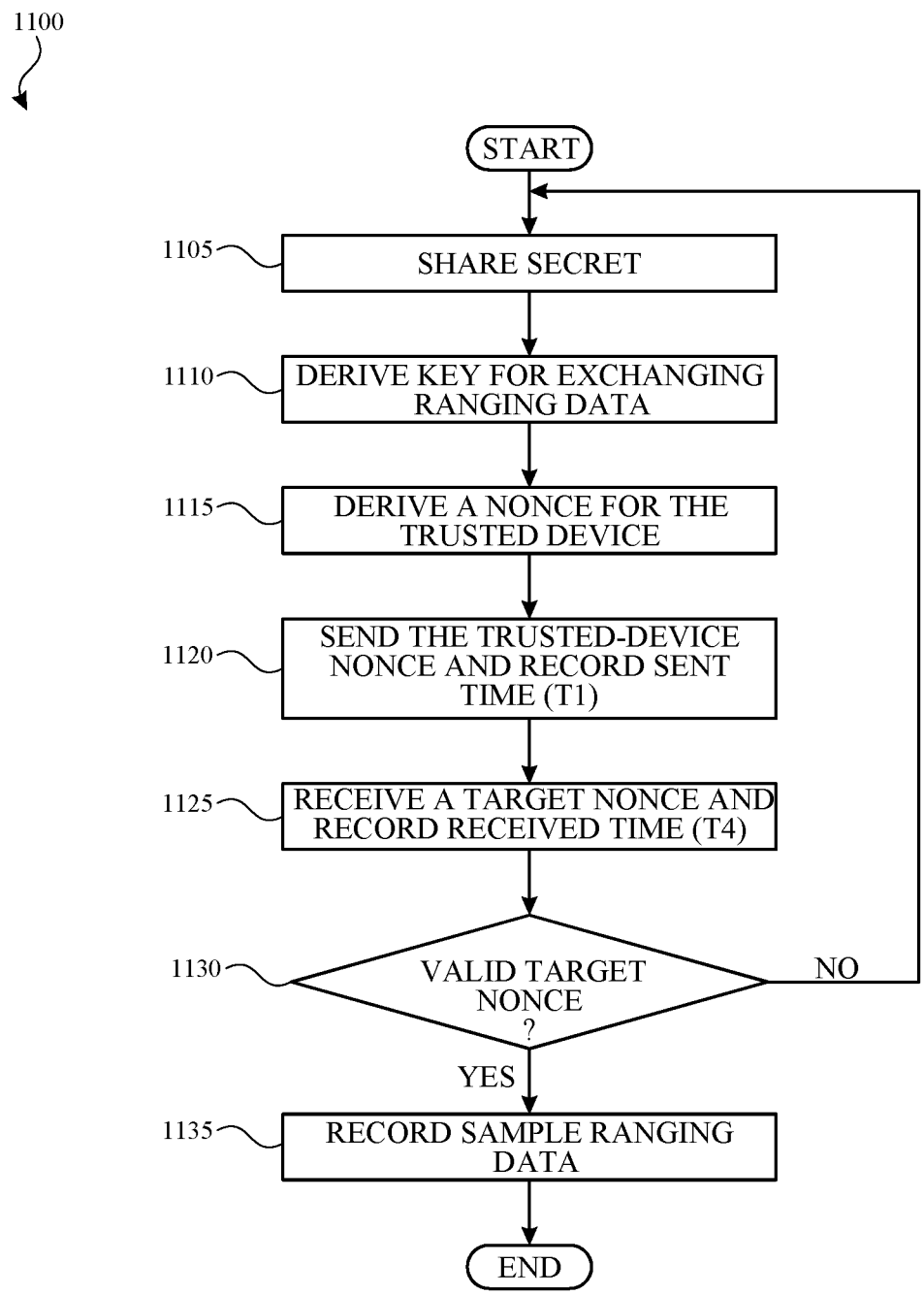
FIG. 11 conceptually illustrates a process for a trusted device that provides secure ranging to capture sample distance measurements.

FIG. 11 conceptually illustrates a process for a trusted device that provides secure ranging to capture sample distance measurements. The process 1100 of some embodiments is performed by a trusted device (e.g., a watch, a mobile phone, key fob, etc.) that is used to unlock another device (e.g., a laptop, a desktop computer, a tablet, etc.). In some embodiments, a particular device operates as both a trusted device for a first set of devices and as a target device for a second set of devices.

The process 1100 begins by sharing (at 1105) a shared secret. The process 1100 then derives (at 1110) a derived key for encrypting and exchanging ranging data. The ranging data of some embodiments includes the timestamps for when the different nonces are sent between the devices. Alternatively, or conjunctively, the ranging data of some embodiments includes a set of nonces that are sent with ranging signals between the devices to allow a receiving device to confirm the identity of the sender of a ranging signal.

The process 1100 then derives (at 1115) a nonce for the trusted device. The trusted-device nonce allows a target device to verify that the nonce came from the trusted device (e.g., because it has also generated the same nonce). The process 1100 then sends (at 1120) the trusted-device nonce to the target device and records the sent time (T1).

At 1125, the process 1100 receives a target nonce from the target device and records the received time (T4). The process 1100 then determines (at 1130) whether the target nonce is a valid target nonce. For example, in some embodiments, the process 1100 determines (at 1130) that the target nonce is valid when it matches a nonce generated at the trusted device (e.g., derived from a common derived key).

When the process 1100 determines (at 1130) that the target nonce is not valid, the process 1100 returns to step 1105 and shares (at 1105) a new secret to restart the ranging process. As it is important for a particular nonce to only be sent once, the process 1100 of some embodiments shares (at 1105) a new shared secret every time the ranging operation fails. While some embodiments may allow a shared secret to be used for more than one ranging operation, this can allow an attacker to capture the nonces and to replay them to trick a device into believing that the device is closer that it really is.

In some embodiments, the shared secret (and any values derived from the shared secret) are only used for a single ranging operation, so when the method of some embodiments determines that the devices are not within the desired proximity (or that the ranging information cannot be verified), the method discards the shared secret and any shared values (e.g., nonces, derived keys, etc.) and generates a new shared secret before beginning the process again. When the process 1100 determines (at 1130) that the target nonce is valid, the process 1100 records (at 1135) the sample distance measurement and ends.

Figure 12:
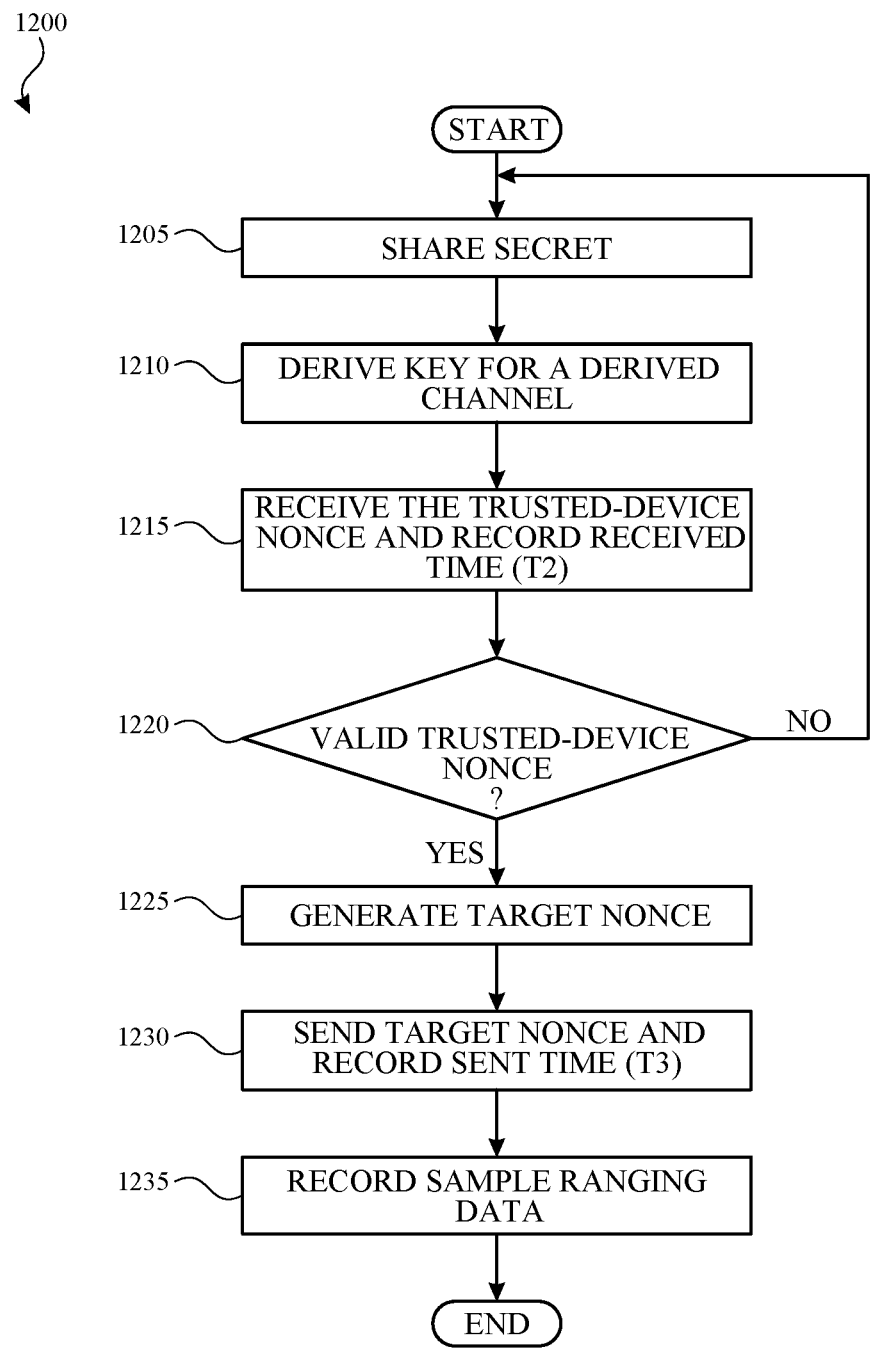
FIG. 12 conceptually illustrates a process for a target device that uses secure ranging with a trusted device to capture sample distance measurements.

FIG. 12 conceptually illustrates a process for a target device that uses secure ranging with a trusted device to capture sample distance measurements. The process 1200 of some embodiments is performed by a target device when a trusted device (e.g., a watch, a mobile phone, key fob, etc.) is used to unlock the target device (e.g., a laptop, a desktop computer, a tablet, etc.). In some embodiments, a particular device operates as both a trusted device for a first set of devices and as a target device for a second set of devices.

The process 1200 begins by sharing (at 1205) a shared secret with the trusted device. The process 1200 then derives (at 1210) a derived key for encrypting and exchanging ranging data. The ranging data of some embodiments includes the timestamps for when the different nonces are sent between the devices. Alternatively, or conjunctively, the ranging data of some embodiments includes a set of nonces that are sent with ranging signals between the devices to allow a receiving device to confirm the identity of the sender of a ranging signal.

The process 1200 then receives (at 1215) a nonce from the trusted device and records the received time (T2). The trusted-device nonce allows the target device to verify that the nonce came from a trusted device (e.g., because it has also generated the same nonce). The process 1200 then determines (at 1220) whether the trusted-device nonce is valid. For example, in some embodiments, the process 1200 determines (at 1220) that the trusted-device nonce is valid when it matches a corresponding nonce generated at the trusted device (e.g., derived using a same derivation function from a common derived key).

When the process 1200 determines (at 1220) that the trusted-device nonce is not valid, the process 1200 returns to step 1205 and shares (at 1205) a new secret to restart the ranging process. As it is important for a particular nonce to only be sent once, the process 1200 of some embodiments shares (at 1205) a new shared secret every time the ranging operation fails. While some embodiments may allow a shared secret to be used for more than one ranging operation, this can allow an attacker to capture the nonces and to replay them to trick a device into believing that the device is closer that it really is.

When the process 1200 determines (at 1220) that the trusted-device nonce is valid, the process 1200 generates (at 1225) a target nonce. The target nonce allows a trusted device to verify that the generated nonce came from the target device (e.g., because it has also generated the same nonce). At 1230, the process 1200 sends the generated target nonce to the trusted device and records the sent time (T3). The process 1200 then records (at 1235) the sample distance measurement. The process 1200 then ends.

In some embodiments, the process is repeated several times to collect multiple sample distance measurements. The processes 1100 and 1200 of some embodiments generates a new shared secret for each sample distance measurement, while in other embodiments, the same shared secret is used for all the sample distance measurements, but new keys and nonces are derived for each sample. The collected sample measurements are then used to determine whether the two devices are within the required range, as described below with reference to FIG. 15.

In some embodiments, the ranging operations are performed in a number of stages. For example, the devices of some embodiments have hardware that can communicate on multiple bands of a frequency spectrum. In some such embodiments, it is desirable to use a lower-frequency band (e.g., due to power requirements), but the lower-frequency band may not be able to provide the necessary precision required to determine whether the trusted device is near the target device. The different bands may provide different minimum threshold resolvable differences with different threshold distances.

Figure 13:
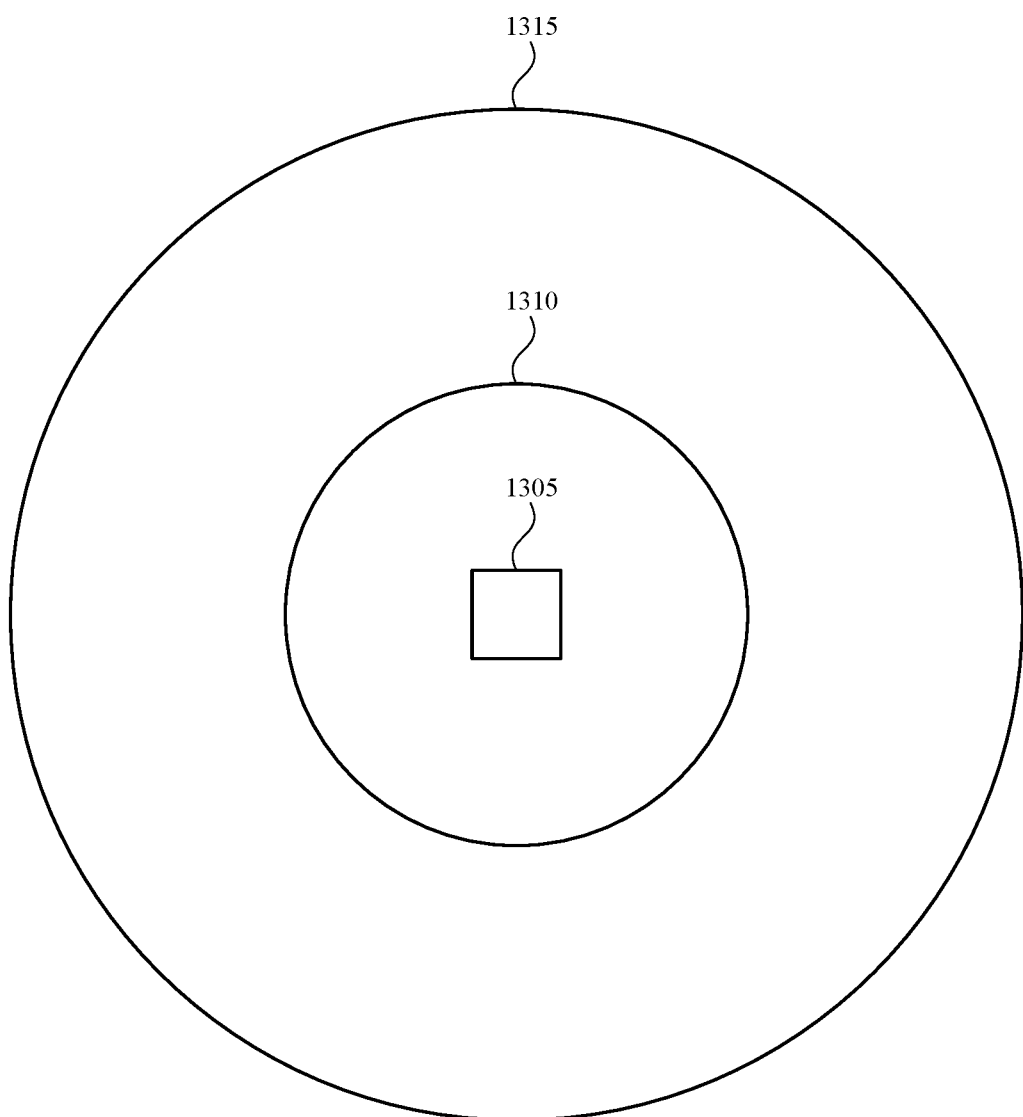
FIG. 13 illustrates an example of primary and secondary threshold distances from a device.
Figure 14:
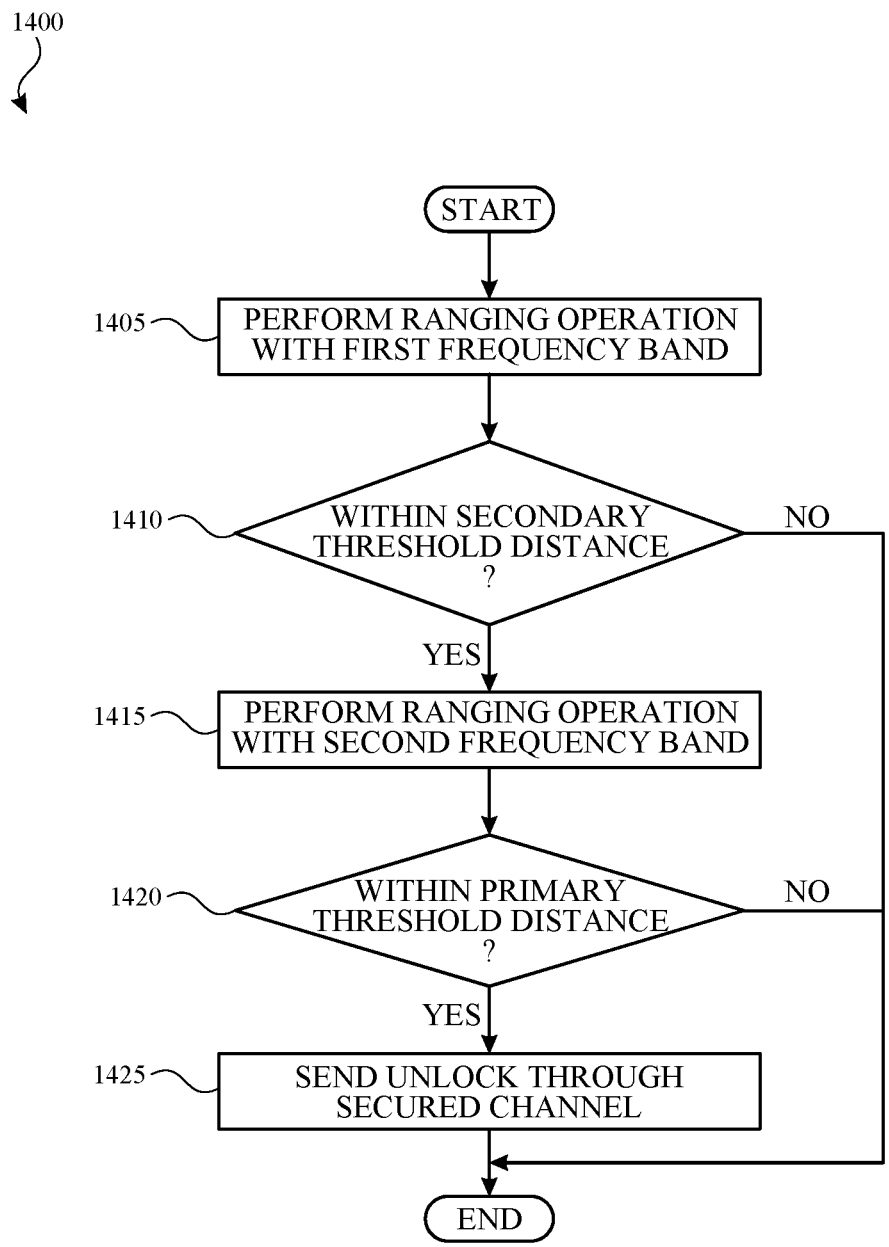
FIG. 14 conceptually illustrates a process for performing a ranging operation with multiple frequency bands.

FIG. 13 illustrates an example of primary and secondary threshold distances from a device. This figure shows a target device 1305 that is to be unlocked. This figure is used to illustrate different distances used for a dual band ranging operation, and is described with reference to FIG. 14. FIG. 14 conceptually illustrates a process for performing a ranging operation with multiple frequency bands.

The process 1400 begins by performing (at 1405) a ranging operation with a first lower-frequency band. The lower-frequency band may be used to determine (at 1410) whether a trusted device is within a secondary threshold distance 1315 (e.g., not the primary threshold distance used determine whether the devices are in the necessary proximity to each other), but may not specifically distinguish where the trusted device is within the secondary threshold distance 1315. The ranging operation of some embodiments is similar to the operations described above, but as it cannot yet determine whether the other device is within the primary threshold distance 1310, the process 1400 does not unlock the device yet.

In some embodiments, the ranging operation performed with the lower-frequency band is similar to the operations described above, but in other embodiments, the lower-frequency band uses a different ranging operation from the higher-frequency band. The preliminary ranging operation of some embodiments is available as a part of a wireless protocol standard. For example, the ranging operation of the lower-frequency band uses a received signal strength indicator (RSSI) to determine that the device is within the secondary threshold distance 1315. RSSI uses signal strength to get an imprecise distance measurement. However, RSSI can be vulnerable to spoofing attacks that amplify legitimate signals to make devices appear to be closer to each other than they truly are. RSSI is less secure than the exchange of nonces, but is also simpler to implement and consumes less power. In some embodiments, a less secure preliminary ranging operation is used to determine whether to perform the more secure secondary ranging operation.

When the process 1400 determines (at 1410) that the other device is not within the first (secondary) threshold distance, the process 1400 ends. When the process 1400 determines (at 1410) that the other device is within the secondary threshold distance, the process 1400 performs (at 1415) a second, more precise and secure, ranging operation (as those described above with reference to FIGS. 9-12) with a second frequency band. The second frequency band of some embodiments is a higher-frequency band that provides the requisite precision to determine (at 1420) whether the devices are within a primary threshold distance. In some embodiments, the secondary and primary threshold distances 1315 and 1310 are determined based on the frequencies of the different band.

When the process 1400 determines (at 1420) that the other device is not within the primary threshold distance, the process 1400 ends. When the process 1400 determines (at 1420) that the other device is within the primary threshold distance, the process 1400 sends an unlock message through a secured channel (at 1425), as described in the examples above. The process 1400 then ends. In this manner, the devices of some embodiments use secure ranging information to determine whether the trusted and target devices are within a specified range of each other before allowing the trusted device to unlock the target device. An example of the process for actually calculating whether the devices are within a certain proximity is described below.

Figure 15:
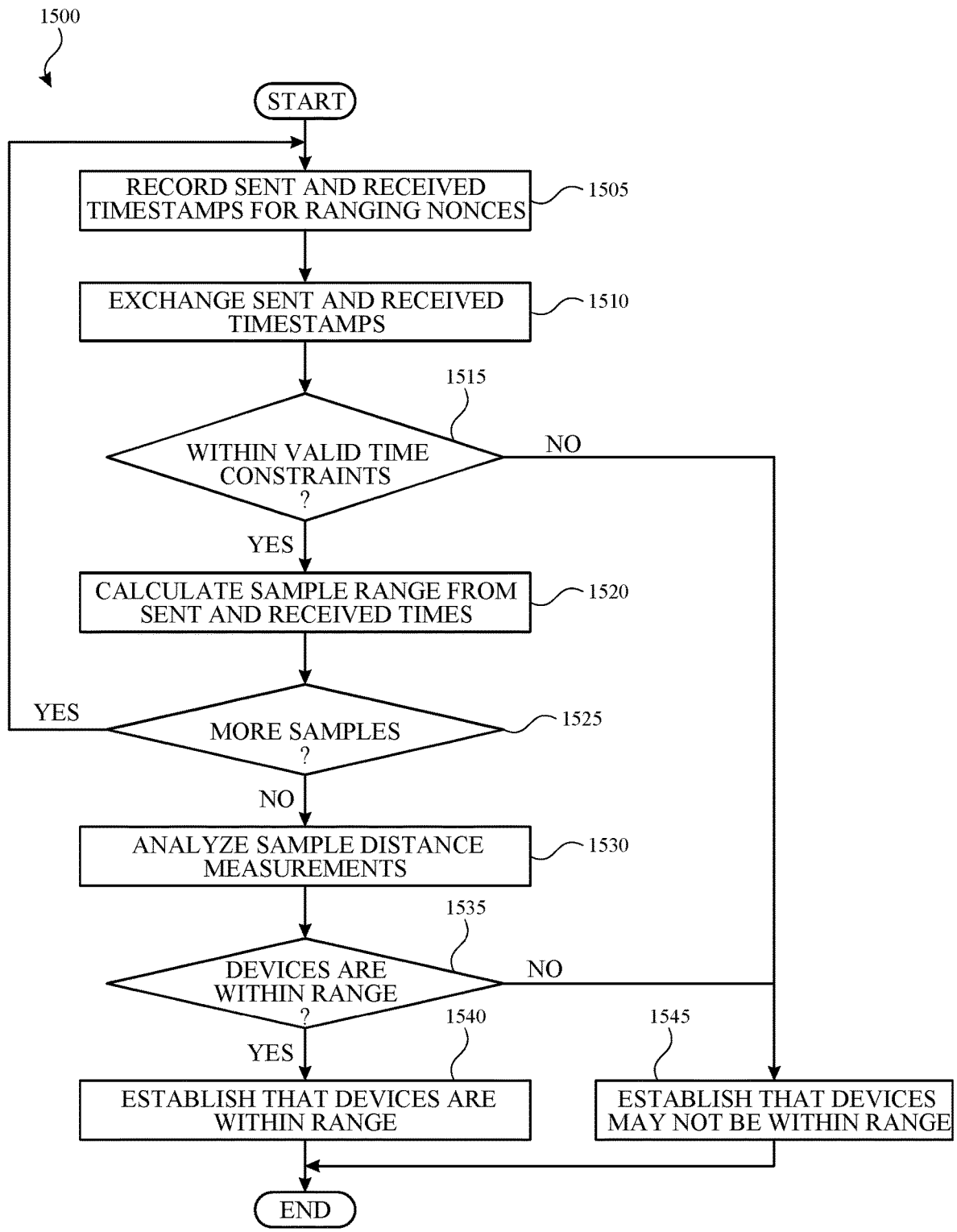
FIG. 15 conceptually illustrates a process for determining whether devices are within a threshold distance of each other, based on a set of message timestamps.

In some embodiments, the trusted and target devices determine whether another device is within a particular range or proximity based on a set of ranging data exchanged between the devices. FIG. 15 conceptually illustrates a process for determining whether devices are within a threshold distance of each other, based on a set of message timestamps (e.g., timestamps exchanged over a derived channel as described above). In some embodiments, the process 1500 is performed by both the target and trusted devices during a security shift process.

The process 1500 records (at 1505) sent and received timestamps for ranging nonces. The process of sending and receiving the nonces, and recording timestamps for the sent and received times, is described above with reference to FIGS. 11 and 12.

The process 1500 exchanges (at 1510) timestamps for when the nonces are sent and received with the other device. For instance, in the examples above, a trusted device sends the time that the first nonce is sent and the time that the second nonce is received, while a target device sends the time that the first nonce is received and the time that the second nonce is sent. In some embodiments, the sent and received timestamps are encrypted over a ranging channel (e.g., using a derived key).

At 1515, the process 1500 determines whether the timestamps fall within a set of time constraints set for the security policy for the ranging operation. For example, in some embodiments, the process 1500 determines (at 1515) whether the time between the receipt of the first nonce and the sending of the second nonce fall within an allowed range of time. By constraining the allowed range of time between the receipt and sending of the nonces, the devices can prevent clock drift attacks that may attempt to take advantage of drift in the system clocks of the devices.

When the process 1500 determines (at 1515) that the timestamps do not fit within the designated time constraints, the process proceeds to step 1545, described below. When the process 1500 determines (at 1515) that the timestamps do fit within the designated time constraints, the process 1500 calculates (at 1520) the time ranges between the sent and received times for the nonces sent between the devices. The calculated ranges indicate the amount of time required for the nonce to travel between the devices. In some embodiments, several sample distance measurements are captured before calculating any of the distance measurements.

At 1525, the process 1500 determines whether to capture more samples. When the process 1500 determines (at 1525) that more samples are needed, the process returns to step 1505 to perform another ranging operation to capture another sample distance measurement. The process 1500 then analyzes (at 1530) the sample distance measurements (or timestamps) from the sample ranging operations to determine whether the devices are within a particular range. The analysis of some embodiments is based on calculations, such as those described with reference to one or more of the range calculators 1018, 1028 in FIG. 10.

The process 1500 then determines (at 1535) whether the analysis of the sample distance measurements indicates that the other device is within a threshold distance. The threshold distance of some embodiments is identified based on the frequency for the band through which the nonces are communicated. For example, in some embodiments, the threshold distance is a multiple of the minimum resolvable distance.

When the process 1500 determines (at 1535) that the other device is not within the threshold distance, the process 1500 establishes (at 1545) that the devices may not be within the desired range and ends.

When the process 1500 determines (at 1535) that the other device is within the threshold distance, the process 1500 establishes (at 1540) that the devices are within the particular range and the process 1500 then ends.

As described above, once the devices determine that they are within range, they can exchange the authorization information (e.g., unlock keys, secrets, etc.). In some embodiments, secure ranging is used in conjunction with other aspects of a security protocol in order to securely use a trusted device to modify the security state of a target device.

In some embodiments, a first device performs ranging operations to allow a user to access (e.g., to login) the first device under one of several user accounts without providing one or more device-access credentials. In some embodiments, the device-access credentials are secret or semi-secret credentials such passwords, passcodes, biometric input, etc. In some embodiments, the first device can be accessed without providing a username, while in other embodiments, the user has to provide a username or some other indication of the user account under which the user wants to access the device.

When a second device is within a first distance of the first device, a device-access accelerant module of the first device determines that the second device is associated with a first user account under which a user can access (e.g., can log into) the first device. In response to the determination, the accelerant module enables at least one substitute interaction (e.g., one password-less interaction) to allow the first device to be accessed without receiving one or more access credentials through a user interface. The accelerant module then detects the occurrence of the enabled, substitute interaction. In response, the accelerant module directs an authentication module (e.g., a login module) of the first device to allow the first device to be accessed under the first account. In some embodiments, the accelerant module provides to the authentication module a substitute credential (e.g., a secret) in lieu of the first user account access credential(s) (e.g., the account password, passcode, biometric input, etc.) in order to direct this module to allow the first device to be accessed under the first user account.

Figure 16:
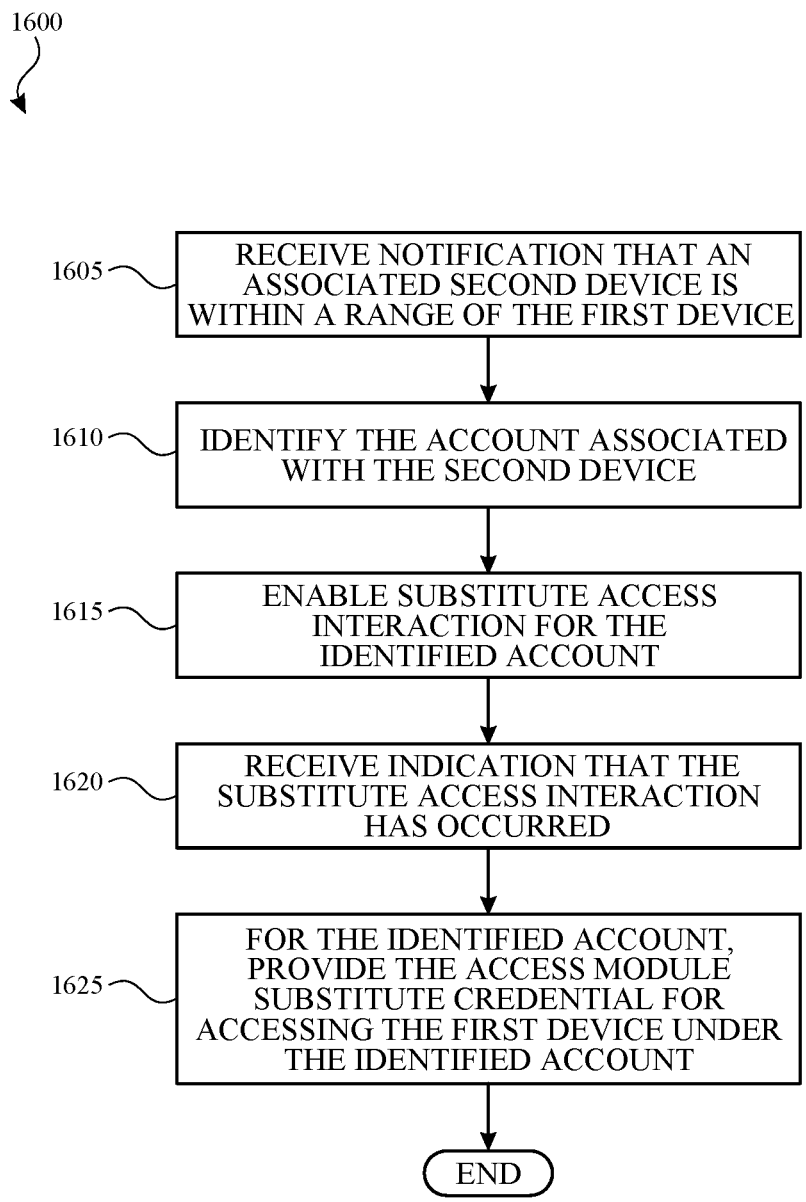
FIG. 16 illustrates an access-accelerant process that may be performed by an accelerant module of a device.

FIG. 16 illustrates an access-accelerant process 1600 that the accelerant module of the first device performs in some embodiments of the subject technology. As shown, this process starts (at 1605) in some embodiments when a communication layer (e.g., a Bluetooth layer) of the first device notifies the accelerant module that a second device is within a first distance of the first device. The communication layer in some embodiments performs ranging operations that search for nearby devices that transmit their availability on certain communication channels (e.g., Bluetooth channels).

When the communication layer finds such a device, it determines whether the device is within a prescribed distance and has been enabled for simplifying access to the first device (e.g., whether the second device has been paired with the first device). If the identified device has not been so enabled, or is not within the prescribed distance, the communication layer does not report it to the accelerant module. However, if it has been enabled and is within the prescribed distance, the communication layer reports the identified device to the accelerant module. Below, the identified device is referred to as the second device, and the prescribed distance is referred to as the first distance.

Next, at 1610, the accelerant process 1600 identifies a first user account under which a user can access (e.g., can log into) the first device through a substitute interaction that is available because of the proximity of the second device. At 1615, the accelerant process enables the substitute interaction to allow the first device to be accessed without receiving one or more access credentials (e.g., a password or passcode) for the first user account through a user interface of the first device. In some embodiments, the process 1600 maintains this substitute interaction enabled until it receives notification that the second device is no longer within the first distance of the first device.

The accelerant process 1600 then receives (at 1620) an indication from the first device's I/O (input/output) interface layer that the enabled substitute interaction has occurred. In response, the accelerant process directs (at 1625) an authentication module (e.g., a login module) of the first device to allow the first device to be accessed under the first account. In some embodiments, the accelerant module provides to the authentication module a substitute credential (e.g., a secret) in lieu of the first user account access credential(s) (e.g., the account password) in order to direct this module to allow the first device to be accessed under the first user account. After 1625, the process 1600 ends.

In some embodiments, the accelerant module provides the same substitute credential to the authentication module to direct this module to allow access two or more user accounts when the secondary devices associated with these user accounts are nearby. However, in other embodiments, the accelerant module provides different substitute credential(s) to the authentication module to access the first device under different accounts. Hence, in these embodiments, the accelerant process 1600 has to identify (at 1610) the substitute credential for the first user account (associated with the first and second devices), in order to provide (at 1625) this substitute credential to the authentication module. In some embodiments, the accelerant process also provides the first account's username along with this substitute credential. In other embodiments, the accelerant process does not need to provide the first account's username as the user's action identifies the first user account under which the user wants to access the device (e.g., the user's selection the first user account in a presentation displayed by the first device).

To identify the substitute credential for the user account, the access-accelerant process 1600 examines a data store (e.g., a lookup table) that identifies (1) other devices that are associated with the user accounts for accessing the first device, (2) substitute credentials associated with these other devices, and (3) in some cases, usernames associated with these other devices. Based on this examination, the accelerant module in these embodiments can identify a substitute credential for the first account's user-supplied access credential.

In other embodiments, the first device's communication layer not only identifies the nearby devices, but also identifies the account with which each identified device is associated (e.g., that the second device is associated with the first user account). In some of these other embodiments, the communication layer passes to the accelerant module an identifier for the first user account, or a value from which the accelerant module can identify the first-user account identifier. Based on this identifier, the accelerant module provides the authentication module the substitute credential for first user account and in some cases the username.

Figure 17:
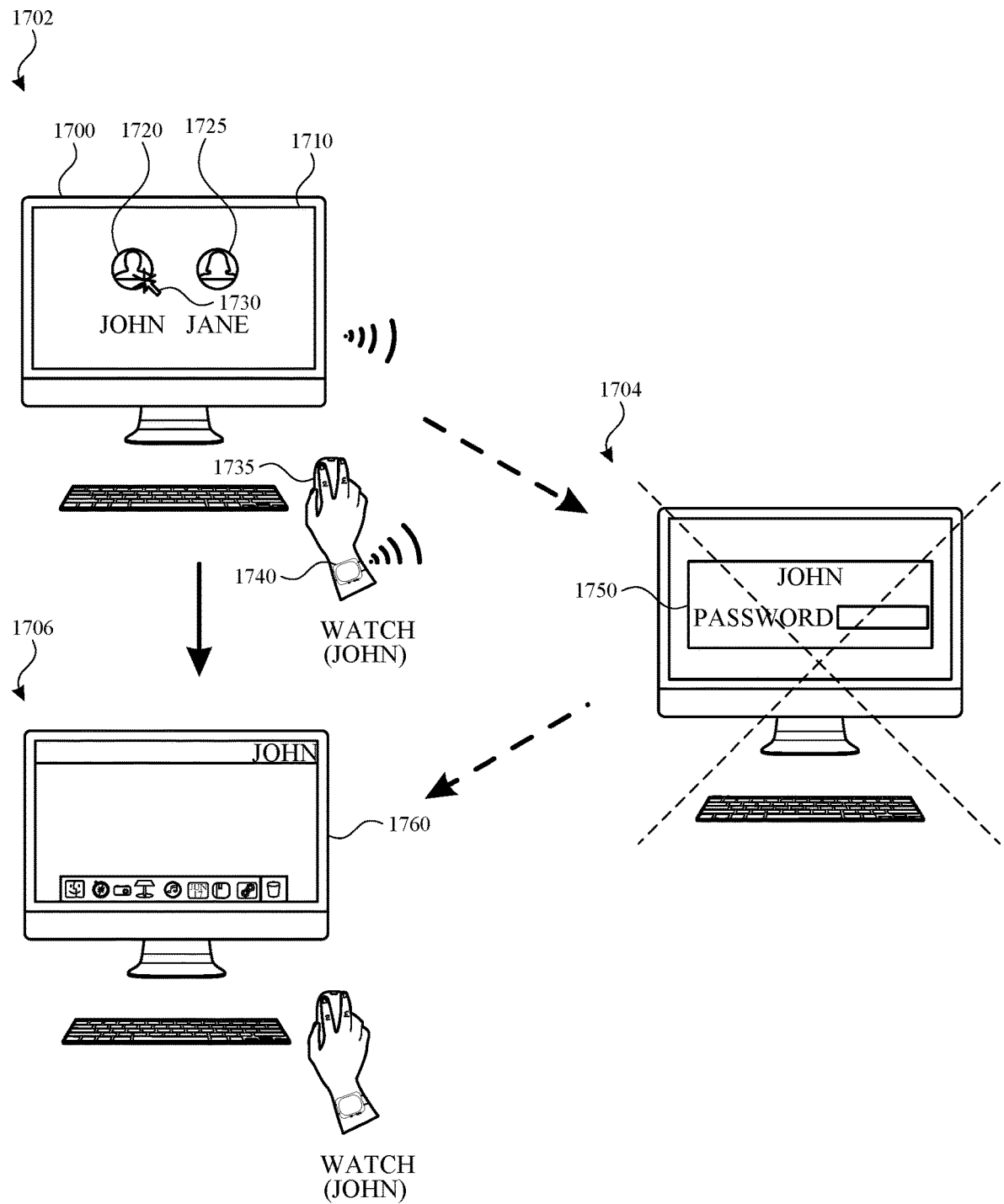
FIG. 17 illustrates an example of a substitute interaction that may be provided by a device to allow a user to access the device under one of multiple user accounts on the device.

FIG. 17 illustrates an example of a substitute interaction that a computer 1700 provides in some embodiments to allow a user to access the computer under one of the computer's several user accounts. This example is illustrated in terms of three operational stages 1702, 1704 and 1706 of the computer. Also, in this example, the computer 1700 has two user accounts, one for John and another for Jane.

The first stage 1702 shows the display screen of the computer 1700 displaying an access-screen presentation 1710 that presents selectable identifiers 1720 and 1725 for the John and Jane accounts. In some embodiments, the computer displays this presentation when no user account is currently logged in, or when the display screen has been locked to prevent unauthorized access to the computer under one or more logged in accounts. The first stage 1702 also shows the selection of John's account identifier 1720 through a cursor click operation that John performs through the cursor controller 1735 and its associated cursor 1730. As shown, John performs this selection operation while wearing his watch 1740 around his wrist.

When the computer 1700 detects that a watch that is associated with one of the user accounts of the computer is nearby (i.e., is within a particular distance) and this watch is wrapped around a person's hand, the computer's access-accelerant module (not shown) enables a substitute interaction for allowing John to access more quickly the computer. In this example, the substitute interaction is the selection of the John account identifier 1720 in the access-screen presentation 1710.

Accordingly, when John selects (at 1702) his account identifier 1720 through the cursor controller while wearing his watch, the computer unlocks the displayed presentation to show a desktop page 1760 that is associated with the John's user account, as depicted in FIG. 17 by stage 1706 and the transition from stage 1702 to stage 1706. If this account was not logged into at 1702, the computer 1700 performs a login operation when it transitions from 1702 to 1706.

Figure 18:
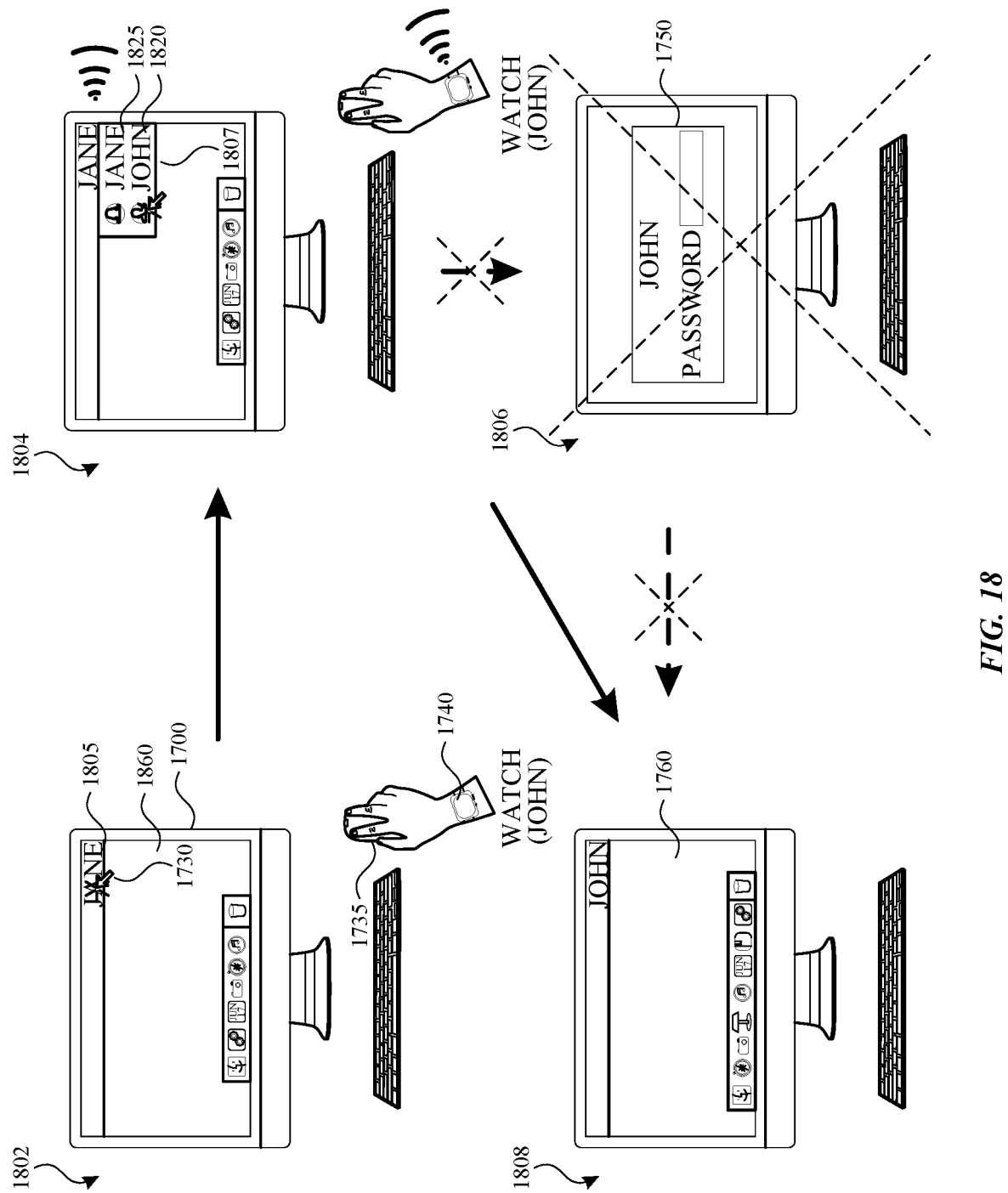
FIG. 18 illustrates an example of a substitute interaction by reference to four operational stages of a computing device.

Had John's watch 1740 not been near the computer when John's account identifier 1820 was selected, the computer would have transitioned from 1804 to 1806, where it would present a credential-entry display window 1750 to receive the John's account password. Only after receiving this password, the computer would then transition to John's desktop page 1760 as shown FIG. 18. However, while the computer is logged into under Jane's account, it can be switched to John's account just by selecting John's account identifier 1820 in the user menu 1807 when John's watch is nearby and on-wrist.

In some embodiments, the first-device's accelerant module not only can accelerate device access operations (by supporting more seamless device-access interactions in lieu of user access-credential entry), but also can accelerate other operations on the first device that require the submission of user credentials (e.g., passwords, passcodes, biometric input, usernames, etc.). In these embodiments, the accelerant module serves as an authorization-accelerant module. For instance, to change some settings (e.g., privacy settings, account settings, security settings, etc.) on a device, it is quite common to require a password, passcode or biometric input from a user. Similarly, it is quite common to require such input to install a program on a device or to purchase an item through the device.

Accordingly, to supplement existing credential inputting methodologies on a first device, the accelerant module in some embodiments enables simpler substitute interactions to change a setting, to install a program, and/or to purchase an item on the first device. The accelerant module of the first device enables these substitute interactions when a second associated device is nearby. For instance, some embodiments perform ranging operations on the first device to detect that the second device is within a particular distance of the first device, so that when the second device is within this distance, the accelerant module can enable the substitute interaction on the first device.

For some of these operations (e.g., changing a setting), the substitute interaction in some embodiments can be (1) the selection of a UI item to perform the operation (e.g., to unlock a change setting), or (2) the entry of a value. When this substitute interaction is performed, the accelerant module provides to an authorization module of the first module a substitute credential in lieu of the user-supplied credential so that the authorization module can authorize the operation for the module that has to perform the operation (e.g., for the module that has to change the setting on the device).

Figure 19:
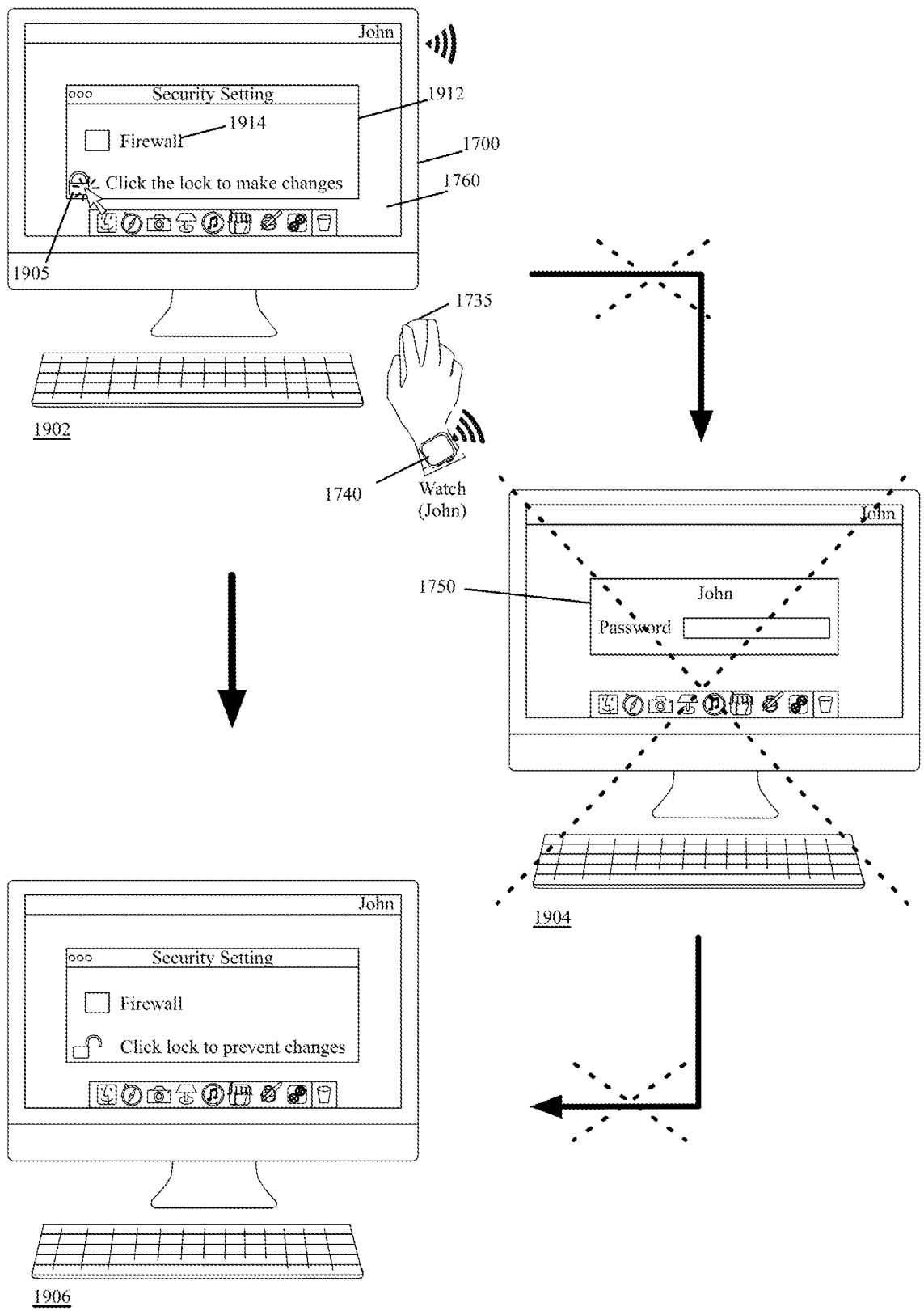
FIG. 19 illustrates an example of a substitute interaction that allows a user to change a setting, in lieu of providing a password to perform the setting change.

FIG. 19 illustrates an example of a substitute interaction that a computer 1700 provides in some embodiments to allow a user to change a setting, in lieu of providing a password to perform this operation. This example is illustrated in terms of three operational stages 1902, 1904 and 1906 of the computer.

The first stage 1702 shows the display screen of the computer 1700 displaying a desktop page 1760 that is associated with John's user account. As shown, this page shows a security setting display area 1912 that has a firewall setting 1914 that can be enabled or disabled. The first stage further shows a selection of a setting lock status identifier 1905 through a cursor click operation that John performs through the cursor controller 1735 and its associated cursor 1730. As shown, John performs this selection operation while wearing his watch 1740 around his wrist. As further shown, the setting lock status identifier 1905 indicates a locked state at the time that it is selected. This locked status indicates that the firewall setting 1914 cannot be changed as this setting has been locked.

For explanatory purposes, the computer 1700 in FIG. 17 is illustrated as displaying a desktop page 1760 that is associated with John's user account that includes a security setting display area 1912 with a firewall setting 1914. However, the subject technology is not limited to desktop pages associated with a user account. The subject technology is also applicable to user interfaces of applications, such as web browsers, document editors, and the like. For example the subject technology may be applicable to a user interface, e.g., of a web browser, that allows a user to view a list of their passwords and/or allows a user to enter their stored login information on a web page.

Typically, the selection of setting unlock option 1905 would cause the computer's display presentation to transition from 1902 to 1904, where it would present a credential-entry display window 1750 to receive the John's account password. Only after receiving this password, the computer would transition to stage 1906, which shows the setting lock changed to an unlock status to indicate that the firewall setting 1914 can now be changed in the setting display page 1760.

However, in the example illustrated in FIG. 19, the computer 1700 allows John to change the status identifier from a locked state to an unlock state by simply selecting it in the stage 1902 to transition to stage 1906. This is because in this example, the computer 1700 detects that John's watch (which is associated with one of the user accounts of the computer) is nearby and is wrapped around a person's hand. These detected conditions cause the computer's access-accelerant module (not shown) to enable a substitute interaction for allowing John to change the status of the setting lock status identifier. In this example, the substitute interaction is the selection of this identifier 1905.

In some embodiments, the substitute interaction for some operations (e.g., changing device setting, installing a program or purchasing an item) entails sending a request to the second device to seek authorization for a requested operation, after a UI item is selected on the first device. The second device in some embodiments displays the authorization request with a notification that describes the request and provides controls for accepting or rejecting the request. When this request is accepted on the second device, the accelerant module provides to the authorization module a substitute credential in lieu of a user-supplied credential. In response, the authorization module authorizes the requested operation for the first-device module that has to perform the operation (e.g., for the module that has to change the setting on the device, install the program or purchase an item on the first device). The above-described interaction is used in some embodiments to send a request to change a setting, install a program or purchase an item from a computer (e.g., laptop or desktop) to a smartwatch that is associated with an administrative account on the computer.

In some embodiments, the accelerant module can enable substitute interactions on the first device even when the first device is currently being accessed under a user account that does not have privileges for the requested operation. For instance, while a second user account is logged into the first device, a user might try to change a setting, install a program or purchase an item on the first device, which cannot be done by providing the login credentials of the second user account. In these cases, the accelerant module of the first device in some embodiments can send a request to a second device to approve the desired operation (e.g., the change to the setting, the installation of the program, the purchase of the item, etc.) when the second device is within a particular distance of the first device and the second device is associated with the first user account.

In some embodiments, the accelerant module of the first device does not need to determine that the second device is within a particular range of the first device, before sending the second device a request to approve certain substitute interactions on the first device. This is because in these embodiments the first device sends such request whenever it detects that the second device is available for direct peer-to-peer connection with the first device through the short-range transceivers (e.g., Bluetooth transceivers, WiFi transceivers, etc.) of the first and second devices. A direct peer-to-peer connection between two devices is a peer-to-peer connection that does not have to go through any other intervening electronic device outside of the two devices. Accordingly, in these embodiments, the first device does not need to perform any ranging operations to determine that the second device is within certain proximity of the first device, before the first-device accelerant module can send an authorization request to the second device.

Figure 20:
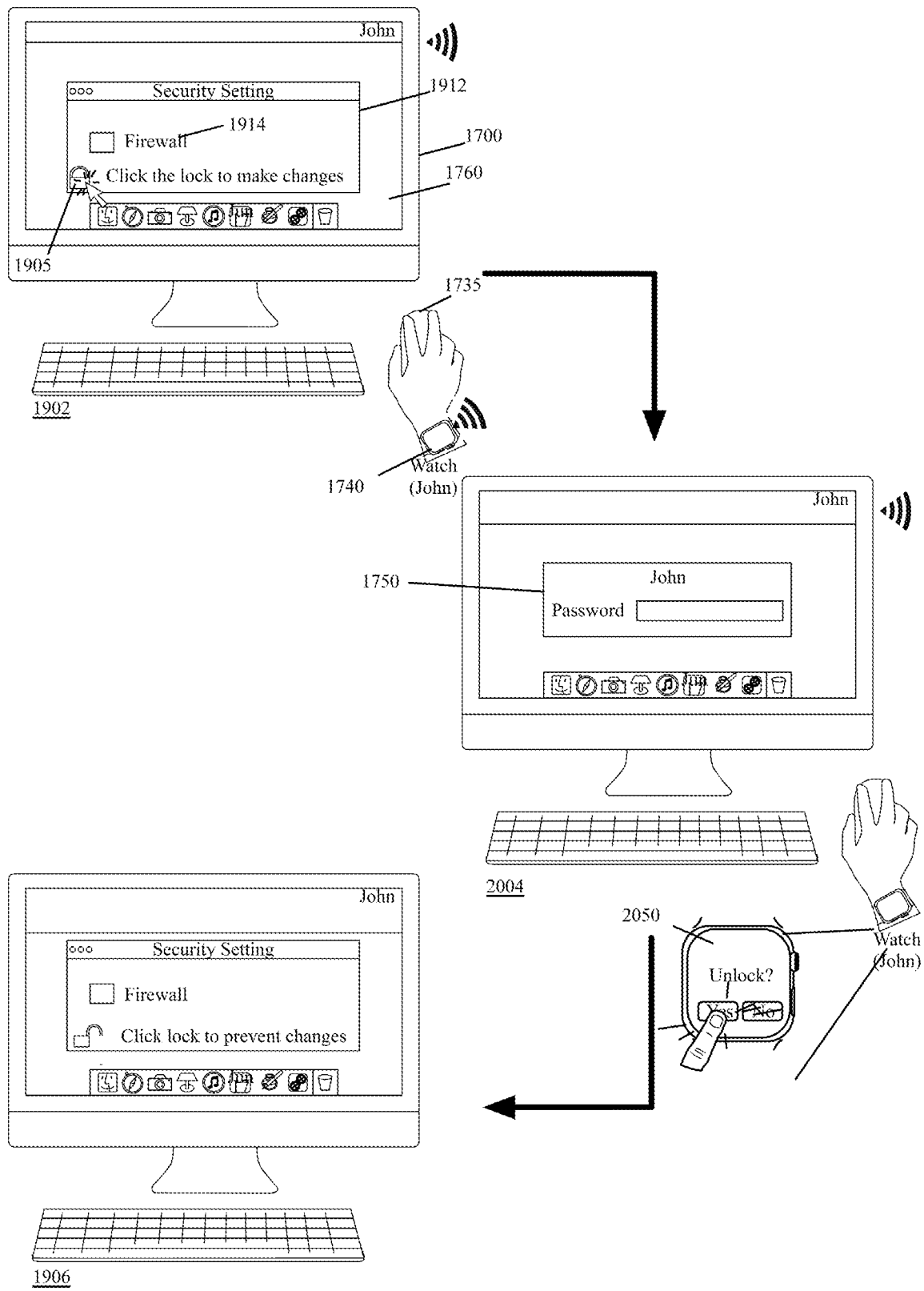
FIG. 20 illustrates another example of a substitute interaction that allows a user to change a setting, in lieu of providing a password to perform the setting change.

FIGS. 20-23 illustrate several examples of substitute interaction that involve sending a request to a second device to seek authorization for a requested operation on a first device. FIG. 20 illustrates a setting-change example like the setting-change example of FIG. 19. However, unlike the example in FIG. 19, John's selection of the setting lock status identifier 1905 does not cause the computer to transition to stage 1906 due to the proximity and on-wrist status of John's watch.

The proximity and on-wrist status of John's watch causes the computer send a notification 2050 to John's watch to seek authorization for unlocking the setting lock 1905, as shown by the transition from stage 1902 to stage 2004 in FIG. 20. At stage 2004, the computer also displays the credential-entry display window 1750 to receive the John's account password. Stage 2004 shows John approving the unlocking of the setting lock 1905 by tap selecting "Yes" in the notification displayed on the watch. As shown, this approval causes the computer to transition to stage 1906, which shows the setting lock changed to an unlock status to indicate that the firewall setting 1914 can now be changed in the setting display page 1760.

In one or more implementations, John may also be able to approve of unlocking the setting lock via his watch by manually interacting with one or more buttons, such as physical and/or hardware buttons, and/or providing voice commands, on the watch. For example, the watch may include a side button that John may press a number of consecutive times, such as two times (e.g. double click), in order to approve of unlocking the setting lock via his watch. In one or more implementations, John may use one or more buttons on the watch to approve of any of the operations described herein.

In some embodiments, the computer 1700 in the example of FIG. 20 sends the notification to John's watch because it performs ranging operations to determine that the watch is within a prescribed distance of the computer. In other embodiments, the computer 1700 in this example sends this notification to John's watch because the watch is close enough to establish short-range wireless, direct peer-to-peer connection between the computer and the watch (e.g., direct, peer-to-peer Bluetooth connection between the computer and the watch).

Figure 21:
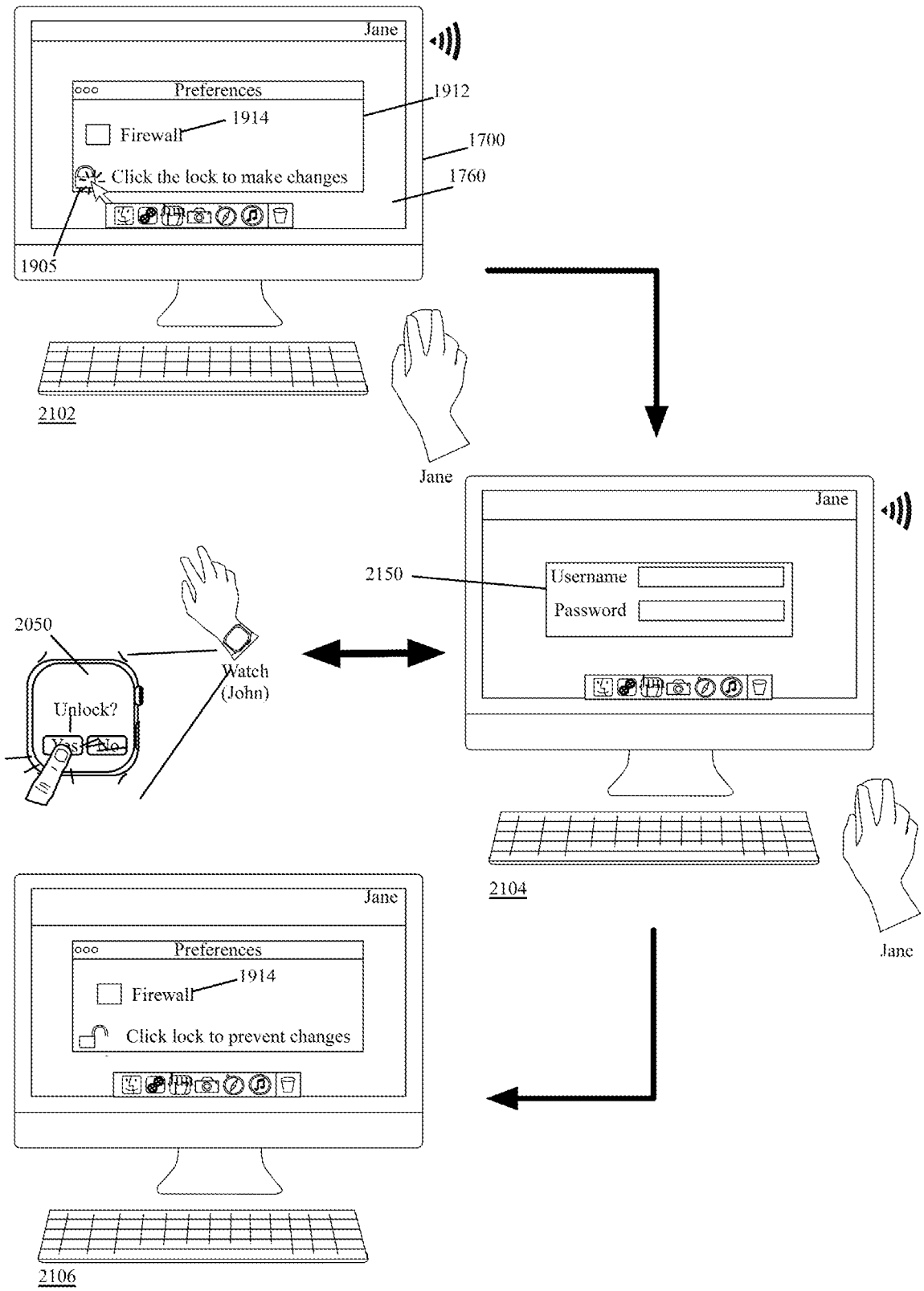
FIG. 21 illustrates an example of a substitute interaction for changing a setting on the first device even when the first device is currently being accessed under a user account that does not have privileges for to perform the setting change.

FIG. 21 presents an example that illustrates that the accelerant module in some embodiments can enable a substitute interaction for changing a setting on the first device even when the first device is currently being accessed under a user account that does not have privileges for the requested operation. The example illustrated in this figure is like the example illustrated in FIG. 20, except that the request to unlock the setting lock 1905 is made in a first stage 2102 while Jane is logged into the computer 1700.

In this example, Jane does not have administrative privileges for changing settings or installing programs on the computer. Hence, when Jane tries to unlock the setting lock 1905, the computer at 2104 displays a credential-entry display window 2150 that asks her to provide a username and password for a user account that has administrative privileges for the requested operation. At 2104, the computer also sends a notification to John's watch to seek authorization for unlocking the setting lock 1905, as the computer determines that the watch is nearby and is on wrist. In some embodiments, the computer 1700 performs ranging operations to determine that the John's watch is nearby (i.e., to determine that the watch is within a prescribed distance of the computer). In other embodiments, the computer 1700 determines that the watch is nearby as the watch is close enough to establish short-range wireless, direct peer-to-peer connection with the computer.

The notification on John's watch is a substitute interaction for allowing a setting to be changed on the computer 1700. Stage 2104 shows John approving the unlocking of the setting lock 1905 by tap-selecting "Yes" in the notification displayed on the watch. As shown, this approval causes the computer to transition to stage 2106, which shows the setting lock changed to an unlock status to indicate that the firewall setting 1914 can now be changed in the setting display page 1760 while Jane is logged into the computer 1700.

Figure 22:
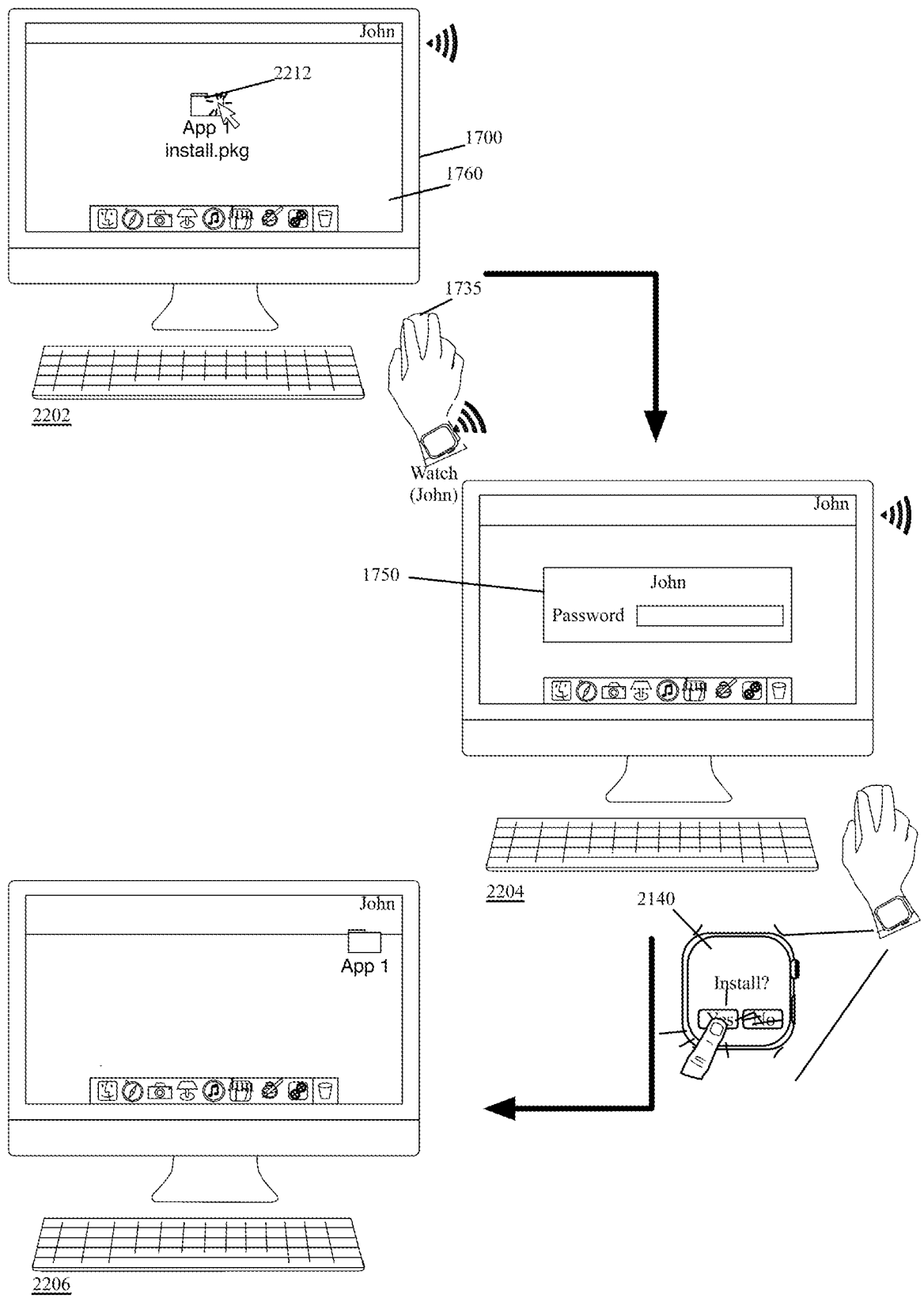
FIG. 22 illustrates an example of a substitute interaction that allows a password-less installation of a program on a device by sending a request to another device to seek authorization for the installation on the device.

FIG. 22 illustrate an example of allowing a password-less installation of a program on the computer 1700 by sending a request to a watch to seek authorization for this operation on the computer. This example is similar to the example illustrated in FIG. 20, except that the example in FIG. 22 relates to installing a program and not changing a setting on the computer 1700. Accordingly, the example in this figure starts with John selecting a program package 2212 in a first stage 2202 to start the process for installing the program on the computer.

This selection cause the computer to transition to 2204, where it presents the credential-entry display window 1750 to receive the John's account password, in order to authorize the requested installation. However, at 2204, the computer also sends a notification 2140 to John's watch to seek authorization for installing the program, as the computer determines that the watch is nearby and is on wrist. In some embodiments, the computer 1700 performs ranging operations to determine that the John's watch is nearby (i.e., to determine that the watch is within a prescribed distance of the computer). In other embodiments, the computer 1700 determines that the watch is nearby as the watch is close enough to establish short-range wireless, direct peer-to-peer connection with the computer.

The notification on John's watch is a substitute interaction for allowing the program to be installed on the computer 1700. Stage 2204 shows John approving the installation of the program by tap-selecting "Yes" in the notification displayed on the watch. This approval directs the computer to install the program, as indicated by stage 2206, which shows the program installed on the computer.

Figure 23:
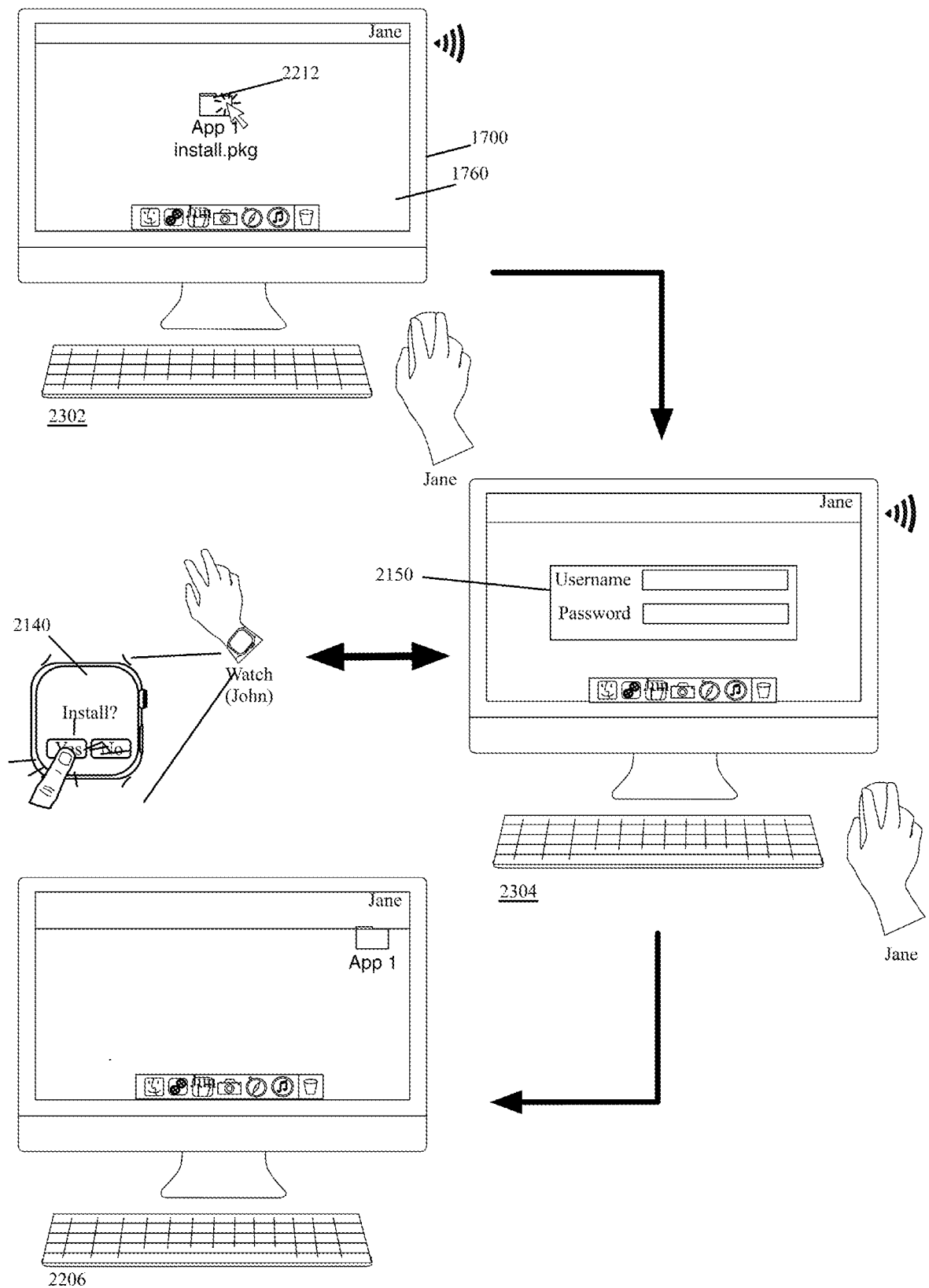
FIG. 23 illustrates an example of a substitute interaction that allows for installing a program on a first device even when the first device is currently being accessed under a user account that does not have privileges for installing the program.

FIG. 23 presents an example that illustrates that the accelerant module in some embodiments can enable a substitute interaction for installing a program on the first device even when the first device is currently being accessed under a user account that does not have privileges for installing a program. The example illustrated in this figure is like the example illustrated in FIG. 22, except that the request to install the program is made in a first stage 2302 while Jane is logged into the computer 1700.

In this example, Jane does not have administrative privileges for installing programs on the computer. Hence, when Jane tries to install the program, the computer at 2304 displays a credential-entry display window 2150 that asks her to provide a username and password for a user account that has administrative privileges for the requested operation. At 2304, the computer also sends a notification to John's watch to seek authorization for installing the program, as the computer determines that the watch is nearby and is on wrist. In some embodiments, the computer 1700 performs ranging operations to determine that the John's watch is nearby (i.e., to determine that the watch is within a prescribed distance of the computer). In other embodiments, the computer 1700 determines that the watch is nearby as the watch is close enough to establish short-range wireless, direct peer-to-peer connection with the computer.

As mentioned above, the notification 2140 on John's watch is a substitute interaction for allowing the program to be installed on the computer 1700. Stage 2304 shows John approving this installation by tap-selecting "Yes" in the notification displayed on the watch. This approval directs the computer to install the program, as indicated by stage 2206, which shows the program installed on the computer.

In some of the embodiments that perform ranging operations, the accelerant module of the first device can enable different sets of substitute interactions when the second device is within different ranges of distances from the first device. For instance, when the second device is within a first distance range of the first device, the accelerant module enables a first set of substitute interactions, in lieu of a second set of interactions, for performing a first set of operations on the first device. When the second device is within a closer, second distance range of the first device, the accelerant module enables a third set of substitute interactions, in lieu of a fourth set of interactions on the first device, to perform a second set of operations on the first device.

The second distance range is subsumed in the first distance range in some embodiments. As such, both sets of substitute interactions are enabled when the second device is within the second distance range in these embodiments. Also, the accelerant module disables these substitute interactions when the second device falls outside of first range. This module also disables the second set of substitute interactions when the second device falls outside of the second range.

When the second device is within the closer, second distance range, the substitute interactions in some embodiments are more seamless (e.g., are faster or require less input from a user) than when the device is within the farther, first distance range. For instance, when a watch is very close to a computer, a user in some embodiments can log into an account on the computer through a single stroke input on a peripheral component (e.g., cursor controller, keyboard, etc.) of the computer. On the other hand, when the watch is a little farther from the computer, one user on the computer requests an operation (e.g., the change to a setting, the installation of a program, the purchase of an item) and another user on the watch has to approve this request in some embodiments.

Figure 24:
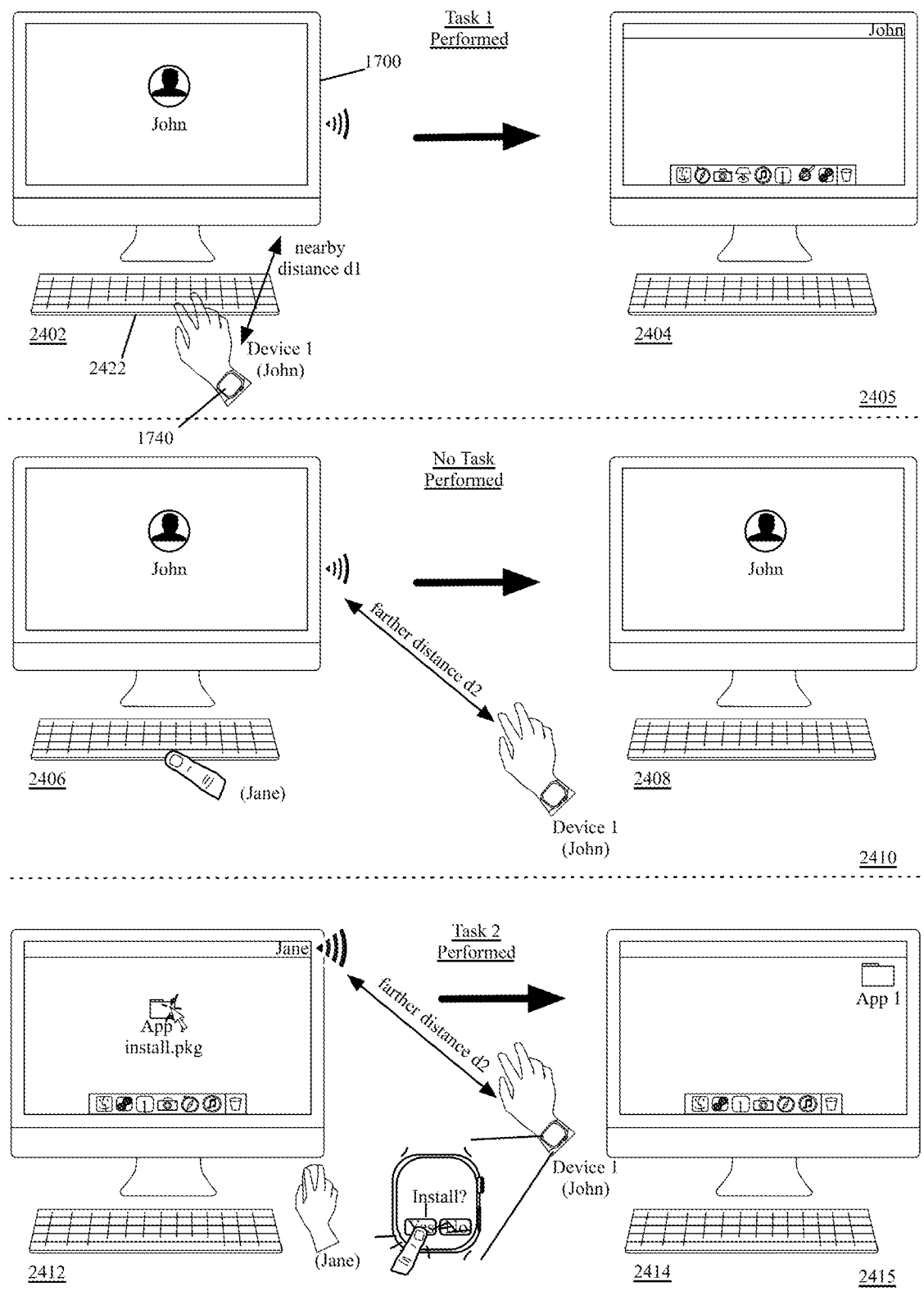
FIG. 24 illustrates an example of enabling two different substitute interactions when a device is at two different distances from a computer.

FIG. 24 illustrates an example of enabling two different substitute interactions when a watch is at two different distances from a computer. This example is illustrated in three sections 2405, 2410, and 2415, with each section showing two operational stages of the computer 1700 and the watch 1740. The first stage 2402 of the first section 2405 shows the watch 1740 on John's wrist as (1) the computer displays an access-display presentation that only identifies John's user account and (2) John presses the space bar 2422 on the keyboard 2424 of the computer 1700.

As shown by the second stage 2404, this interaction with the space bar while John's watch is on wrist and nearby directs the computer to present John's desktop page (i.e., to login into John's account or to unlock the locked display screen to allow access to John's account). In this example, the interaction with the space bar is the substitute interaction for providing John's password. The access-accelerant module of the computer 1700 enabled this substitute interaction for John's account when the computer detected that John's watch was nearby and on-wrist.

The access-accelerant module disables this substitute interaction for John's account when the computer detects that either John's watch is no longer nearby (i.e., is no longer with a prescribed distance) or is not affixed to a person. An example of this is illustrated in the second section 2410. Specifically, the first stage 2406 of the second section 2410 shows John's watch far away from the computer, as Jane presses the space bar 2422 while the computer displays John's user account identifier on an access-display presentation. The second stage 2408 shows that Jane's interaction with the space bar had no effect. It did not cause the computer to login under John's account or to unlock the locked screen under John's account. This is because the access-accelerant module disabled the space-bar substitute access interaction for John's account, once John's watch moved away from the computer by more than the prescribed distance.

In the second and third sections 2410 and 24915 of FIG. 24, John's watch is at a distance d2 from the computer 1700. The third section 2415 illustrates that at the farther distance d2, the access-accelerant module of the computer can enable a substitute interaction for installing programs on the computer even though it has disabled the space-bar substitute access interaction, which requires the watch to be in closer proximity. The first stage 2412 of this section illustrates Jane trying to install a program while she is logged into the computer under her account. As she does not have administrative privileges to install programs on the computer, the access-accelerant module of the computer sends an approval request for this installation to John's watch, which is on-wrist and within a prescribed range to approve such an operation. The second stage 2414 shows John approving this installation. It also shows this program installed on the computer.

Figure 25:
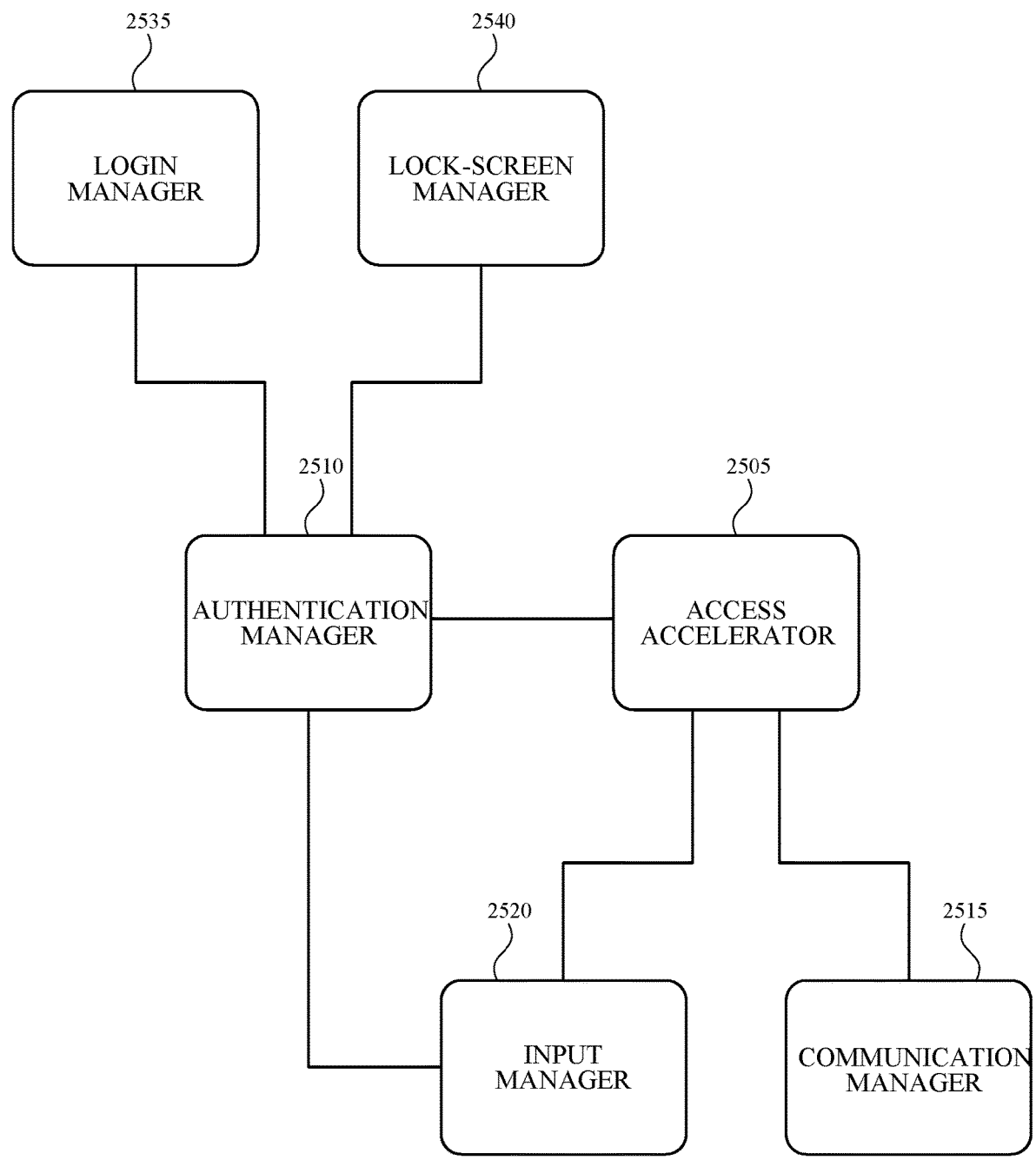
FIG. 25 illustrates several modules executing on a device that enable substitute interactions for account-access operations on the device.

FIG. 25 illustrates several modules executing on a first device that enable different substitute interactions for performing different operations on the first device. In the example illustrated in this figure, an access accelerator 2505 enables the substitute interactions when a second device is nearby and is available for facilitating these substitute interactions. Also, in this example, the substitute interactions provide different ways for login into the first device, unlocking a locked-screen presentation on the first device, unlocking a locked setting on the first device, installing a program on the first device, and purchasing an item on the first device.

In addition to the access accelerator 2505, the modules of FIG. 25 include an authentication manager 2510, a communication manager 2515, an input manager 2520, a settings manager 2525, a program install manager 2530, a login manager 2535, a lock-screen manager 2540, and a purchasing manager 2545. In some embodiments, the communication manager 2515 includes one or more drivers that interface with one or more short-range transceivers (not shown) of the first device. One example of such a transceiver is the Bluetooth transceiver of the first device.

The communication manager 2515 also includes a range calculator (not shown) that iteratively performs the above-described ranging operations to continuously search for nearby devices that have been enabled for supporting substitute interaction on the first device. In some embodiments, these ranging operations determine whether an enabled second device is within a first distance for enabling a first set of substitute interactions for a first set of operations on the first device, or is within a closer, second distance for enabling a second set of substitute interactions for a second set of operations on the first device.

When the range calculator of the communication manager identifies a second device that is within the first or second distance of the first device, it provides a notification to the access accelerator 2505 with data that the second device provides regarding its availability for supporting the substitute interactions. For instance, in some embodiments is deemed available when its availability data indicates that the watch is currently attached to a person (e.g., wrapped around a user's wrist) and is unlocked and is not on a charger.

When the access accelerator 2505 receives a notification from the communication manager 2515 that the second device is within the first or second distance of the first device, the accelerator 2505 analyzes the second-device availability data that accompanies this notification to determine whether the current device is currently available for supporting the substitute interactions on the first device. When the access accelerator 2505 determines that the second device is not currently available (e.g., determines that the watch is not attached to a person, is locked and/or is on a charger), the accelerator directs the communication manager to terminate a connection with the second device if it has established a connection with it.

On the other hand, when the access accelerator 2505 determines that the second device is currently available (e.g., determines that the watch is attached to a person, unlocked and not on a charger), and is within a first distance or a second distance of the first device, the accelerator enables a first set or a second set of substitute interactions associated with the reported first or second distance of the second device. Each enabled substitute interaction is associated with at least one input that is received through an input interface of the first device. Hence, for each enabled interaction, the accelerator 2505 registers with the input manager 2520 to receive the interaction's associated input when the input manager receives it through an input interface of the first device.

In the example illustrated in FIG. 25, the substitute interactions are all substitutes for providing user-authentication data that is needed to authorize an operation, such as unlocking a locked setting value, logging into a computer, unlocking a locked display screen presentation, installing a program or purchasing an item. The authentication manager 2510 is responsible for authorizing any of these operations for the settings manager 2525, a program install manager 2530, a login manager 2535, a lock-screen manager 2540, and a purchasing manager 2545. Typically, the authentication manager performs its authentication operations by validating credentials (e.g., names, passwords, passcodes, biometric input, etc.) that a user provides.

However, in some embodiments, the authentication manager 2510 can also authorize operations for modules 2525-2545 based on a substitute credential that the access accelerator 2505 provides when the accelerator receives notification of a substitute interaction from the input manager 2520. Thus, when the second device is within the first distance of the first device and is available (e.g., is a watch that is on-wrist, unlocked and not on the charger), and the input manager 2520 notifies the accelerator 2505 that an enabled substitute input interaction has been received for logging into or unlocking a display screen of the first device, the access accelerator 2505 provides to the authentication manager 2510 a secret that is a substitute credential for a user's password that is necessary to log into the first device or unlock the display screen of the first device under the user account associated with the second device. The authentication manager 2510, in turn, then directs the login manager 2535 or the lock-screen manager 2540 to initiate a login operation or a screen unlock operation for the account associated with the second device. As mentioned above, the accelerator in some embodiments provides different substitute credentials for different secondary devices as different devices can be associated with different accounts. Also, before providing the substitute credential, the access accelerator in some embodiments sends a request for authorization to the second device (through the communication manager 2515) for certain operations, e.g., a request to authorize the installation of a program. Only after receiving this authorization from the second device (through the communication manager 2515), the accelerator then provides the substitute credential to the authentication manager. It does not provide this credential when the second device rejects or disregards the authorization request.

Figure 26:
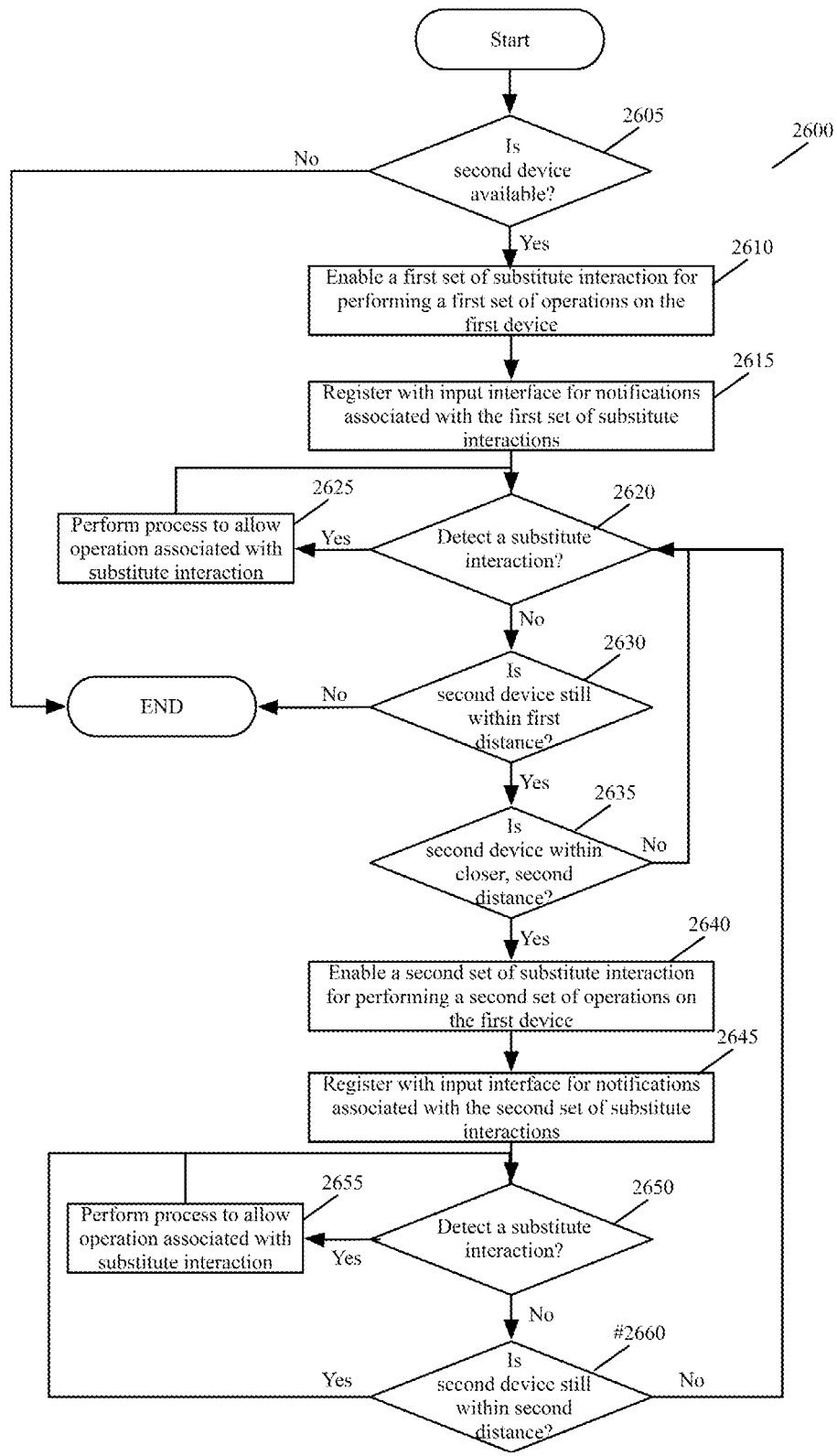
FIG. 26 illustrates an example process performed when a second device, which has been enabled for substitute interactions, comes within a first distance of a first device.

FIG. 26 illustrates a process 2600 that the access accelerator 2505 of the first device performs in some embodiments when a second device, which has been enabled for substitute interactions, comes within a first distance of the first device. This process starts when the communication manager 2515 notifies the accelerator 2505 that it has identified an enabled second device within a first distance of the first device. With this notification, the communication manager 2515 provides availability data that it obtained from the second device as part of the find operation that the communication manager performed to identify the second device.

The process 2600 initially examines (at 2605) the availability data to determine whether the second device is available to support substitute interactions on the first device. As mentioned above, a smartwatch in some embodiments is deemed available when its availability data indicates that the watch is currently attached to a person (e.g., wrapped around a user's wrist) and is unlocked. When the process 2600 determines that the second device is not available to support substitute interactions on the first device (e.g., the watch is not attached to anyone or is locked), the process ends.

When the process 2600 determines that the second device is available to support substitute interactions on the first device (e.g., the watch is attached to someone and is unlocked), the process 2600 enables (at 2610) a first set of substitute interactions for performing a first set of operations on the first device. The process then registers (at 2615) with the input manager 2520 to receive notifications associated with the first set of substitute interactions.

At 2620, the process then determines whether it has received a notification from the input manager 2520 that this manager has detected an input associated with one of the substitute interactions in the first set. If so, the process 2600 performs (at 2625) a sub-process to allow the operation associated with the input detected at 2620 for the substitute interaction. In some cases, the substitute interaction is just a single input through the first device's input interface (e.g., the pressing of a space bar, the selection of the setting lock, etc.), in response to which the access accelerator 2505 provides an access credential substitute (e.g., a secret) to the authentication manager 2510 to authorize a particular operation (e.g., the logging into the first device, the unlocking a locked screen presentation on the first device, the unlocking of a setting lock, etc.). The access credential substitute in some embodiments is a credential substitute that is associated with an account that is also associated with the second device.

In other cases, the substitute interaction has multiple parts, one part that requires an input through the first device's input interface, and another part that includes an interaction on the second device. Examples of such substitute interactions include the above-described program install and setting unlock operations that require a user to approve an operation on a computer by indicating this approval on his watch. For such substitute interactions, the process 2600 sends (at 2625) an approval request to the second device, and once it receives approval of this request, provides the access credential substitute (e.g., a secret associated with the account that is also associated with the second device) to the authentication manager 2510 to authorize a particular operation (e.g., the logging into the first device, the unlocking of a setting lock, etc.). The process 2600 sends the approval request and received the approved request through the communication manager 2515. After 2625, the process returns to 2620.

When the process determines (at 2620) that it has not received a notification from the input manager 2520 regarding an input associated with one of the substitute interactions in the first set, the process determines (at 2630) whether the second device is still within the first distance. In some embodiments, the communication manager 2515 notifies the access accelerator 2505 when the second device has moved away from the first device to be outside of the first range that is defined by the first distance. When the process 2600 determines (at 2630) that the second device is farther than the first distance, the process ends.

Otherwise, the process determines (at 2635) whether the second device has moved close to the first device to now be within a closer, second distance of the first device. In some embodiments, the communication manager 2515 notifies the access accelerator 2505 when the second device has moved towards the first device to be within of the second range that is defined by the second distance. The first range subsumes the second range. When the process 2600 determines (at 2635) that the second device is not within the second distance of the first device, the process returns to 2620.

On the other hand, when the process 2600 determines (at 2635) that the first device is now within the second distance of the first distance, the process 2600 enables (at 2640) a second set of substitute interactions for performing a second set of operations on the first device. The process then registers (at 2645) with the input manager 2520 to receive notifications associated with the second set of substitute interactions.

At 2650, the process then determines whether it has received a notification from the input manager 2520 that this manager has detected an input associated with a substitute interaction in either first or second set. If so, the process 2600 performs (at 2655) a sub-process to allow the operation associated with the input detected at 2650 for the substitute interaction. As in 2625, the substitute interaction in some cases involves receiving only an input on the first device, while in other cases it involves receiving an input on the first device, sending an interaction request to the second device, and receiving confirmation of the requested interaction from the second device. When the access accelerator detects that the one-part or multi-part substitute interaction has occurred, it provides (at 2655) an access credential substitute (e.g., a secret) to the authentication manager 2510 to authorize a particular operation (e.g., the logging into the first device, the unlocking of a setting lock, etc.). This access credential substitute in some embodiments is a credential substitute that is associated with an account that is also associated with the second device. After 2655, the process returns to 2650.

When the process determines (at 2650) that it has not received a notification from the input manager 2520 regarding an input associated with a substitute interaction in the first or second set, the process determines (at 2660) whether the second device is still within the second distance. In some embodiments, the communication manager 2515 notifies the access accelerator 2505 when the second device has moved away from the first device to be outside of the second range that is defined by the second distance. When the process 2600 determines (at 2660) that the second device is farther than the second distance, the process it returns to 2620. Otherwise, it returns to 2650.

Figure 27:
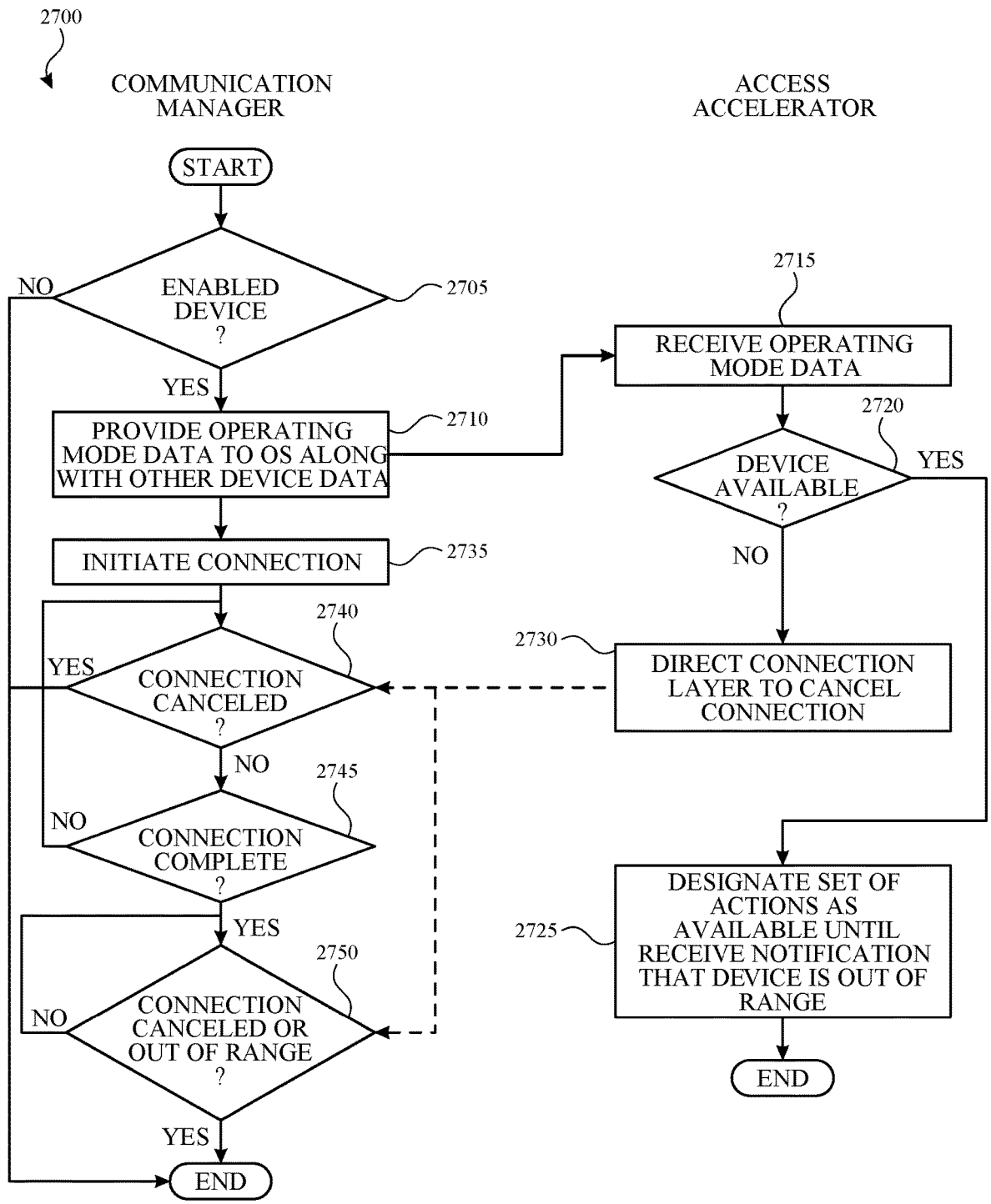
FIG. 27 illustrates a process that may be performed by a device when another device is detected within a particular distance of the device.

FIG. 27 illustrates a process 2700 that shows the operations that the communication manager 2515 and the access accelerator 2505 perform in some embodiments when the communication manager detects a second device within a first distance of the first device. In some embodiments, the communication manager continuously searches for nearby devices that are performing broadcast advertising on wireless short-range radio frequencies, such Bluetooth frequencies. The process 2700 starts when it detects an advertisement from the second device that is within a first distance from the first device. In some embodiments, a range calculator of the communication manager iteratively performs ranging operations to identify the distance between the first device and the second device.

As shown, the communication manager 2515 initially determines (at 2705) whether the second device has been enabled for supporting substitute interactions with the first device. In some embodiments, the second device would have gone through a pairing process with the first device and would have to be associated with one of the user accounts associated with the first device. In other embodiments, the second device just has to be associated with one of the user accounts associated with the first device.

When the communication manager 2515 determines (at 2705) that the second device has not been enabled for supporting substitute interaction with the first device, it ends. Otherwise, it provides (at 2710) to the access accelerator 2505 operating mode data that the process 2700 receives from the second device, and then starts (at 2735) the process for establishing a connection session with the second device.

When the access accelerator receives (at 2715) the operating mode data from the communication manager, it determines (at 2720) whether this data indicates that the second device is in an operating mode that makes it available to support substitute interactions with the first device. As mentioned above, when the second device is a smartwatch, it is deemed available in some embodiments when its operating mode data indicates that the watch is currently attached to a person (e.g., wrapped around a user's wrist), is unlocked and it is not on the charger. Also, as mentioned above, the watch specifies its state information differently in different embodiments. Various ways for providing the operating state information of the watch were described above by reference to FIG. 17.

When the access accelerator determines (at 2720) that the second device is available to support substitute interactions, the access accelerator designates a set of substitute interactions as being available until the communication manager notifies it that the second device is farther than the first distance (as 2725). Otherwise, when the access accelerator determines (at 2720) that the second device is not available to support substitute interactions, it directs (at 2730) the communication manager to cancel its connection session with the second device or to cancel trying to establish such a session.

After 2735, the communication manager determines (at 2740) whether it has received a cancelation request from the access accelerator. If not, it determines (at 2745) whether it has established a connection session. If it has not established a connection session, it returns to 2740. If it determines (at 2745) that it has completed a connection session, it transitions to 2750. The communication manager remains at 2750 until either it receives an instruction from the access accelerator to cancel its connection session, or until it detects (based on ranging operations of the range calculator) that the second device is farther than the first distance away from the first device. After 2750, the process ends.

Many of the above-described features and applications are implemented as software processes that are specified as a set of instructions recorded on a computer readable storage medium (also referred to as a computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software programs can be implemented as sub-parts of a larger program while remaining distinct software programs. In some embodiments, multiple software programs can also be implemented as separate programs. Finally, any combination of separate programs that together implement a software program described here is within the scope of the subject technology. In some embodiments, the software programs, when installed to operate on one or more electronic systems, define one or more specific machine implementations that execute and perform the operations of the software programs.

Figure 28:
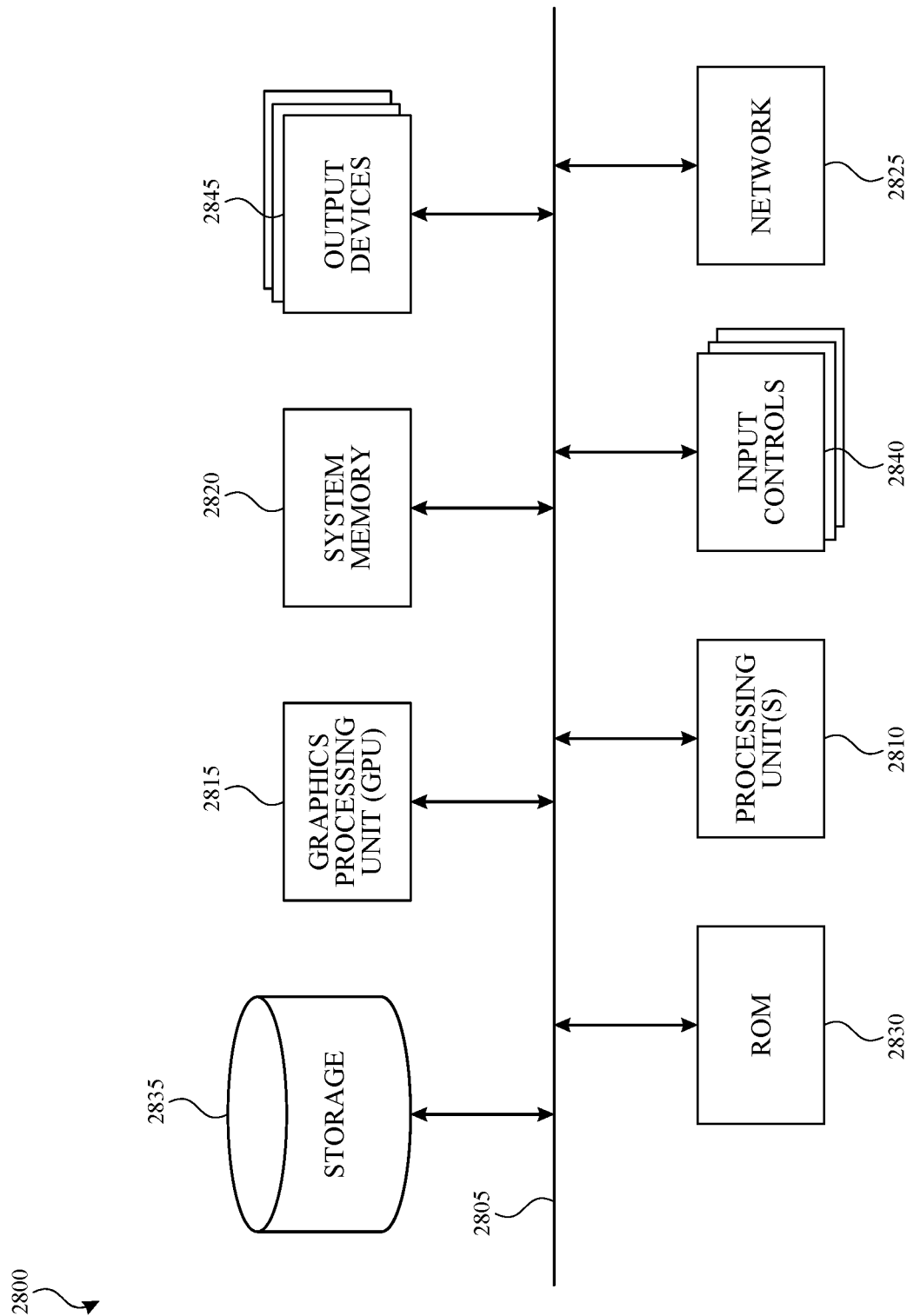
FIG. 28 conceptually illustrates an example of an electronic system with which some embodiments of the subject technology are implemented.

FIG. 28 conceptually illustrates an example of an electronic system 2800 with which some embodiments of the subject technology are implemented. The electronic system 2800 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2800 includes a bus 2805, processing unit(s) 2810, a graphics processing unit (GPU) 2815, a system memory 2820, a network 2825, a read-only memory 2830, a permanent storage device 2835, input devices 2840, and output devices 2845.

The bus 2805 collectively represents all system, peripheral, and chipset buses that communicatively connect the numerous internal devices of the electronic system 2800. For instance, the bus 2805 communicatively connects the processing unit(s) 2810 with the read-only memory 2830, the GPU 2815, the system memory 2820, and the permanent storage device 2835.

From these various memory units, the processing unit(s) 2810 retrieves instructions to execute and data to process in order to execute the processes of the subject technology. The processing unit(s) may be a single processor or a multi-core processor in different embodiments. Some instructions are passed to and executed by the GPU 2815. The GPU 2815 can offload various computations or complement the image processing provided by the processing unit(s) 2810.

The read-only-memory (ROM) 2830 stores static data and instructions that are needed by the processing unit(s) 2810 and other modules of the electronic system. The permanent storage device 2835, on the other hand, is a read-and-write memory device. This device is a non-volatile memory unit that stores instructions and data even when the electronic system 2800 is off. Some embodiments of the subject technology use a mass-storage device (such as a magnetic or optical disk and its corresponding disk drive, integrated flash memory) as the permanent storage device 2835.

Other embodiments use a removable storage device (such as a floppy disk, flash memory device, etc., and its corresponding drive) as the permanent storage device. Like the permanent storage device 2835, the system memory 2820 is a read-and-write memory device. However, unlike storage device 2835, the system memory 2820 is a volatile read-and-write memory, such a random access memory. The system memory 2820 stores some of the instructions and data that the processor needs at runtime. In some embodiments, the subject technology's processes are stored in the system memory 2820, the permanent storage device 2835, and/or the read-only memory 2830. For example, the various memory units include instructions for performing the operations illustrated in the above-described flowcharts and software block diagrams. From these various memory units, the processing unit(s) 2810 retrieves instructions to execute and data to process in order to execute the processes of some embodiments.

The bus 2805 also connects to the input and output devices 2840 and 2845. The input devices 2840 enable the user to communicate information and select commands to the electronic system. The input devices 2840 include alpha-numeric keyboards and pointing devices (also called "cursor control devices"), cameras (e.g., webcams), microphones or similar devices for receiving voice commands, etc. The output devices 2845 display images generated by the electronic system or otherwise output data. The output devices 2845 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 28, bus 2805 also couples electronic system 2800 to a network 2825 through a network adapter (not shown). In this manner, the computer can be a part of a network of computers (such as a local area network ("LAN"), a wide area network ("WAN"), or an Intranet), or a network of networks, such as the Internet. Any or all components of electronic system 2800 may be used in conjunction with the subject technology.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As described above, one aspect of the present technology is the gathering and use of data available from specific and legitimate sources to improve enabling substitute interactions on users' devices. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to enable substitute interactions in accordance with a user's preferences. Accordingly, use of such personal information data enables users to have greater control of the substitute interactions. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of enabling substitute interactions, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, particular substitute interactions can be enabled on users' devices based on aggregated non-personal information data or a bare minimum amount of personal information, such as the content being handled only on the user's device or other non-personal information available.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the subject technology has been described with reference to numerous specific details, one of ordinary skill in the art will recognize that the subject technology can be embodied in other specific forms without departing from the spirit of the subject technology. For instance, a number of the figures (including FIGS. 1, 3, 4, 7, 11, 12, 14, 15, 16, 26, and 27) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the subject technology is not to be limited by the foregoing illustrative details, but rather is to be defined by the appended claims.

What is claimed is:

1. A method comprising:
identifying, by a first computing device, a second computing device that is within a threshold distance of the first computing device;
in response to the identifying, enabling an interaction at the second computing device for authorizing an operation requested on the first computing device, wherein the operation comprises at least one of displaying a list of passwords at the first computing device or installing an application at the first computing device;
detecting, by the first computing device, that the interaction has been performed at the second computing device;
responsive to detecting that the interaction has been performed at the second computing device, authorizing the operation on the first computing device using a substitute credential in lieu of a user account access credential, the substitute credential being stored on the first computing device in association with an identifier of the second computing device; and
responsive to authorizing the operation on the first computing device using the substitute credential in lieu of the user account access credential, performing the operation on the first computing device.

2. The method of claim 1, wherein the substitute credential is further stored on the first computing device in association with a username associated with the second computing device, the username corresponding to the user account access credential, and the operation is authorized on the first computing device using the username and the substitute credential in lieu of the user account access credential.

3. The method of claim 1, wherein the enabling the interaction causes the first computing device to accept the interaction as user authorization.

4. The method of claim 1, wherein the second computing device is configured to receive a user interaction associated with the interaction and provide the interaction responsive to receipt of the user interaction.

5. The method of claim 1, wherein the first computing device is a computer and the second computing device is a wearable device.

6. The method of claim 1, wherein identifying the second computing device comprises identifying an operating mode of the second computing device and determining that the identified operating mode is an operating mode during which the second computing device is allowed to facilitate the interaction for accessing the first computing device.

7. The method of claim 6, wherein the second computing device is a smartwatch and the operating mode comprises the smartwatch being affixed to a person and unlocked.

8. The method of claim 1, wherein the interaction comprises pressing a side hardware button on the second computing device two or more times.

9. The method of claim 1, further comprising:
receiving, by the first computing device, a request to perform the operation, wherein the identifying is performed responsive to receipt of the request.

10. A device comprising:
a memory configured to store a substitute credential in association with an identifier of a second device; and
at least one processor configured to:
identify that the second device that is within a threshold distance of the device;
in response to identification of the second device, enable an interaction at the second device for authorizing an operation requested on the device, wherein the operation comprises at least one of displaying a list of passwords at the device or installing an application at the device;
detect that the interaction has been performed at the second device;
responsive to detection that the interaction has been performed at the second device, authorize the operation using the substitute credential in lieu of a user account access credential; and
responsive to authorization of the operation, perform the operation.

11. The device of claim 10, wherein the at least one processor is further configured to:
receive a request to perform the operation; and
identify the second device responsive to receipt of the request.

12. The device of claim 10, wherein the interaction comprises pressing a side hardware button on the second device two or more times.

13. The device of claim 12, wherein the at least one processor is further configured to accept the interaction as user authorization.

14. The device of claim 10, wherein the memory is further configured to store the substitute credential in association with a username associated with the second device and the at least one processor is further configured to authorize the operation using the username and the substitute credential in lieu of the user account access credential.

15. The device of claim 10, wherein the at least one processor is further configured to identify an operating mode of the second device and determine that the identified operating mode is an operating mode during which the second device is allowed to facilitate the interaction for accessing the device.

16. The device of claim 15, wherein the second device comprises a smartwatch and the operating mode comprises the smartwatch being affixed to a person and unlocked.

17. A non-transitory machine readable medium storing code that, when executed by at least one processor of a first computing device, causes the at least one processor to perform operations comprising:
identifying, by a first computing device, a second computing device that is within a threshold distance of the first computing device;

in response to the identifying, enabling an interaction at the second computing device for authorizing an operation requested on the first computing device, wherein the operation comprises at least one of displaying a list of passwords at the first computing device or installing an application at the first computing device;

detecting, by the first computing device, that the interaction has been performed at the second computing device;

responsive to detecting that the interaction has been performed at the second computing device, authorizing the operation on the first computing device using a substitute credential in lieu of a user account access credential, the substitute credential being stored on the first computing device in association with an identifier of the second computing device; and responsive to authorizing the operation on the first computing device using the substitute credential in lieu of the user account access credential, performing the operation on the first computing device.

18. The non-transitory machine readable medium of claim 17, wherein the operations further comprise:
receiving a request to perform the operation; and
identifying the second computing device responsive to receipt of the request.

19. The non-transitory machine readable medium of claim 17, wherein the interaction comprises pressing a side hardware button on the second device two or more times.

* * * * *